United States Patent [19]
Roberts et al.

[11] Patent Number: 5,095,512
[45] Date of Patent: Mar. 10, 1992

[54] METHOD AND APPARATUS FOR MANIPULATING IMAGE DATA EMPLOYING AN INTERMEDIATE FORMAT

[75] Inventors: Lawrence G. Roberts, Woodside; Dennis L. Hunt, Burlingame, both of Calif.

[73] Assignee: NetExpress Systems, Inc., Foster City, Calif.

[21] Appl. No.: 261,956

[22] Filed: Oct. 24, 1988

[51] Int. Cl.$^5$ ............................................. G06K 9/36
[52] U.S. Cl. ........................................ 382/56; 382/49; 358/261.1; 358/261.3; 340/747
[58] Field of Search ...................... 382/56, 54, 49, 41, 382/45; 358/261.1, 261.3; 340/747

[56] References Cited

U.S. PATENT DOCUMENTS

| | | | |
|---|---|---|---|
| 4,602,383 | 7/1986 | Ogawa et al. | 382/56 |
| 4,610,027 | 9/1986 | Anderson et al. | 382/56 |
| 4,646,356 | 2/1987 | Anderson et al. | 382/56 |
| 4,783,834 | 10/1988 | Anderson et al. | 382/46 |
| 4,858,017 | 8/1989 | Torbey | 382/56 |
| 4,876,607 | 10/1989 | Tseng | 358/261.2 |

OTHER PUBLICATIONS

Roy Hunter et al., International Digital Facsimile Coding Standards, 7-1980, 854-867.
CCITT Recommedation T.4, "Standardization of Group 3 Facsimile Apparatus for Document Transmission", Fascicle VII.3, Geneva, 1980, amended at Malaga-Torremolinos, 1984.
CCITT Recommendation T.6, "Facsimile Coding Schemes and Coding Control Functions for Group 4 Facsimile Apparatus", Fascicle VII.3, Rec. T.6, (Malaga-Torremolinos, 1984).

Primary Examiner—Michael Razavi
Attorney, Agent, or Firm—Townsend and Townsend

[57] ABSTRACT

Bit-mapped and compressed image data are converted one another through an intermediate image data or code form wherein each image is represented by a list of sublists, each sublist being itself a list of numerical values representing run lengths transistions from one type of picture element (pel) to a second and opposite type of picture element (pel) (e.g., a black pel and a white pel). Hence the intermediate code data structure according to the invention is termed a transition list or TL code or data structure. The data structure and coding rules are defined by rules relating to code type, code word length and code word interdependence. A specific conversion process specifies that the transition list be composed of sublists wherein each represents a scan line. The preferred form of intermediate code is a fixed word-length transition list, that is, a serial list of values representing run lengths of either "black" picture elements or "white" picture elements stored serially in digital data format having a fixed word length.

10 Claims, 10 Drawing Sheets

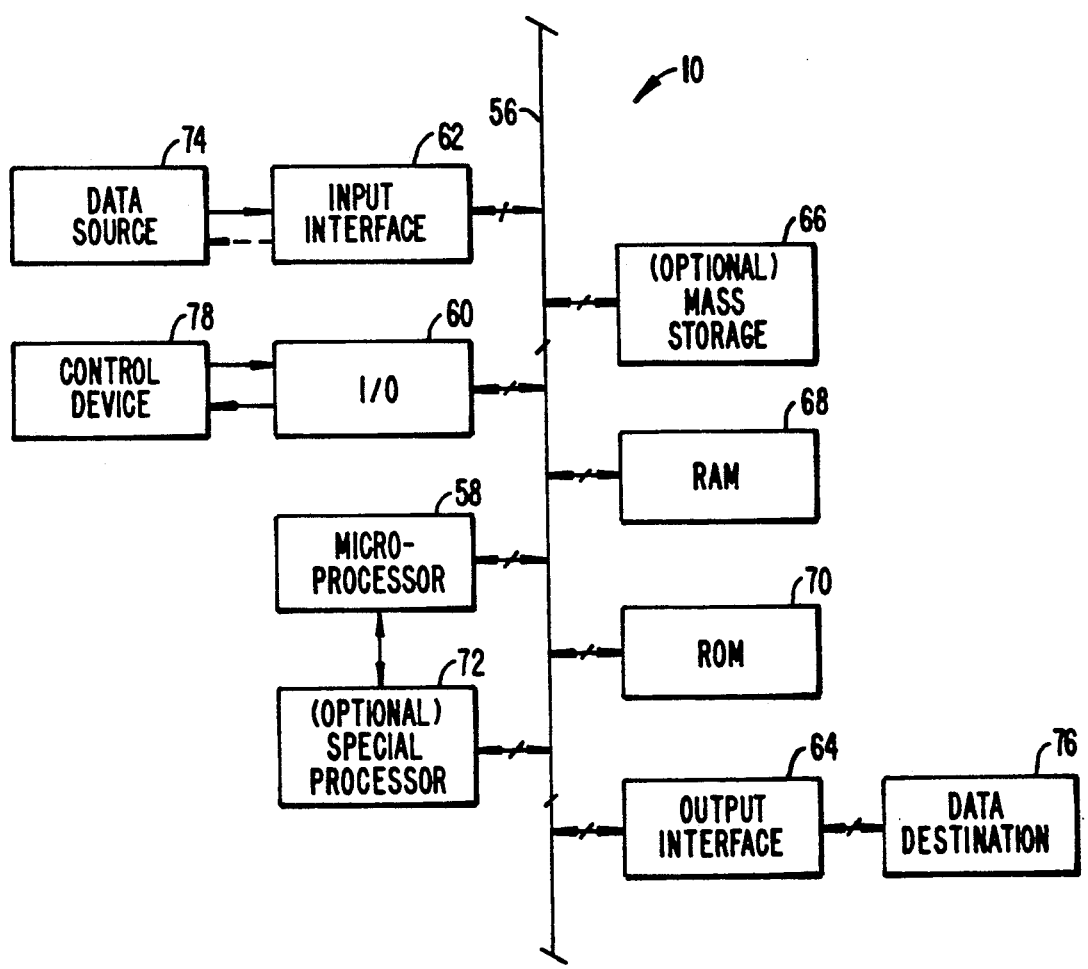
FIG._2.

/ 80

| Bitmap | Value | Label | Section |
|---|---|---|---|
| (grid) | N N N | VERTICAL ORIGIN | 82 FACSIMILE BLOCK SUPER HEADER |
| | N N N | HORIZONTAL ORIGIN | |
| | N N N | HEIGHT | |
| | N N N | WIDTH | |
| | N N N | PROPORTION | |
| | N N N | TOTAL NO. OF TRANSITIONS | 84 SEGMENT HEADER |
| | N N N | ADDRESS OF NEXT | |
| 0000000000000000 | 0 (SUBLIST LENGTH) | | 86 A WHITE SCAN LINE |
| 0000000000000000 | 0 (SUBLIST LENGTH) | | A WHITE SCAN LINE / 88 |
| 0000000000000100 | 4 (SUBLIST LENGTH) | | 90 A MIXED B & W SCAN LINE |
| 0000000001000000 | 64 WHITE RUN LENGTH | | |
| 0000000000110001 | 49 BLACK RUN LENGTH | | |
| 0000000000000100 | 4 WHITE RUN LENGTH | | |
| 0000000000000011 | 3 BLACK RUN LENGTH | | |
| 0000000000000010 | 2 (SUBLIST LENGTH) | | 92 A BLACK SCAN LINE |
| 0000000000000000 | 0 WHITE RUN LENGTH | | |
| 1111111111111111 | 215 BLACK RUN LENGTH | | |
| 0000000000000010 | 2 (SUBLIST LENGTH) | | 94 A BLACK SCAN LINE |
| 0000000000000000 | 0 (WHITE) | | |
| 0000000001111111 | 127 (BLACK) | | |
| 0000000000000000 | 0 (SUBLIST LENGTH) | | 96 A WHITE SCAN LINE |
| 0000000000000100 | 4 (SUBLIST LENGTH) | | 98 A MIXED B & W SCAN LINE |
| 0000000000000011 | 3 WHITE | | |
| 0000000000000100 | 4 BLACK | | |
| 0000000000110001 | 49 WHITE | | |
| 0000000001000000 | 64 BLACK | | |
| 1111111111111111 | -1 END OF SEGMENT BLOCK (EOSB) MARKER | | 100 |

FIG._3.

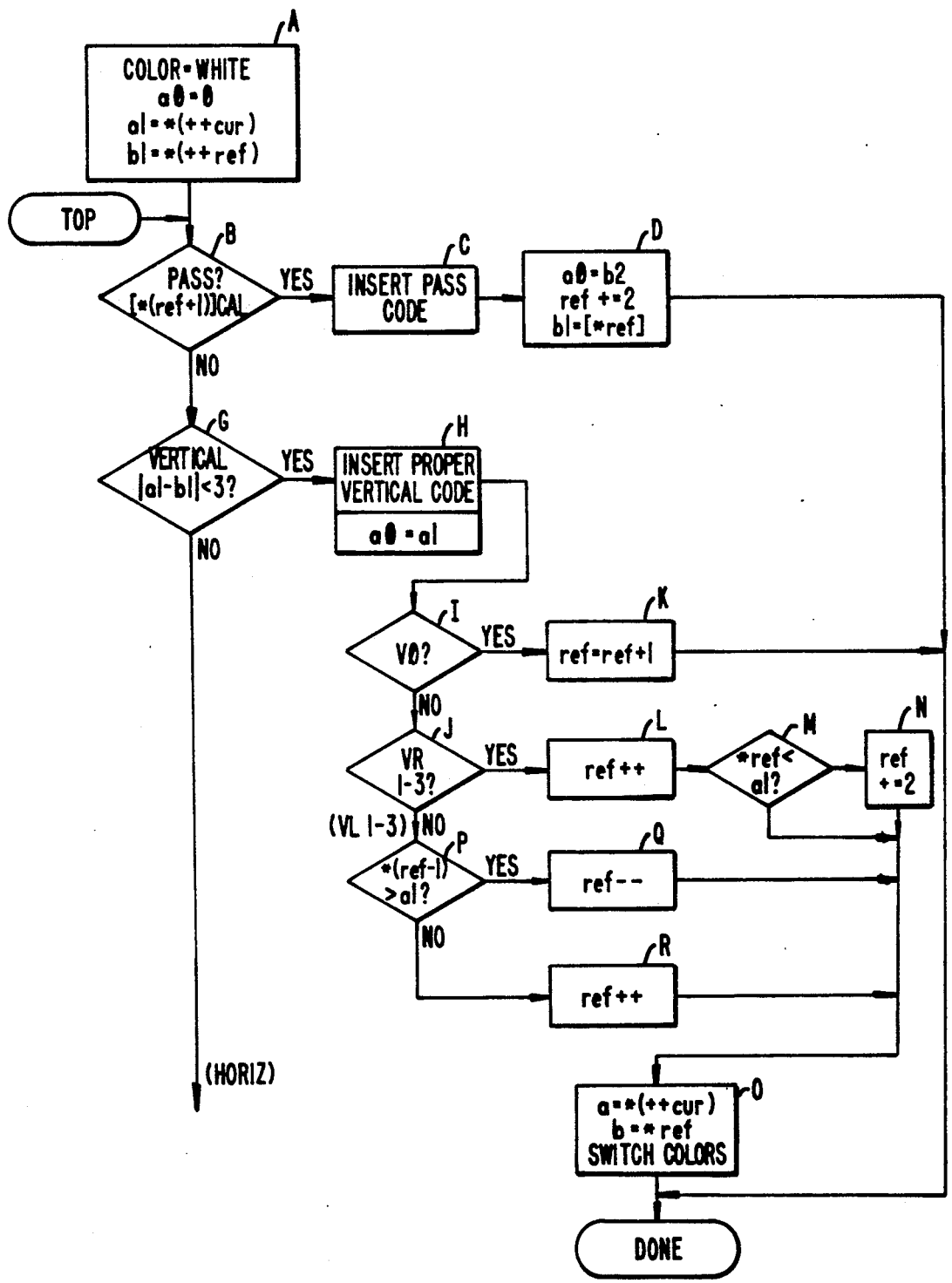
FIG._4A.

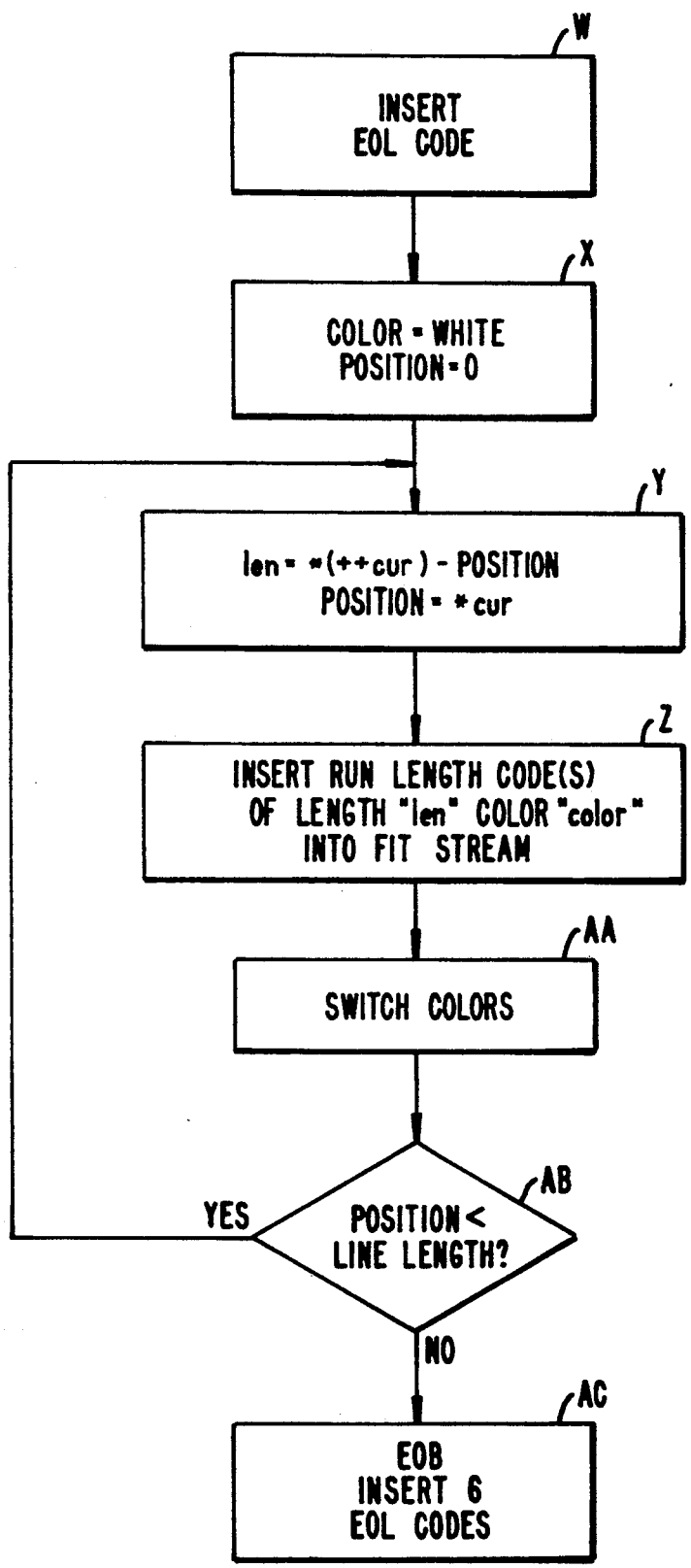
FIG._5.

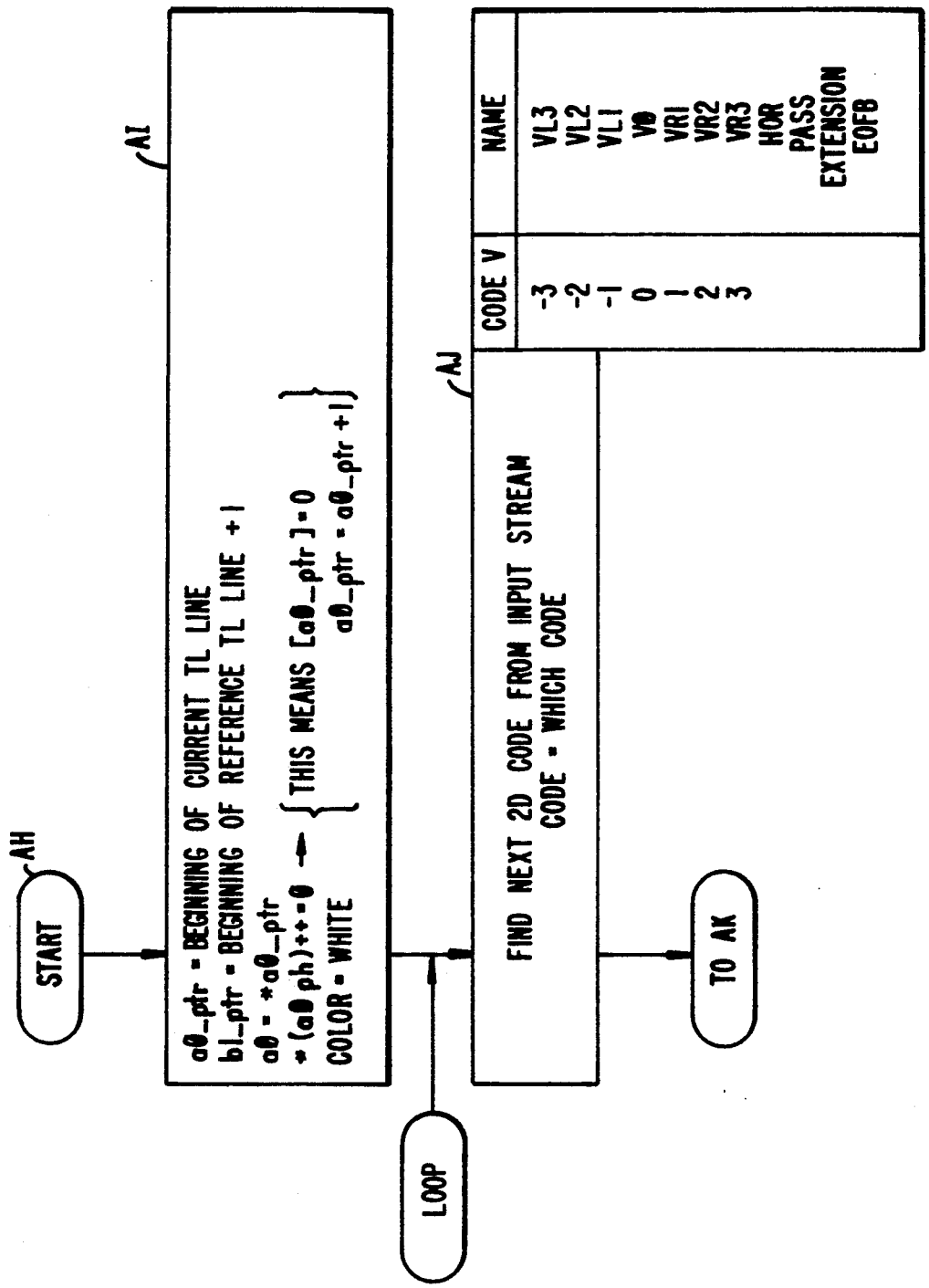
FIG._7A.

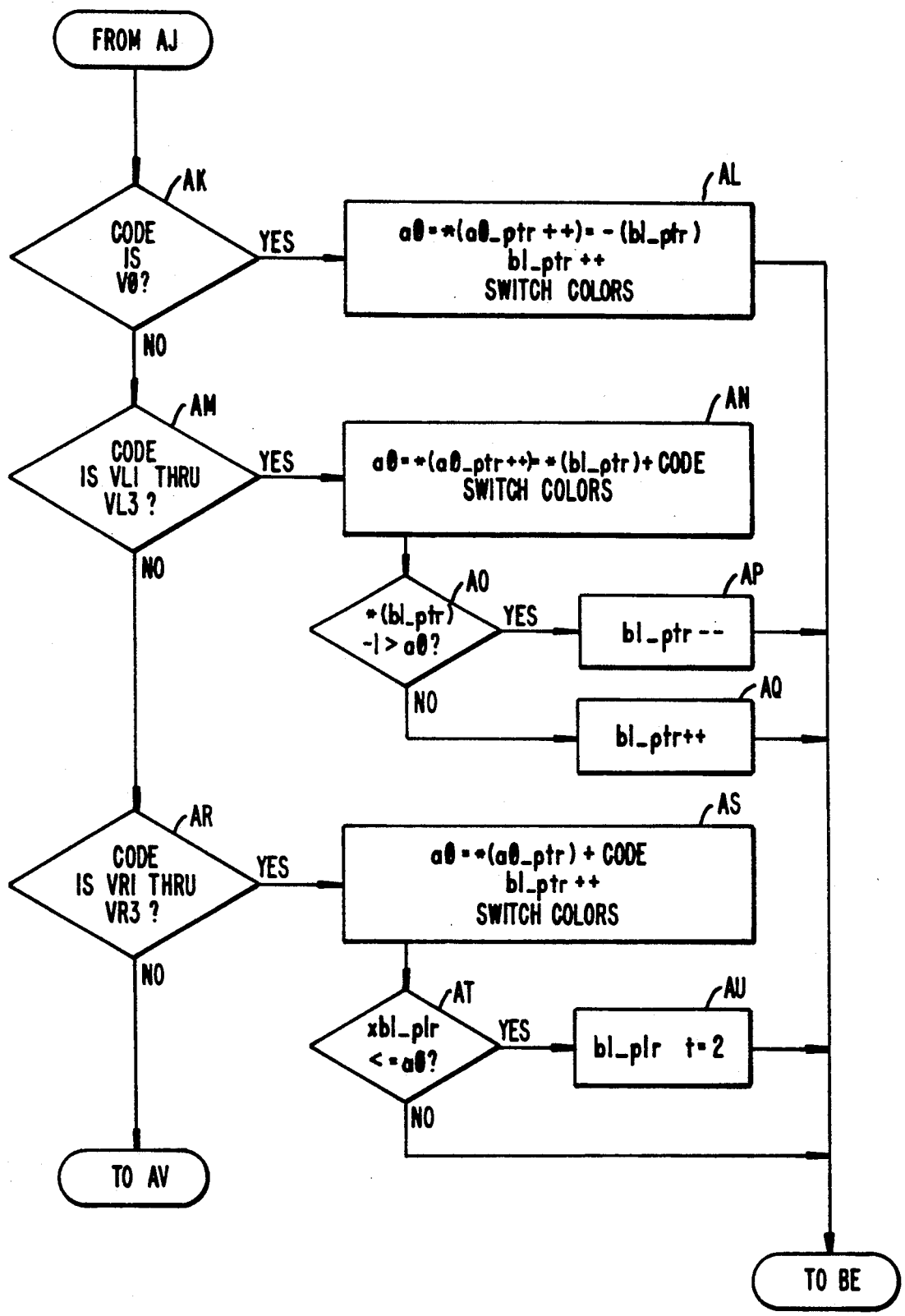
FIG._7B.

METHOD AND APPARATUS FOR MANIPULATING IMAGE DATA EMPLOYING AN INTERMEDIATE FORMAT

BACKGROUND OF THE INVENTION

This invention relates to image data processing and more particularly to converting between image data of a plurality of differing formats. Specifically, the invention relates to the conversion between defined forms of standardized image data, wherein one form involves single-line coding and another form involves multiple-line coding in a manner optimized for speed of processing. The invention has particular application in facsimile data transmission and in bit-mapped image reproduction, such as in connection with electrostatic (laser) graphics printers.

Image data is an important data form for conveying information of both text and graphic content. The current market for laser printers alone is valued at more than one billion dollars. The facsimile market has a similar large market value.

Image data is typically coded as either a compressed code or a bit-mapped code. A single standard page-sized bit-mapped data image having a resolution of 400 lines per inch requires sixteen million bits of storage. Transmission of a bit-mapped image a bit at a time over conventional telephone-grade 3000 Hz bandwidth communication media is considered to be prohibitively time-consuming.

In order to reduce the size of image data, various compression techniques have been adopted. In the facsimile art, for example, image data is reduced to one of several types of compressed code form, such as Group III (Modified Huffman or MH) or Group IV (MMR) prior to transmission.

Frequently it is necessary to convert compressed image data from one compressed code form to another compressed code form in order to overcome the lack of compatibility among types of equipment. In the past it has been considered that conversion between Group III and Group IV coded images is so complex that it could not be done except by creation of a complete bit-mapped image version of the source data and applying conventional facsimile encoding process to obtain the image in the destination code format. Nevertheless, a straight-forward manipulation of a full-page bit-mapped image at 400 lines per inch requires processing of 16 millions bits of data. Such a process is extremely time-consuming and cumbersome. A bit-mapped data image is typically not further manipulated, except that it may be used to reproduce an image output on an electrostatic printer or the like. Thus, conventional facsimile and printing technology has encountered a barrier in the trade-off between image resolution and the speed of image processing. Whereas standard facsimile image data is considered too complex for any sort of meaningful image data manipulation, bit-mapped image data is considered to be simply too massive to be manipulated efficiently. Nevertheless, standardized facsimile image data is attractive because facsimile is becoming universally acceptable as a mode for transferring information. Thus, needs exist to provide better techniques for converting facsimile coded compressed image data among various formats, to speed the process of image reproduction and to process the image information in general. Further unexpected benefits might also accrue with the solution to these problems.

SUMMARY OF THE INVENTION

According to the invention, bit-mapped image data, as well as selected forms of compressed image data, are converted between one another by converting data through an intermediate data and code structure wherein each image is represented by a list of sublists, each sublist being itself a list of numerical values representing run lengths between transitions from one type of picture element (pel) to a second and opposite type of picture element (pel) (e.g., a black pel and a white pel). Hence the intermediate code data structure according to the invention is termed a transition list or TL code or data structure. The data structure and coding rules are defined by rules relating to code type, code word length and code word interdependence. A specific conversion process specifies that the transition list be composed of sublists wherein each represents a scan line. In a particular embodiment, the rules specify 1) that the intermediate code be a run length-type code of each scan line of the image, 2) that the code words be of fixed length and 3) that the image be stored in a (two-dimensional) serial array wherein each scan line is of a length dependent only on the number of transitions of run lengths. The preferred form of intermediate code is a fixed word-length transition list, that is, a serial list of values representing run lengths of either "black" picture elements or "white" picture elements stored serially in digital data format having a fixed word length, wherein the last value is repeated three times to indicate end of line. Alternatively, a scan line header word may specify scan line length.

A specific conversion process according to the invention specifies that the transition list be composed of sublists representing a scan line, each scan line consisting of a header word indicating line length from zero to a value indicating page width, and a grouping (in pairs) of words specifying run lengths of white pels and run lengths of black pels. A rule specifies 1) that a full transition list (a page) have a scan line header word specifying the number of transitions (an even number), 2) that the first run length code word be the incremental (rather than cumulative) number of consecutive white picture elements (stored in a two-byte word), 3) that the second run length code word be the incremental (rather than cumulative) number of consecutive black picture elements (stored in a two-byte word), 4) that the last run length code word be a black run length code, thus pairing white and black run length units and skipping the final white code word in each scan line, 5) that the end-of-segment (or end-of-image) marker be a negative one (−1) stored in a two-byte word, 6) that the segment header word be a two-byte word specifying the address of the next segment of memory, or that there is no further segment, and finally 7) that the image header consist of five two-byte words specifying a) height of the image in lines, b) width in maximum number of picture elements, c) vertical origin in terms of number of picture elements up to origin from the bottom left image corner, d) horizontal origin in terms of number of picture elements right to the origin from the bottom left image corner, and e) proportional width in terms of number of picture elements right of the origin to the next character (which is used to control overlapping of images). In segmented images, pointers may be provided together with a trailing end-of-segment marker, an optional segment header word pointing to the next segment or end of image, and an image header specifying height, width, location and proportion of the image.

The invention further contemplates processes for converting from MH to TL, from TL to MH, from MMR to TL, from TL to MMR, from text to TL, from TL to printable bit-mapped image, from TL to displayable bit-mapped image, and from scanned bit-mapped image to TL.

Significantly, the intermediate code according to the invention is of a form sufficiently compressed and sufficiently modularized that important and desired intermediate processes can be applied to it, such as image merging, image scaling and image cut and paste. Hence, the processes according to the invention contemplate TL merge, TL scaling and TL cutout.

In the course of developing the present invention it was noted that a typical compressed data image of a page of text contains a limited number of transitions between "black" and "white" in the course of a serial scan of a pictorial image. For example, a typical image with a resolution of 300 to 400 lines per inch contains only about 160,000 transitions. Recognizing these and other characteristics makes it possible to produce a homogeneous image output suitable for either facsimile transmission or for hard-copy image reproduction. It could well emerge that a standard form of information may emerge comprising a hybrid of electronic data and electronic image. This invention permits rapid processing and merging of such a form into a final hard copy form, and it permits transmission of an electronic image of such information in a standard facsimile format.

The invention has been found to be capable of processing a page of information at a rate of 4 seconds per page using conventional facsimile processing hardware such as the Am7970A compression expansion processor chip built by Advanced Micro Devices of Sunnyvale, California in conjunction with an 80286 microprocessor chip of Intel Corporation of Santa Clara, California. A conventional process using the same hardware would require about 60 seconds per page. Conventional image processing employing faster hardware, such that based on as a 68020 microprocessor chip of Motorola Corporation of Chicago, Illinois, are able to achieve a speed of about 15 seconds per page. Nevertheless, the present invention is able to produce its results with less than one one-hundredth of the processing power which would be required for full bit-mapped image processing.

BRIEF DESCRIPTION OF THE DRAWINGS

FIG. 2 is a simplified block diagram of a digital data processing apparatus for use in an apparatus according to the invention.

FIG. 3 is a diagram illustrating a specific embodiment of a transition list as stored in a block of a digital memory.

FIGS. 4A and 4B together are a flow chart of a process for converting transition list data into MMR data.

FIG. 5 is a flow chart of a process for converting transition list data into MH data.

DESCRIPTION OF SPECIFIC EMBODIMENTS

Figure 1:
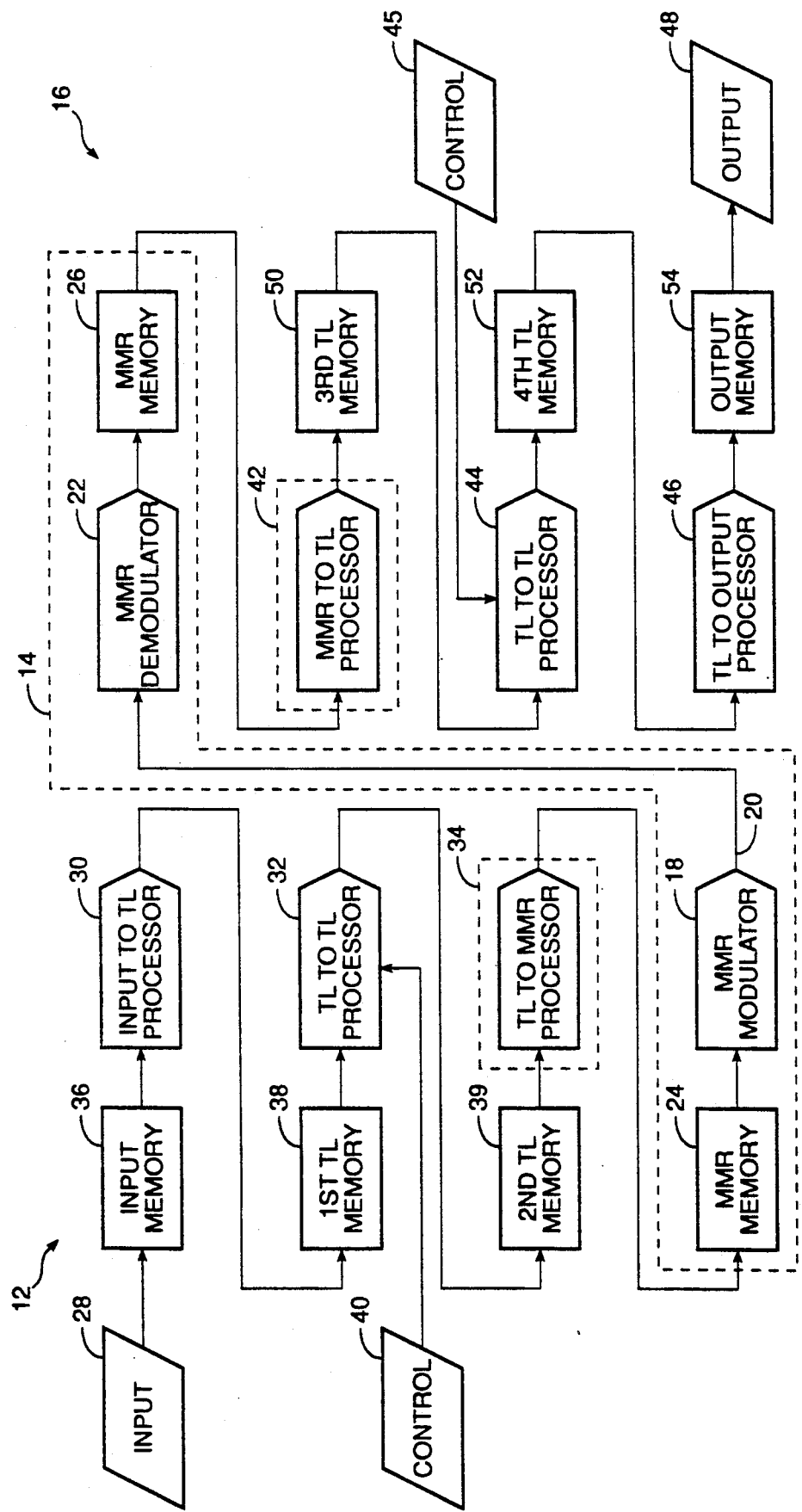
FIG. 1 is a block diagram of a specific embodiment of the invention illustrating data conversion elements, data storage elements, data manipulation elements and data transmission and reception elements.

Referring to FIG. 1 there is shown a block diagram of a specific embodiment of an encoding/decoding apparatus 10 in accordance with the invention. The encoding/decoding apparatus 10 comprises an encoder 12, a modem (and transmission medium) 14 and a decoder 16. The modem 14 as coupled to a transmission medium is illustrated for the sake of completeness and is not an essential element to the understanding of the invention.

The modem (and transmission medium) 14 comprise for example an MMR modulator 18 coupled to a suitable transmission link 20, such as a 64 KBS transmission link suited to carrying standard MMR modulation as defined in CCITT Recommendation T.6 "FACSIMILE CODING SCHEMES AND CODING CONTROL FUNCTIONS FOR GROUP 4 FACSIMILE APPARATUS," Fascicle VII.3 - Rec. T.6 (Malaga-Torremolinos, 1984). The transmission link 20 is coupled to an MMR demodulator 22. At the transmission end the MMR modulator 18 is coupled to receive MMR data from a suitable data buffer or memory, such as a two-port MMR memory 24. At the receiving end the MMR demodulator 22 is coupled to a suitable two-port MMR memory 26 which is operative to capture received and demodulated MMR data in order to buffer it for further processing in accordance with the invention.

It is contemplated that each terminal of a facsimile network employing an apparatus in accordance with the invention comprise the three elements of an encoder 12, a modem 14 and a decoder 16. However it is to be understood that such an apparatus is capable of communication with any other Group 4 apparatus through its modulator 18 and demodulator 22.

In accordance with the invention the encoder 12 is suited to receive at its input 28 digital information which does not have a one-for-one correspondence with a target code such as MMR (CCITT Group 4 facsimile code) and to analyze and convert that source information through a transition list processor 30 into a transition list code, and thereafter to process the information in the transition list code through a transition list processor 32 and/or convert the transition list code through a transition list to output code converter 34 into a target code such as MMR code The input digital information of an encoder 12 in accordance with the invention may be MH code (CCITT Group 3 facsimile code as defined CCITT Recommendation T.4 "STANDARDIZATION OF GROUP 3 FACSIMILE APPARATUS FOR DOCUMENT TRANSMISSION," Fascicle VII.3 - Rec. T.4, Geneva, 1980, amended at Malaga-Torremolinos; 1984), bit-mapped image data, text code, such as USASCII or EBCDIC, or eventually even an image description in a printer description language code such as DDL (Data Description Language of Imagen Corporation) or PostScript of Adobe Systems.

To this end the input 28 is coupled to an input memory 36 which in turn is coupled to the input to transition list processor 30, the output of which is coupled to a first transition list memory 38. The first transition list memory 38 is coupled to the transition list code to transition list code processor 32, which in turn is coupled to the second transition list memory 39. The second transition list memory is coupled to the transition list to output code (MMR) converter 34, which in turn is coupled to provide output code to the MMR memory 24 of the modem 14. First control means 40 are provided for controlling the nature of processes carried out by the transition list processor 32, such as merge, scaling or cutout. The various memory means are provided for temporary storage of code during processing. It is contemplated that the apparatus 12 will operate in near real time, and that the memory means are adapted to high throughput applications. It is further contemplated that the memory means may be embodied in a signal physical memory unit, such as a semiconductor random access memory device, or into a plurality of memory units serving as two-port input-output buffer memories. It is still further contemplated that the processors 30, 32, and 34 may be embodied in a programmable microprocessor unit operative to execute computer programs for performing the input to transition list conversions, the transition list to transition list manipulations and the transition list to output code conversions. Suitable microprocessors for commercial applications of the invention are the Motorola 68000 series microprocessors. The operations of the microprocessor may be augmented by conventional facsimile processing hardware such as the Am7970A compression/expansion processor chip built by Advanced Micro Devices of Sunnyvale, California in conjunction with an 80286 microprocessor chip of Intel Corporation of Santa Clara, California.

Further in accordance with the invention the decoder 16 is suited to convert received source code from the modem 14, typically in a code such as MMR, through the mechanism of a source code to transition list converter 42 into a transition list code and thereafter to process the transition list code in a transition list code processor 44 under control of a second control apparatus 45 and/or convert the transition list encoded data via a transition list code to output code processor 46 into a target code for transmission to an output apparatus 48, such as a printer, a display or another facsimile transmitter. The target code may be a bit-mapped image, text, MH code or a printer description language code. Images for display may be bit-mapped code or text code. Images for printing may be PDL code, text code or bit mapped code. Images for transmission into another media such as according to a different facsimile standard may be converted into a facsimile code such as MH code or some other compressed image code. It is important to recognize that according to the present invention, there need not be a direct correlation between the source code and the target code, so long as a conversion exists whereby image data can be converted into and out of transition lists In order to provide temporary storage conversion and manipulation processes, a third transition list memory 50, a fourth transition list memory 52 and an output memory 54 are provided between the processors as above. It is contemplated that many of these functions are shared by the same physical elements and further that subsets of the apparatus as shown in FIG. 1 may be provided for dedicated and special purpose functions where not all of the options as illustrated are needed or used.

Figure 1A:
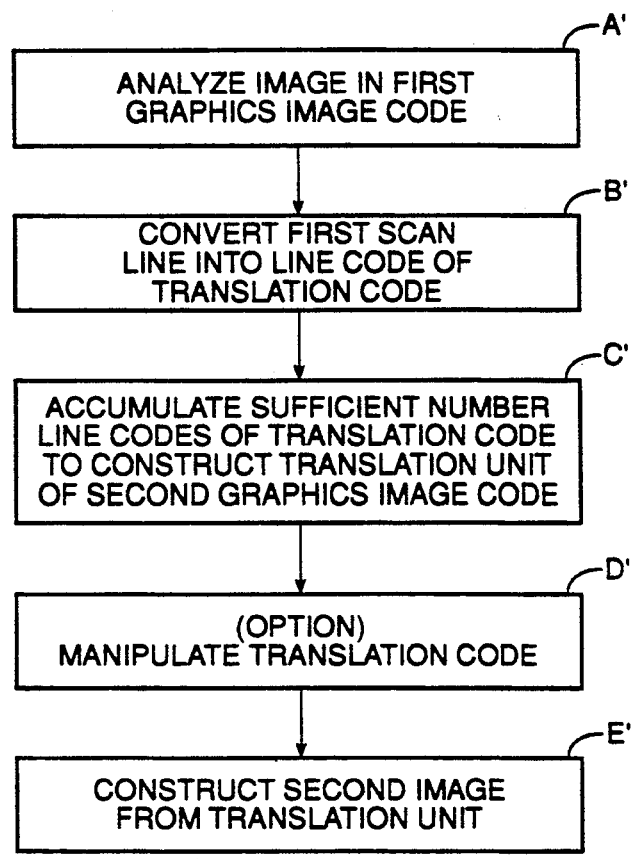
FIG. 1A is a flow chart for converting a first image to a second image by way of the apparatus of FIG. 1.

FIG. 1A illustrates a summary of the steps implemented by the apparatus 10 of FIG. 1 used to convert a first image described by a first graphics image code to a corresponding second image described by a second graphics image code. First, step A' analyzes the image represented in the first graphics image code. This analysis step identifies a first scan line representation for each scan line of the first graphics image code. This analysis step may involve analysis of an entire image to identify a first scan line representation. The next step, step B', converts the first scan line representation into a line of code of a third code sufficiently articulate to capture the entire denotation of the first scan line representation. Thereafter, in step C', the process accumulates a sufficient number of line codes of the third code to construct a translation unit of the second graphics image code. This may involve construction of a block code from the translation code. Thereafter, the translation code may be manipulated optionally (Step D'). Rotations, translations, etc. are permitted on the basis of the translation code. Finally, the process is completed with step E' when the second image, described by the second graphics image code, is constructed from the translation unit. Significantly, no one-to-one code word conversion correspondence is necessary to convert the first image to the second image. Moreover, there is allowed the conversion of one type of bit-mapped image to another type of bit-mapped image and the manipulation (e.g., rotation, translation, etc.) of the structure of the image through processing of the intermediate or translation code.

FIG. 2 is a block diagram of a typical microprocessor-based apparatus 10 incorporating the features of the present invention. Other embodiments are within the skill of the ordinary artisan in this art. The apparatus 10 comprises a data and control bus 56 to which are coupled a central processing unit, i.e., a microprocessor 58, input/output channels 60, a data input interface 62, a data output interface 64, mass storage 66, random access memory 68, read only memory 70 and a special processor 72. A data source 74 is coupled to provide source data through the input interface 62 to the random access memory 68 under control of the microprocessor 58, and a data destination 76 is coupled to receive destination data via the output interface 64 under control of the microprocessor 58. The programs for controlling data translation and manipulation, as well as operating system functions, are stored in the read only memory 70. A control device 78, such as a terminal or remote data link, provides overall command and control via the input/output interface 60. Special processing of facsimile data is, for example, handled by the dedicated processor 72 coupled in accordance with the specifications for the dedicated processor to the bus 56 and the microprocessor 58. It should be understood that other structures may be employed, such as a structure employing pipeline memory, cache memory or other structures determined to be suited to processing of facsimile image data.

Referring to FIG. 3, there is shown a sample of the data structure of a transition list 80 in accordance with the invention. For convenience, the data structure is shown as consecutive addressable locations in a memory space, each location comprising 16 bits of storage. In accordance with a specific embodiment of the invention, a transition list 80 comprises a superheader 82, a segment header 84, and a plurality of segments or transition sublists 86, 88, 90, 92, 94, 96, and 98, and an end of segment block marker 100. The transition list 80 represents the complete description of an image independent of the compressed code or bit image representation of the image. Each of the segments or sublists 86, 88, 90, 92, 94, 96, and 98 is a fixed bit-length number representing the number of consecutive bits in the scan line of an image without transition, the absence of an image registration, and the presence of an image registration, e.g., the number of consecutive bit transitions from white to black and from black to white in a black and white image. (Color images may be represented in a similar manner using for example conventional three or four-pass representations of a single image frame.)

An alternative transition list format is illustrated by the example shown in the following table. The format differs in that the last code is tripled to indicate an end to the list. In the data field, a 0 represents a white, a 1 represents a black.

| Element | Start Address |
|---------|---------------|
| 1 | 0 |
| 2 | 10 |
| 3 | 21 |
| 4 | 22 |
| 5 | 35 |
| 6 | 99 |
| 7 | 1728 |
| 8 | 1728 |
| 9 | 1728 |

According to this representation of the transition list, it is unnecessary to know the number of elements, i.e., the length of the transition list, as the transition list is provided with a terminating element, a repetition of the last transition three times. Each element is a 16-bit word, which allows representations of addresses from 0 to 65,536.

Figures 4, 4B:
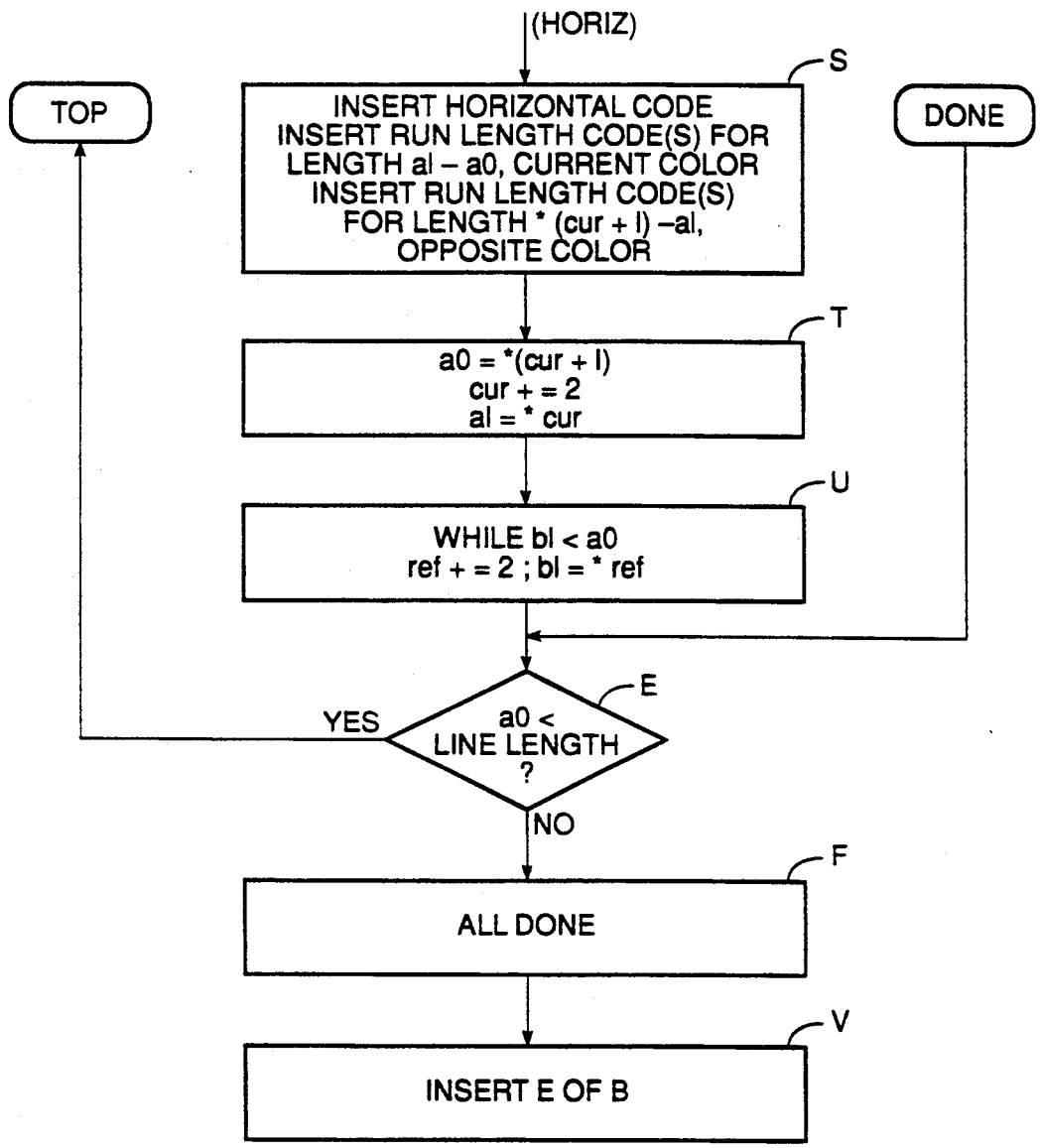

FIG. 4 is a flow chart of a representative conversion from a transition list (TL) data to MMR code, the standard for CCITT Group IV facsimile. Herein it is assumed that a transition list has been created by any process. The formulas in the flow chart employ the syntax of the C programming language. The reference designations are the same as those used in the CCITT specification for positions: $a_0$, $a_1$, $b_1$, and $b_2$.

Starting with initialization of the color (=white), $a_0$ to 0, $a_1$ to the current value plus 1 and $b_1$ to the reference value plus 1 (Step A), the test is made for the "pass" mode (Step B). If it is the pass mode, then the pass code is inserted (Step C) and $a_0$ is set to $b_2$, ref+ is set to 2 and $b_1$ is set to the value ref (Step D). The process then proceeds to the test for end of line (Step E). If $a_0$ is not less than the line length the process begins again at Step B; otherwise it terminates (F).

If the pass mode test (Step B) yields a negative, then the Vertical test is applied (Step G). If affirmative, the proper vertical code is inserted and $a_0$ is set to $a_1$ (Step H). Vertical position is tested from position 0 (Step I) to positions 1-3 (Step J). If at position V0, the ref value is incremented (Step K) and Step E is repeated. If at positions V1 through V3, several steps are invoked. The value ref is incremented (Step L), then tested against $a_1$ for position (Step M), which if less, sets ref+1 to 2 (Step N) and invokes the color switch (Step O); otherwise the color switching step is invoked immediately. If the vertical right tests are negative, it is presumed that the position is vertical left 1 through 3. Thereupon, ref-1 is tested against $a_1$ (Step P), which if greater decrements ref (Step Q) or if lesser, it increments ref (Step R) and then proceeds to Step 0, the color switching step. The color switching step leads to Step E.

If the vertical test is negative (Step G), the horizontal processing steps are invoked. Into the bit stream are inserted the horizontal code, the run length codes for length $a_1 - a_0$ at the current color and the run length codes for length ((current+1) - $a_1$) for the opposite color (Step S). Thereafter, $a_0$ is incremented by current plus 1, current plus 1 is set to 2 and $a_1$ is set to current (Step T). While $b_1$ remains less than $a_0$, ref plus 1 is set to 2 and $b_1$ is set to ref (Step U). Thereafter Step E is invoked. The process is repeated until the entire transition list is translated to MMR code. The last element of a transition list is repeated three times to signal the end of a scan line. At the completion of all transition lists for all scan lines is a block or segment, an end of block (EOB) code is inserted in the bit stream (Step V) in accordance with established MMR standards.

FIG. 5 is a flow chart for illustrating the conversion of a transition list to MH (Modified Huffman) code in its compressed version. Initially, an End of Line (EOL) code is inserted in the bit stream (Step W) after which the current relative position ("position") is set to zero and the color is set to white (Step X). A series of iterative steps begin. The value "len" is set to the value of (current+1) less the value of "position" and the value of "position" is set to "current" (Step Y). Thereafter the run length code or codes of length "len" and color value stored as "color" are inserted in the bit stream (Step Z). (The two possible values of "color" are black and white.) The colors are then switched (Step AA) and the value of "position" is tested against "line length" (Step AB) to determine if the line is completed. If not, steps Y through AB are repeated until the line is completed. When the end of a block is reached, preferably six End of Line (EOL) codes are inserted into the bit stream as a trailer (Step AC).

Figure 6:
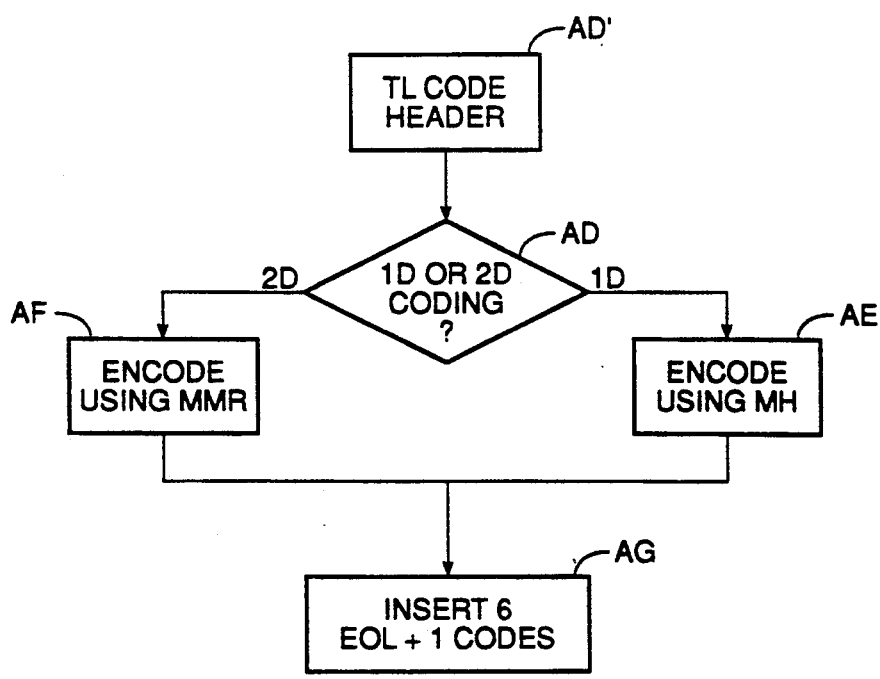
FIG. 6 is a flow chart of a process for converting transition list data into MR data.

MMR is essentially a two dimensional code whereas MH is a one dimensional code. A third code exists, called MR, which is a bit mapped coding scheme which can be either a one or two dimensional code. FIG. 6 is a flow chart useful for understanding how to convert TL to MR. The first step is to test whether the TL is a one-dimensional or two dimensional code (Step AD). This is typically information available in the header of the TL code (Step AD1). If the code is one dimensional, then it is encoded using the procedures established for MH, above (FIG. 5) (Step AE). If the code is two dimensional, then it is encoded using the procedures established for MMR, above (FIG. 4) Step AF). At the conclusion of either of these procedures, at the end of a block, preferably six End of Line (EOL) codes are inserted into the bit stream as a trailer (Step AG).

Figures 7A, 7B, 7C:
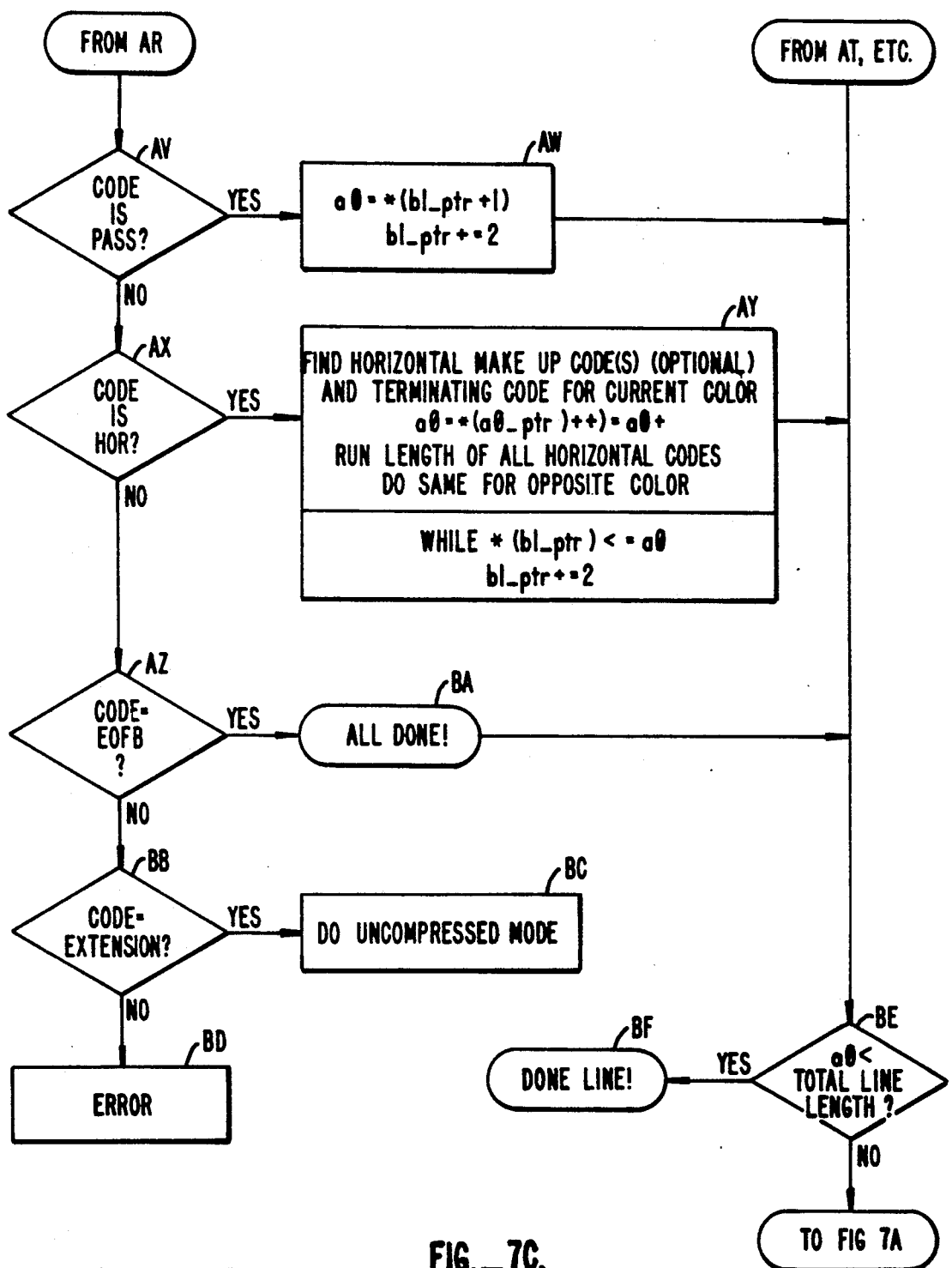
FIGS. 7A, 7B and 7C together are a flow chart of a process for converting MMR data into transition list data.

FIG. 7 shows the process for converting MMR to TL, also called decoding MMR. It may be compared with the process described in connection with FIG. 4, relating to encoding MMR. Using the previous conventions for symbols, The process is started (Step AH) and the various initial values and pointers are initialized, with the initial color being set to WHITE (Step AI). The process then enters a loop. The next step is to find, from the input data stream, the next two dimensional code which satisfies one of several criteria: VL3, VL2, VL1, V0, VR1, VR2, VRE3, HOR, PASS, EXTENSION or EOB (Step AJ). The codes are then tested. If the code is V0 (Step AK), the a0 value is initialized to a first value, as noted in the flow chart, the b1 pointer is incremented, and the colors are switched (Step AL) completing the coding phase. If the code is VLI through VL3 (Step AM), the a0 value is initialized to a second value, as noted in the flow chart and the colors are switched (Step AN). Thereafter the b1 pointer minus 1 is tested against the initial value a0 (Step AO) and the b1 pointer is either decremented (Step AP), or incremented (Step AQ) toward a value related to a0, as noted in the flow chart. This also completes the coding phase.

If the code is VR1 through VR3 (Step AR), the a0 value is initialized to a third value, as noted in the flow chart and the colors are switched (Step AS). Thereafter the b1 pointer is tested against the initial value a0 (Step AT) and the b1 pointer is either incremented by 2 (Step AU) or considered complete. This also completes the coding phase.

If the code is PASS (Step AV), the a0 value is initialized to a fourth value, the b1 pointer is incremented by 2 (Step AW), also completing the coding phase.

If the code is HOR for horizontal (Step AX), certain codes related to the horizontal coding are invoked. Optionally, the horizontal make-up codes are found, and then the terminating code for the current color is found. Thereafter, the a0 value is set as noted in FIG. 7 for both colors during a loop under which certain conditions are true (Step AY). This completes the horizontal portion of the coding phase.

If the code is an EOB (End of Block) code (Step AZ), the end of the sequence is noted (Step BA). This also completes the coding phase. If the code is an extension code (EXT) (Step BB), then the encoding executed is related to an optional uncompressed mode (Step BC). Absent any other valid code, the result is an error signal (Step BD).

At the end of every coding phase, the value ao is tested against the total line length (Step BE). If it is less, then the process is repeated from Step AJ. If it matches line length, then the line is done and coding is complete. The process returns the transition line suited to conversions to other coding schemes.

The Tables attached hereto provide details on one embodiment of the invention. Table A illustrates and outlines a procedure for implementing TL to MMR conversion. Table B provides detailed source code listing of the decoding and encoding processes in accordance with one embodiment of the invention.

The invention has now been explained with reference to specific embodiments. Other embodiments will be apparent to those of ordinary skill in this art. It is therefore not intended that this invention be limited, except as indicated by the appended claims.

TABLE A

TRANSITION LIST TO MMR PRODUCTION

Start with:

```
C=Ptr to Current Line TR
R=Ptr to Reference line TR
O=Ptr to Output MMR stream -- Segment;byte
                                     plus 16 bit
                                     A reg & X
```

CCITT model:

```
Ref Line        BBBBBBB------BBBBBB-------
                              B1^     B2^
Cur Line        BBBB-------BBBBBBBBBB-----
                AO^    A1^           A2^
```

MMR production rules:

C always set to point at A0 on current TL

R always set to point at B1 on reference TL

P is current pel count (sum of transitions) on cur. line.

A0 is pel ct to A0. (only dif from P after PASS)

B1 is cur pel ct on ref line.

Process:

Compute A1=P+[C+1] , B2=B1+[R+1]

If B2<A1 then PASS ::
        A0=B2 , R=R+2 , B1=B1+[R-1]+[R]
        Output PASS to MMR file
    If ABS(A1-B1)<4 then VERTICAL ::
        C=C+1 , A0=P=P+[C] , Output V(A1-B1),
        If A1-B1=0 then R=R+1 , B1=B1+[R]
        If A1-B1>0 then R=R+1 , B1=B1+[R],
                if B1<A1+1 then R=R+2,
                        B1=B1+[R-1]+[R]
        If A1-B1<0 then if B1-[R]>=A1+1 then R=R-1,
                            B1=B1-[R]
                          else R=R+1,
                            B1=B1+[R]

Else HORIZONTAL ::
        Output Horizontal code and W(A1-A0) and B([C+2])
            If A1-A0>63 then output makeup code
            Output X(A1-A0)
                where X=white if (Cst-C)mod4=2
                and X=black otherwise
            If [C+2]>63 then output makeup code
            Output X'([C+2]) where X'is opp X
    C=C+2 , A0=P=P+[C-1]+[C]
    while B1<=A0 then R=R+2 , B1=B1+[R-1]+[R]
        (repeat above until B1>A0)

Start of line:
    Start C=P=A0=0. If first code is Horizontal,
      use (A1-A0-1).
    Start R=1 and B1=[R].

End conditions:
    Each time R is advanced length should be checked.
        If R>=end then set B1 to page width+1.
    Each time C is advanced length should be checked.

If C>=end then page width+1 is used
for the position.
   This will occur when setting A1 or
   in Horizontal mode for [C+2].

Output--Bit Serial Conversion:
   Single 16 bit register used, ORing new codes in
      on the right and shifting left, storing the left
      byte from time to time.
   A length of previously stored bits (Xtra bits),
   x is kept. Codes being input which are over 8 bits
   long are merged in two parts, first the left,
   then the 8 bit right side.

Output Process:
   Given a code its length z and value L,R
   (left and right byte) are looked up. AT time
   averages 45 clocks/code Probability If z<=8 then ::
      if x>z then ::                                71.1%
                Shift z
                OR in R
                x=x-z
                Exit
      if x<z then ::                                16.1%
                Shift Left x
                Store left byte
                Shift left z-x
                OR in R
                x=8-z+x
                Exit
      if x=z then ::                                12.5%
                Shift x
                Store left byte
                OR in R
                x=8
                Exit
   If z>8 then y=z-x ,
      if x>y then ::                                .22%
                Shift y
                OR in L
                Goto RIGHTB
      if x<y then ::                                .04%
                Shift x

```
            Store left byte
            Shift y-x
            Or in L
            x=8-y+x
            Goto RIGHTB
if x=y then ::
            Shift x
            Store left byte
            Or in L
            x=8
            Goto RIGHTB
    RIGHTB:
            Shift x
            Store left byte
            Shift 8-x
            OR in R
            x=8-x
            Exit
```

6843A37.TXT

TABLE B

SOURCE LISTING

```
/************************************************************
*
*   Filename: %P%
*   Program/Library: TM300 SUPERVISOR TASK CONVERT LIBRARY for N25NG3
*   Function: decode_mmr_image()
*   Author: D. Hunt
*   Purpose: decode an mmr image line
*
*   Usage: rc = decode_mmr_image( con, ref_line, cur_line )
*   Arguments:  struct convert_struct *con;
*               short *ref_line;
*               short *cur_line;
*   Return: (short) CONVERT_NEED_MORE_INPUT == ran out of data
*                   CONVERT_LINE_DONE -- decoded a complete line
*                   CONVERT_EOFB_IN_INPUT -- done decoding image
*                   CONVERT_DECOMPRESSION_ERROR -- decompression error occurred
*   Abstract:
*
*   OS/Hardware Dependencies: TM300, MTOS
*   Notes / Side Effects:
*
*                       Modification History
*
*   Ref     Date        Changed By              Description
*   ===     ========    ==============          =========================================
*           4/21/88     D. Hunt                 Initial Coding.
*
*************************************************************
*                   Source Control System Information
*
*   What File:          %W%
*   Filename:           %P%
*   Version:            %I%,            Date:   %G%
*   Date Retrieved:     %H%
*
*************************************************************
* (C) COPYRIGHT 1988, NetExpress, Inc. All Rights Reserved.
*                   San Mateo, California.
*************************************************************/

/*----------------*/
/* include files */
/*----------------*/ include "supervisor/convert.h"
include "debug.h"

#include "codes.h"
#include "decode.h"
#include "state.h"

/*----------*/
/* defines */
/*----------*/

/*-------------------------------------------------------------------*/
/* define the internal states to indicate where to resume execution */
/* after re-filling the input buffer                                 */
/*-------------------------------------------------------------------*/

/* #define INIT_INPUT_STATE 0   ... is defined in state.h */
#define GET_2D_CODE_STATE           1
#define GET_HOR_CODE_1_STATE        2
#define GET_HOR_CODE_2_STATE        3
#define GET_EXTENSION_CODE_STATE    4
#define GET_UNCOMPR_CODE_STATE      5
```

```c
/*--------*/
/* macros */
/*--------*/

/*----------------------------------------------------------------*/
/* FILL_VALUE                                                     */
/* Macro to get the next byte from the input stream               */
/* It's optimized for the case where the function doesn't return. */
/* Input: State is the input function state to save.              */
/*        Label is the place to goto when we're called again.     */
/* Assumes: the con structure variable is set,                    */
/*        and all the other variables used below are properly set */
/* Returns: byte is filled with the next character from the input.*/
/* This macro is similar to the one in dMRMH.c                    */
/* except for some of the variables saved.                        */
/*----------------------------------------------------------------*/

/*dbg_printf(DBG_CONVERT,"[FILL *%lx=%x end=%lx val=%lx cnt=%d state=%d]\n", \*/
/*      buf_ptr, *buf_ptr & 0xFF, con->input.common.buf_end,\*/
/*      (value|(long)((*buf_ptr&0xFF))<<count), count, State );\*/ define FILL_VALUE( State, Label )                              \
{                                                               \
Label:                                                          \
   while ( buf_ptr >= con->input.common.buf_end )               \
   {                                                            \
      con->input.private.state = State;                         \
      con->input.private.unfinished_byte = value;               \
      con->input.private.unfinished_length = count;             \
      con->input.private.a0_ptr = a0_ptr;                       \
      con->input.private.b1_ptr = b1_ptr;                       \
      con->input.private.a0 = a0;                               \
      con->input.private.b1 = b1;                               \
      con->input.private.color = color;                         \
      con->input.private.total_run_length = total_run_length;   \
                                                                \
      return( CONVERT_NEED_MORE_INPUT );                        \
   }                                                            \
   value |= ( (long)( ( *(buf_ptr++) & 0xFF ) ) << count );     \
   count += 8;                                                  \
}

/*dbg_printf( DBG_CONVERT, "[END FILL *%lx=%x value=%lx count=%d]\n",\*/
/*      buf_ptr, *buf_ptr & 0xFF,\*/
/*      (value|(long)((*buf_ptr&0xFF))<<count), count+8 );\*/

/*--------------------*/
/* global variables */
/*--------------------*/ ifdef DEBUG
static char *tn[] = { "VL3", "VL2", "VL1", "V0", "VR1", "VR2", "VR3",
              "HOR", "PASS", "EXTENSION", "EOFB", "ERROR" );
endif /*--------------------*/
/* external functions */
/*--------------------*/ extern void make_blank_line_image();

/*------------*/
/* decode MMR */
/*------------*/ short decode_mmr_image( con, ref_line, cur_line )
   /*register*/ struct convert_struct *con;
   short *ref_line;
   short *cur_line;
{
#ifdef DEBUG
   char cs[80];
   extern char *bits2str();
endif
```

```c
    /*register*/ char *buf_ptr = con->input.common.buf_ptr;
    short line_length = con->input.common.line_length;

/*register*/ long  value = con->input.private.unfinished_byte;
    /*register*/ short count = con->input.private.unfinished_length;

/*register*/ short *a0_ptr = con->input.private.a0_ptr;
    /*register*/ short *b1_ptr = con->input.private.b1_ptr;

/*register*/ short a0 = con->input.private.a0;
    /*register*/ short b1 = con->input.private.b1;
    short color = con->input.private.color;
    short total_run_length = con->input.private.total_run_length;

/*register*/ short code_type;
    /*register*/ short masked_value;

short r1;
    short run_color;
    short run_length;
    short code_length;
    short not_done;

short rc;
/*------------------------------------*/
/* resume execution where we left off */
/*------------------------------------*/ switch( con->input.private.state )
    {
       case INIT_INPUT_STATE:
          goto INIT_INPUT_LABEL;

case GET_2D_CODE_STATE:
          goto GET_2D_CODE_LABEL;

case GET_HOR_CODE_1_STATE:
          goto GET_HOR_CODE_1_LABEL;

case GET_HOR_CODE_2_STATE:
          goto GET_HOR_CODE_2_LABEL;

case GET_EXTENSION_CODE_STATE:
          goto GET_EXTENSION_CODE_LABEL;

case GET_UNCOMPR_CODE_STATE:
          goto GET_UNCOMPR_CODE_LABEL;

default:
          pkill_tm300( "con:dMMR:%C%: input state error, state=%d",
             con->input.private.state );
    }
/*-----------------------------------------------------------*/
/* initialize variables used                                 */
/* if we're still in uncompressed mode, enter that loop      */
/*-----------------------------------------------------------*/

INIT_INPUT_LABEL:

#ifdef DEBUG
    dbg_printf( DBG_CONVERT, "Decode MMR line %d\n", con->input.private.lines );
endif a0_ptr = cur_line;
    b1_ptr = ref_line + 1;

*(a0_ptr++) = 0;

a0 = con->input.private.uncompr_indent;
    con->input.private.uncompr_indent = 0;
```

```c
    if ( con->input.private.uncompr_flag )
    {
       if ( color = con->input.private.uncompr_color )
       {
          *(a0_ptr++) = 0;          /* first pixel is black */
       } con->input.private.uncompr_next_run_color =
       con->input.private.uncompr_color          = 0;

goto DecodeUncompressedMode;
    }

/*-------------------------*/
/* compressed coding only */
/*-------------------------*/ if ( con->input.private.uncompr_color )
    {
       *(a0_ptr++) = 0;   /* first pixel is black */
       b1_ptr++;          /* first b1 must be white */
    }
    if ( con->input.private.uncompr_color !=
           ( color = con->input.private.uncompr_next_run_color ) )
    {
       *(a0_ptr++) = a0;
       b1_ptr++;
    } while ( *b1_ptr <= a0 )   /* find b1 */
    {
       b1_ptr += 2;
    } b1 = *b1_ptr;

con->input.private.uncompr_next_run_color =
    con->input.private.uncompr_color          = 0;

/*-----------------------------*/
/* loop for one entire line */
/*-----------------------------*/
    do
    {

/*------------------------------------------------------------*/
/* get the next 2 dimensional code                            */
/*------------------------------------------------------------*/

/*------------------------------------------------------------*/
/* we need at least 7 bits for the 2d code test */
/*------------------------------------------------------------*/
       if ( count < 7 )
       {
          FILL_VALUE( GET_2D_CODE_STATE, GET_2D_CODE_LABEL );
       }
/*-----------------------------------------------------------------*/
/* mask off the significant 7 bits to determine which 2d code it is */
/*-----------------------------------------------------------------*/
       code_type = value & 0x7F;      /* 7 bits */ code_length = G_tran_decode_2d_table[code_type].len;
       code_type = G_tran_decode_2d_table[code_type].code_type;
#ifdef DEBUG_CODING
       dbg_printf( DBG_CONVERT, "Decode %s=%s",
          bits2str( cs, value, code_length ), tn[code_type+3] );
endif
       count -= code_length;
       value >>= code_length;
```

```
/*------------------------------------------*/
/* process each 2d coding type separately */
/*------------------------------------------*/

/*-------------------------------------------------------*/
/* Vertical code -- indicate which one by code type itself */
/*-------------------------------------------------------*/

/*---------------------------------------------------------------*/
/* vertical types: - move a0 to -3..+3 under b1                  */
/* we've completed exactly one color                             */
/* if we're moving left or right, check to insure nothing funny happened */
/* For VL codes, make sure we're actually traveling right!       */
/*  (or if we're at the beginning of a line, we're still there   */
/*---------------------------------------------------------------*/ if ( code_type == VERTICAL_0_TYPE )   /* VERTICAL 0 */
          {
            color ^= 1;

*(a0_ptr++) = a0 = b1;

b1_ptr++;
            b1 = *b1_ptr;

#ifdef DEBUG_CODING
            dbg_printf( DBG_CONVERT, " a0=%d b1=%d", a0, b1 );
endif } /* end if VERTICAL 0 TYPE */ else if ( code_type < VERTICAL_0_TYPE ) /* VERTICAL LEFT 1-3 */
          {
            color ^= 1;

if ( b1 + code_type <= a0 )
              {
                if ( ( a0 != 0 ) || ( b1 + code_type < a0 ) )
                  {
#ifdef DEBUG
            dbg_printf( DBG_CONVERT, "\ndMMR: VL error vl=%d a0=%d b1=%d\n",
                    code_type, a0, b1 );
#endif
                    rc = CONVERT_DECOMPRESSION_ERROR;
                    goto ExitWithError;
                  }
              )

*(a0_ptr++) = a0 = b1 + code_type;

if ( *(b1_ptr-1) > a0 )
              {
                b1_ptr--;
                b1 = *b1_ptr;
              }
            else
              {
                b1_ptr++;
                b1 = *b1_ptr;
              } ifdef DEBUG_CODING
            dbg_printf( DBG_CONVERT, " a0=%d b1=%d", a0, b1 );
endif } /* end if VERTICAL LEFT TYPE */ else if ( code_type <= VERTICAL_RIGHT_3_TYPE )  /* VERTICAL RIGHT 1-3 */
          {
            color ^= 1;
```

```
            *(a0_ptr++) = a0 = b1 + code_type;

b1_ptr++;
            b1 = *b1_ptr;

if ( b1 <= a0 )
              {
                b1_ptr += 2;
                b1 = *b1_ptr;
              }
ifdef DEBUG_CODING
            dbg_printf( DBG_CONVERT, " a0=%d b1=%d", a0, b1 );
endif } /* end if VERTICAL RIGHT TYPE */

/*------------------------------------------*/
/* pass type - move a0 just under b2        */
/* we haven't completed the current run yet */
/*------------------------------------------*/ else if ( code_type == PASS_TYPE )
          {
            a0 = *(b1_ptr+1);
            b1_ptr += 2;
            b1 = *b1_ptr;

#ifdef DEBUG_CODING
            dbg_printf( DBG_CONVERT, " a0=%d b1=%d", a0, b1 );
endif } /* end if PASS TYPE */

/*------------------------------------------*/
/* horizontal code - move a0 to a2          */
/* get 2 run lengths from input stream      */
/* find the new b1                          */
/*------------------------------------------*/ else if ( code_type == HORIZONTAL_TYPE )
          {
ifdef DEBUG_CODING
          dbg_printf( DBG_CONVERT, " ( c=%d", color );
endif total_run_length = 0;
            do
              {
                while ( count < 13 )
                  {
                    FILL_VALUE( GET_HOR_CODE_1_STATE, GET_HOR_CODE_1_LABEL );
                  }
/*--------------------------------------------------------------------*/
/* Black run lengths                                                  */
/* check main table, then supplement table if code not found          */
/* this reduces a 2**13 entry table with 2**6 and 2**9 entry tables   */
/*--------------------------------------------------------------------*/
                if ( color )
                  {
                    masked_value = value & 63;
                    rl = G_tran_black_decode_table[masked_value].code_type;
                    code_length = G_tran_black_decode_table[masked_value].len;

if ( ( rl < 0 ) && ( code_length == 4 ) )
                      {
```

```
            masked_value = ( value >> 4 ) & 511;
            rl = G_tran_black_supplement_decode_table[masked_value].code_t
            code_length += G_tran_black_supplement_decode_table[masked_val
          }
        }
/*---------------------------------------------------------------*/
/* White run lengths                                             */
/* check main table, then supplement table if code not found     */
/* this reduces a 2**12 entry table with 2**9 and 2**4 entry tables */
/*---------------------------------------------------------------*/
        else
         {
           masked_value = value & 511;
           rl = G_tran_white_decode_table[masked_value].code_type;
           code_length = G_tran_white_decode_table[masked_value].len;

if ( ( rl < 0 ) && ( code_length == 8 ) )
            {
              masked_value = ( value >> 8 ) & 15;
              rl = G_tran_white_supplement_decode_table[masked_value].code_t
              code_length += G_tran_white_supplement_decode_table[masked_val
            }
         }
ifdef DEBUG_CODING
        dbg_printf( DBG_CONVERT, " %s [%d]",
            bits2str( cs, value, (rl>=0)?code_length:13 ), rl );
endif if ( rl < 0 )
         {
#ifdef DEBUG
           dbg_printf( DBG_CONVERT, "\nERROR- invalid RL code found\n" );
#endif
           rc = CONVERT_DECOMPRESSION_ERROR;
           goto ExitWithError;
         } total_run_length += rl;
        count -= code_length;
        value >>= code_length;
       }
      while ( rl >= 64 );

*(a0_ptr++) = a0 = a0 + total_run_length;

/*---------------------------------------------------------------*/
/* decode second run length code of opposite color */
/*---------------------------------------------------------------*/ ifdef DEBUG_CODING
        dbg_printf( DBG_CONVERT, " :" );
endif total_run_length = 0;

do
       {
         while ( count < 13 )
          {
            FILL_VALUE( GET_HOR_CODE_2_STATE, GET_HOR_CODE_2_LABEL );
          }

/*---------------------------------------------------------------*/
/* Black run lengths                                             */
/* remeber, we didn't change the color variable, so test is reversed */
/* check main table, then supplement table if code not found     */
/* this reduces a 2**13 entry table with 2**6 and 2**9 entry tables */
/*---------------------------------------------------------------*/
```

```c
        if ( !color )
          {
            masked_value = value & 63;
            rl = G_tran_black_decode_table[masked_value].code_type;
            code_length = G_tran_black_decode_table[masked_value].len;

if ( ( rl < 0 ) && ( code_length == 4 ) )
              {
                masked_value = ( value >> 4 ) & 511;
                rl = G_tran_black_supplement_decode_table[masked_value].code_t
                code_length += G_tran_black_supplement_decode_table[masked_val
              }
          )

/*---------------------------------------------------------------*/
/* White run lengths                                             */
/* check main table, then supplement table if code not found     */
/* this reduces a 2**12 entry table with 2**9 and 2**4 entry tables */
/*---------------------------------------------------------------*/ else
          {
            masked_value = value & 511;
            rl = G_tran_white_decode_table[masked_value].code_type;
            code_length = G_tran_white_decode_table[masked_value].len;

if ( ( rl < 0 ) && ( code_length == 8 ) )
              {
                masked_value = ( value >> 8 ) & 15;
                rl = G_tran_white_supplement_decode_table[masked_value].code_t
                code_length += G_tran_white_supplement_decode_table[masked_val
              }
          )

#ifdef DEBUG_CODING
        dbg_printf( DBG_CONVERT, " %s [%d]",
            bits2str( cs, value, (rl>=0)?code_length:13 ), rl );
endif if ( rl < 0 )
          {
#ifdef DEBUG
            dbg_printf( DBG_CONVERT, "\nERROR- invalid RL code found\n" );
#endif
            rc = CONVERT_DECOMPRESSION_ERROR;
            goto ExitWithError;
          } total_run_length += rl;
        count -= code_length;
        value >>= code_length;
      }
    while ( rl >= 64 );

#ifdef DEBUG_CODING
    dbg_printf( DBG_CONVERT, " )");
#endif

*(a0_ptr++) = a0 = a0 + total_run_length;

/* find the new B1 */
    if ( a0 < line_length )
      {
        while ( b1 <= a0 )
          {
            b1_ptr += 2;
            b1 = *b1_ptr;
          }
      }
```

```
#ifdef DEBUG_CODING
            dbg_printf( DBG_CONVERT, " a0=%d b1=%d", a0, b1 );
endif } /* end if HORIZONTAL TYPE */

/*---------------------------------------------------------------*/
/*                                                               */
/* eofb type -                                                   */
/* if we're at the beginning of a line, we've properly completed the file */
/* if not, a decoding error occurred                             */
/*---------------------------------------------------------------*/ else if ( code_type == EOFB_TYPE )
          {
            if ( a0 != 0 )
              {
#ifdef DEBUG
                dbg_printf( DBG_CONVERT, "\ndMMR: EOFB not at start of line\n" );
#endif
                rc = CONVERT_DECOMPRESSION_ERROR;
              }
            else
              {
                con->end_of_input_flag = 1;
                rc = CONVERT_EOFB_IN_INPUT;
              } goto ExitWithError;

} /* end if EOFB TYPE */

/*---------------------------------------------------------------*/
/* extension type - decode uncompressed mode til end of line     */
/*   or terminating uncompressed code.                           */
/*---------------------------------------------------------------*/ else if ( code_type == EXTENSION_TYPE )
          {
            if ( count < 3 )
              {
                FILL_VALUE( GET_EXTENSION_CODE_STATE, GET_EXTENSION_CODE_LABEL );
              } code_type = value & 0x07;
            value >>= 3;
            count -= 3;

#ifdef DEBUG_CODING
            dbg_printf( DBG_CONVERT, " %d", code_type );
endif if ( code_type != 7 )
              {
#ifdef DEBUG
                dbg_printf( DBG_CONVERT, "\ndMMR: Invalid EXTENSION code %d\n",
                    code_type );
#endif
                rc = CONVERT_DECOMPRESSION_ERROR;
                goto ExitWithError;
              }

/*---------------------------------------------------------------*/
/* decoding a new line in uncompressed mode entry point          */
/* the longest code is 12 bits and is translated in 2 parts      */
/*---------------------------------------------------------------*/
```

DecodeUncompressedMode:

```
            con->input.private.uncompr_flag = 1;
            not_done = 1;

do
            {
                while ( count < 12 )   /* get data for any terminating code too */
                {
                    FILL_VALUE( GET_UNCOMPR_CODE_STATE, GET_UNCOMPR_CODE_LABEL );
                    not_done = 1;
                } run_color = value & 1;
                masked_value = value & 0x3F;
                run_length =
                    G_tran_uncompressed_decode_table[ masked_value ].run_len;
                code_length =
                    G_tran_uncompressed_decode_table[ masked_value ].code_len;
#ifdef DEBUG_CODING
                dbg_printf( DBG_CONVERT, "UNCOMPR: rl=%d cl=%d color=%d '%s'",
                    run_length, code_length, run_color,
                    bits2str( cs, value, code_length ) );
endif
                count -= code_length;
                value >>= code_length;

if ( run_length <= 0 )      /* look up code in end table */
                {
                    not_done = 0;           /* found a terminating code */
                    con->input.private.uncompr_flag = 0;

masked_value = value & 0x3F;
                    run_length =
                        G_tran_uncompressed_decode_end_table[masked_value].run_len;
                    code_length =
                        G_tran_uncompressed_decode_end_table[masked_value].code_len;
                    con->input.private.uncompr_next_run_color =
                        G_tran_uncompressed_decode_end_table[masked_value].next_color;
#ifdef DEBUG_CODING
                    dbg_printf( DBG_CONVERT, " END CODE: rl=%d cl=%d '%s'",
                        run_length, code_length,
                        bits2str( cs, value, code_length ) );
endif
                    count -= code_length;
                    value >>= code_length;

} if ( run_length < 0 )   /* EOFB or ERROR code */
                {
                    if ( run_length != -1 )
                    {
#ifdef DEBUG
                        dbg_printf( DBG_CONVERT, "\ndMMR: bad run length %d\n", run_length );
#endif
                        rc = CONVERT_DECOMPRESSION_ERROR;
                    }
                    else
                    {
                        con->end_of_input_flag = 1;
                        rc = CONVERT_EOFB_IN_INPUT;
                    } goto ExitWithError;
                } if ( color != run_color )
                {
```

```
                    color = run_color;
                    *(a0_ptr++) = a0;
#ifdef DEBUG_CODING
                    dbg_printf( DBG_CONVERT, " TL(%d)", a0 );
#endif
                } if ( ( run_length + a0 ) >= line_length )
                {
                    con->input.private.uncompr_indent = run_length + a0 - line_length if ( con->input.private.uncompr_indent )
                        con->input.private.uncompr_color = run_color;
                    else
                        con->input.private.uncompr_color = 0;
#ifdef DEBUG_CODING
                    dbg_printf( DBG_CONVERT, " DONE! indent=%d", con->input.private.u
#endif
                    *(a0_ptr++) = a0 = line_length;

not_done = 0;
                }
                else /* line not completed */
                { a0 += run_length;

}
ifdef DEBUG_CODING
                dbg_printf( DBG_CONVERT, " new a0=%d\n", a0 );
endif } /* end do in uncompressed mode */
            while( not_done );

if ( a0 != line_length )          /* resume encoding this line */
            {
                if ( con->input.private.uncompr_next_run_color != color )
                {
                    *(a0_ptr++) = a0;
                }
                con->input.private.uncompr_next_run_color = 0;

if ( color )
                    b1_ptr = ref_line + 2;
                else
                    b1_ptr = ref_line + 1;

while ( *b1_ptr <= a0 )
                {
                    b1_ptr += 2;
                }
                b1 = *b1_ptr;
#ifdef DEBUG_CODING
                dbg_printf( DBG_CONVERT, "Continuing line in compressed mode a0=%d b
                    a0, b1 );
#endif
            }

} /* end of EXTENSION TYPE */

/*----------------------*/
/* decode error - stop */
/*----------------------*/
```

```
        else  /* MAJOR ERROR */
        {
#ifdef DEBUG
        dbg_printf( DBG_CONVERT, "\ndMMR: undefined type %d\n", code_type );
#endif
        rc = CONVERT_DECOMPRESSION_ERROR;
        goto ExitWithError;

}  /* end of ERROR */

/*--------------------------------*/
/* COMPLETED DECODING ELEMENT     */
/* are we done encoding the line? */
/*--------------------------------*/ ifdef DEBUG_CODING
        dbg_printf( DBG_CONVERT, "\n" );
#endif

}
    while ( a0 < line_length );  /* end while not done line */

/*-----------------*/
/* line too long? */
/*-----------------*/ if ( a0 > line_length )
        {
#ifdef DEBUG
        dbg_printf( DBG_CONVERT,
            "\ndMMR: ERROR-- line too long: len %d\n", a0 );
#endif
        rc = CONVERT_DECOMPRESSION_ERROR;
        goto ExitWithError;
        }

/*-----------------------------------------------------*/
/* duplicate the last element of the TL twice          */
/* to allow for 2 dimensional decoding to be optimized */
/*-----------------------------------------------------*/

*(a0_ptr+1) = *(a0_ptr) = line_length;

con->input.private.unfinished_byte = value;
    con->input.private.unfinished_length = count;
    con->input.common.buf_ptr = buf_ptr;
    con->input.private.state = INIT_INPUT_STATE;

return( CONVERT_LINE_DONE );

/*--------------------------------*/
/* An error occurred during decoding */
/* return the error and a blank line */
/*--------------------------------*/

ExitWithError:

make_blank_line_image( cur_line, line_length );

con->input.private.unfinished_byte = value;
    con->input.private.unfinished_length = count;
    con->input.common.buf_ptr = buf_ptr;
    con->input.private.state = -1;

return( rc );
}
```

```
/************************************************************************
*
*    Filename: %P%
*    Program/Library: TM300 SUPERVISOR TASK CONVERT LIBRARY for N25NG3
*    Function: decode_mr_mh_image()
*    Author: D. Hunt
*    Purpose: decode an mr or an mh image line
*
*    Usage: rc = decode_mr_mh_image( con, ref_line, cur_line )
*    Arguments:   struct convert_struct *con;
*                 short *ref_line;
*                 short *cur_line;
*    Return: (short) CONVERT_NEED_MORE_INPUT == ran out of data
*                    CONVERT_LINE_DONE -- decoded a complete line
*                    CONVERT_EOFB_IN_INPUT -- done decoding image
*    Abstract:
*
*    OS/Hardware Dependencies: TM300, MTOS
*    Notes / Side Effects:
*
*                             Modification History
*
*    Ref     Date       Changed By              Description
*    ===     ========   ===============         ===========================================
*            4/21/88    D. Hunt                 Initial Coding.
*
*************************************************************************
*                       Source Control System Information
*
*    What File:       %W%
*    Filename:        %P%
*    Version:         %I%,         Date:    %G%
*    Date Retrieved:  %H%
*
*************************************************************************
*    (c) COPYRIGHT 1988, NetExpress, Inc. All Rights Reserved.
*                       San Mateo, California.
*************************************************************************/

/*----------------*/
/* include files */
/*----------------*/ include "supervisor/convert.h"
include "debug.h"

#include "codes.h"
#include "decode.h"
#include "state.h"

/*---------*/
/* defines */
/*---------*/

/*-----------------------------------------------------------------------*/
/* define the internal states to indicate where to resume execution */
/* after re-filling the input buffer                                  */
/*-----------------------------------------------------------------------*/

/* #define INIT_INPUT_STATE 0  ... is defined in state.h */
#define GET_EOL_CODE_STATE              1
#define GET_EOL_PLUS_CODE_STATE         2
#define GET_UNCOMPR_CODE_STATE          3
#define GET_UNCOMPR_EXIT_CODE_STATE     4
#define GET_1D_HOR_CODE_STATE           5
#define GET_2D_CODE_STATE               6
#define GET_HOR_CODE_1_STATE            7
#define GET_HOR_CODE_2_STATE            8
#define GET_EXTENSION_CODE_STATE        9
#define GET_ERROR_CODE_STATE            10
```

```
/*--------*/
/* macros */
/*--------*/

/*--------------------------------------------------------------------*/
/* FILL_VALUE                                                         */
/* Macro to get the next byte from the input stream                   */
/* It's optimized for the case where the function doesn't  return.    */
/* Input: State is the input function state to save.                  */
/*        Label is the place to goto when we're called again.         */
/* Assumes: the con structure variable is set,                        */
/*          and all the other variables used below are properly set   */
/* Returns: byte is filled with the next character from the input.    */
/* This macro is similar to the one in dMMR.c                         */
/* except for some of the variables saved.                            */
/*--------------------------------------------------------------------*/

/*dbg_printf( DBG_CONVERT, "[FILL *%lx=%x end=%lx val=%lx cnt=%d state=%d]\n",\*
/*      buf_ptr, *buf_ptr & 0xFF, con->input.common.buf_end,\*/
/*      (value|(long)((*buf_ptr&0xFF))<<count), count, State );\*/ define FILL_VALUE( State, Label )                                       \
{                                                                        \
Label:                                                                   \
   while ( buf_ptr >= con->input.common.buf_end )                        \
      {                                                                  \
      con->input.private.state = State;                                  \
      con->input.private.unfinished_byte = value;                        \
      con->input.private.unfinished_length = count;                      \
      con->input.private.a0_ptr = a0_ptr;                                \
      con->input.private.b1_ptr = b1_ptr;                                \
      con->input.private.a0 = a0;                                        \
      con->input.private.b1 = b1;                                        \
      con->input.private.color = color;                                  \
      con->input.private.total_run_length = total_run_length;            \
      con->input.private.eol_flag = eol_flag;                            \ return( CONVERT_NEED_MORE_INPUT );                                 \
      }                                                                  \
   value |= ( (long)( ( *(buf_ptr++) & 0xFF ) ) << count );              \
   count += 8;                                                           \
}

/*dbg_printf( DBG_CONVERT, "[END FILL *%lx=%x value=%lx count=%d]\n",\*/
/*      buf_ptr, *buf_ptr & 0xFF,\*/
/*      (value|(long)((*buf_ptr&0xFF))<<count), count+8 );\*/

/*------------------*/
/* global variables */
/*------------------*/ ifdef DEBUG
static char *tn[] = { "VL3", "VL2", "VL1", "V0", "VR1", "VR2", "VR3",
                "HOR", "PASS", "EXTENSION", "EOFB", "ERROR" };
endif /*--------------------*/
/* external functions */
/*--------------------*/ extern void make_blank_line_image();

/*------------*/
/* decode MMR */
/*------------*/ short decode_mr_mh_image( con, ref_line, cur_line )
   /*register*/ struct convert_struct *con;
   short *ref_line;
   short *cur_line;
{
```

```c
#ifdef DEBUG
  char cs[80];
  extern char *bits2str();
endif

/*register*/ char *buf_ptr = con->input.common.buf_ptr;
  short line_length = con->input.common.line_length;

/*register*/ long  value = con->input.private.unfinished_byte;
  /*register*/ short count = con->input.private.unfinished_length;

/*register*/ short *a0_ptr = con->input.private.a0_ptr;
  /*register*/ short *b1_ptr = con->input.private.b1_ptr;

/*register*/ short a0 = con->input.private.a0;
  /*register*/ short b1 = con->input.private.b1;
  short color = con->input.private.color;
  short total_run_length = con->input.private.total_run_length;

short eol_flag = con->input.private.eol_flag;

/*register*/ short code_type;
  /*register*/ short masked_value;

short rl;
  short run_color;
  short run_length;
  short code_length;
  short not_done;

short rc;

/*------------------------------------*/
/* resume execution where we left off */
/*------------------------------------*/ switch( con->input.private.state )
     {
       case INIT_INPUT_STATE:
          goto INIT_INPUT_LABEL;

case GET_EOL_CODE_STATE:
          goto GET_EOL_CODE_LABEL;

case GET_EOL_PLUS_CODE_STATE:
          goto GET_EOL_PLUS_CODE_LABEL;
       case GET_1D_HOR_CODE_STATE:
          goto GET_1D_HOR_CODE_LABEL;

case GET_ERROR_CODE_STATE:
          goto GET_ERROR_CODE_LABEL;

case GET_EXTENSION_CODE_STATE:
          goto GET_EXTENSION_CODE_LABEL;

case GET_HOR_CODE_2_STATE:
          goto GET_HOR_CODE_2_LABEL;

case GET_HOR_CODE_1_STATE:
          goto GET_HOR_CODE_1_LABEL;

case GET_2D_CODE_STATE:
          goto GET_2D_CODE_LABEL;

case GET_UNCOMPR_CODE_STATE:
          goto GET_UNCOMPR_CODE_LABEL;

case GET_UNCOMPR_EXIT_CODE_STATE:
          goto GET_UNCOMPR_EXIT_CODE_LABEL;

default:
          pkill_tm300( "con:dMRMH:%C%: input state error, state=%d",
             con->input.private.state );
```

```
                            }
/*---------------------------------------------------------*/
/* initialize variables used                               */
/* if we're still in uncompressed mode, enter that loop    */
/*---------------------------------------------------------*/
INIT_INPUT_LABEL:

/*---------------------------------------------*/
/* initialize the new line to be decoded */
/*---------------------------------------------*/ a0_ptr = cur_line;
   *(a0_ptr++) = 0;
   a0 = 0;
   color = 0;

/*-----------------------------------------------------------------------*/
/*-------------------------- EOL handling -------------------------------*/
/*-----------------------------------------------------------------------*/ if ( con->input.private.eol_flag == 0 )
     {
       for(;;)
         {
           while ( count < EOL_LENGTH )
             {
               FILL_VALUE( GET_EOL_CODE_STATE, GET_EOL_CODE_LABEL );
             } if ( ( value & EOL_MASK ) == EOL_CODE )
             {
               count -= EOL_LENGTH;
               value >>= EOL_LENGTH;

break;        /* found it! */
             } if ( ( value & EOL_MASK ) != 0 )
               goto ERROR_LABEL;              /* oops */
/* remove 1 zero bit and try again */
           count--;
           value >>= 1;

} /* end forever searching for EOL */

} /* end if EOL needs to be found */ con->input.private.eol_flag = 0; /* need to find EOL for next line */

/*-----------------------------------------------------*/
/* start decoding the line                             */
/* if MR, determine if this line is coded 1D or 2D     */
/*-----------------------------------------------------*/ if ( con->input.common.coding_scheme == SCHEME_MR )
     {
       if ( count < 1 )
         {
           FILL_VALUE( GET_EOL_PLUS_CODE_STATE, GET_EOL_PLUS_CODE_LABEL );
         } con->input.private.one_dim_flag = value & 1;
ifdef DEBUG
       dbg_printf( DBG_CONVERT, "Decode MR line %d, %d dim coding\n",
           con->input.private.lines, 2-con->input.private.one_dim_flag );
#endif
```

```c
            count -= 1;
            value >>= 1;
        } else /* MH coding */
        {
        con->input.private.one_dim_flag = 1;

#ifdef DEBUG_CODING
        dbg_printf( DBG_CONVERT, "Decode MH line %d\n", con->input.private.lines )
#endif
        }
/*----------------------------------------------------------------------------*/
/*--------------------------- decoding uncompressed mode --------------------*/
/*----------------------------------------------------------------------------*/

/*----------------------------------------------------------------------------*/
/* uncompressed mode is the same for both 1d and 2d modes                    */
/* upon exit from uncompressed mode, enter back into the proper 1d or 2d mode */
/*----------------------------------------------------------------------------*/ if ( con->input.private.uncompr_flag )
        {
UNCOMPRESSED_MODE_LABEL:

con->input.private.uncompr_flag = 1;
        not_done = 1;

do
          {
            while ( count < 12 ) /* get data for any terminating code too */
              {
                FILL_VALUE( GET_UNCOMPR_CODE_STATE, GET_UNCOMPR_CODE_LABEL );
                not_done = 1;
              } run_color = value & 1;
            masked_value = value & 0x3F;
            run_length =
                G_tran_uncompressed_decode_table[ masked_value ].run_len;
            code_length =
                G_tran_uncompressed_decode_table[ masked_value ].code_len;

#ifdef DEBUG_CODING
            dbg_printf( DBG_CONVERT, "UNCOMPR: rl=%d cl=%d color=%d '%s'",
                run_length, code_length, run_color,
                bits2str( cs, value, code_length ) );
endif count -= code_length;
            value >>= code_length;

if ( run_length <= 0 ) /* look up code in end table */
              {
                not_done = 0;                /* found a terminating code */
                con->input.private.uncompr_flag = 0;

masked_value = value & 0x3F;
                run_length =
                    G_tran_uncompressed_decode_end_table[masked_value].run_len;
                code_length =
                    G_tran_uncompressed_decode_end_table[masked_value].code_len;
                con->input.private.uncompr_next_run_color =
                    G_tran_uncompressed_decode_end_table[masked_value].next_color;
#ifdef DEBUG_CODING
                dbg_printf( DBG_CONVERT, " END CODE: rl=%d cl=%d '%s'",
                    run_length, code_length,
                    bits2str( cs, value, code_length ) );
endif
```

```
              count -= code_length;
              value >>= code_length;
            } if ( run_length < 0 )   /* EOL or ERROR code */
            {
              if ( run_length != -1 )
                {
                }
              else /* EOL */
                {
                }
            } if ( color != run_color )
            {
              color = run_color;
              *(a0_ptr++) = a0;
#ifdef DEBUG_CODING
              dbg_printf( DBG_CONVERT, " TL(%d)", a0 );
#endif
            } if ( ( run_length + a0 ) >= line_length )
            {
              *(a0_ptr++) = a0 = line_length;
              not_done = 0;
            }
          else /* line not completed */
            {
              a0 += run_length;
            } ifdef DEBUG_CODING
          dbg_printf( DBG_CONVERT, " new a0=%d\n", a0 );
endif }
      while( not_done );  /* end do in uncompressed mode */
/*---------------------------------------------------------------*/
/* done line or resume back in compressed mode                   */
/* if done line and still in uncompressed mode, check for a      */
/* terminating 0 length code before an eol                       */
/*---------------------------------------------------------------*/ if ( a0 == line_length ) /* done line? */
        {
          if ( con->input.private.uncompr_flag ) /* still in uncompressed? */
            {
              if ( count < 8 ) /* get data for checking exit 0 length code */
                {
                  FILL_VALUE( GET_UNCOMPR_EXIT_CODE_STATE, GET_UNCOMPR_EXIT_CODE_LA
                }
/* code = 0000001T, where T= 0 or 1 for next run color (but doesn't matter) */
              if ( ( value & UNCOMPRESSED_EXIT_0_MASK ) == UNCOMPRESSED_EXIT_0_COD
                {
                  value >>= UNCOMPRESSED_EXIT_0_LENGTH;
                  count -= UNCOMPRESSED_EXIT_0_LENGTH;
                  con->input.private.uncompr_flag = 0;
                }
            } /* end if done line & still in uncompressed mode */
          goto DONE_LINE_LABEL;

} /* end if done line */
```

```
/*----------------------------------------------------------*/
/* if not done the line before exiting uncompressed mode, */
/* resume 1d or 2d coding                                  */
/*----------------------------------------------------------*/
        if ( con->input.private.uncompr_next_run_color != color )
          {
            *(a0_ptr++) = a0;
          }
        color = con->input.private.uncompr_next_run_color;

if ( con->input.private.one_dim_flag ) /* 1d coding? */
          {
ifdef DEBUG_CODING
            dbg_printf( DBG_CONVERT, "Continuing line in 1d compressed mode a0=%d,
                a0, color );
#endif
            goto RESUME_1D_CODING_LABEL;
          } else /* 2d coding -- fix up b1 */
          {
            if ( color )
              b1_ptr = ref_line + 2;
            else
              b1_ptr = ref_line + 1;

while ( *b1_ptr <= a0 )
              {
                b1_ptr += 2;
              }
            b1 = *b1_ptr;
#ifdef DEBUG_CODING
            dbg_printf( DBG_CONVERT, "Continuing in 2d compressed mode a0=%d b1=%d
                a0, b1, color );
#endif
            goto RESUME_2D_CODING_LABEL;
          } /* end if 2d coding */

} /* end if uncompressed mode */

/*----------------------------------------------------------*/
/*-------------------------- decoding MH / MR 1d ----------------------------*/
/*----------------------------------------------------------*/ else if ( con->input.private.one_dim_flag )
      {
        do
          {

RESUME_1D_CODING_LABEL:

#ifdef DEBUG_CODING
            dbg_printf( DBG_CONVERT, "GET 1D CODE c=%d, a0=%d", color, a0 );
endif total_run_length = 0;
            do
              {
                while ( count < 13 )
                  {
                    FILL_VALUE( GET_1D_HOR_CODE_STATE, GET_1D_HOR_CODE_LABEL );
                  }

/*----------------------------------------------------------*/
/* Black run lengths                                        */
/* check main table, then supplement table if code not found */
/* this reduces a 2**13 entry table with 2**6 and 2**9 entry tables */
/*----------------------------------------------------------*/
                if ( color )
                  {
```

```c
              masked_value = value & 63;
              rl = G_tran_black_decode_table[masked_value].code_type;
              code_length = G_tran_black_decode_table[masked_value].len;

if ( ( rl < 0 ) && ( code_length == 4 ) )
                {
                  masked_value = ( value >> 4 ) & 511;
                  rl = G_tran_black_supplement_decode_table[masked_value].code_t
                  code_length += G_tran_black_supplement_decode_table[masked_val
                }
            }
/*----------------------------------------------------------------*/
/* White run lengths                                              */
/* check main table, then supplement table if code not found      */
/* this reduces a 2**12 entry table with 2**9 and 2**4 entry tables */
/*----------------------------------------------------------------*/ else
            {
              masked_value = value & 511;
              rl = G_tran_white_decode_table[masked_value].code_type;
              code_length = G_tran_white_decode_table[masked_value].len;

if ( ( rl < 0 ) && ( code_length == 8 ) )
                {
                  masked_value = ( value >> 8 ) & 15;
                  rl = G_tran_white_supplement_decode_table[masked_value].code_t
                  code_length += G_tran_white_supplement_decode_table[masked_val
                }
            }
ifdef DEBUG_CODING
          dbg_printf( DBG_CONVERT, " %s [%d]",
              bits2str( cs, value, (rl>=0)?code_length:13 ), rl );
endif if ( rl < 0 )
            {
              if ( ( value & EOL_MASK ) == EOL_CODE )
                {
                  if ( a0 == 0 )
                    {
                      con->end_of_input_flag = 1;
                      con->input.private.unfinished_byte = value;
                      con->input.private.unfinished_length = count;
                      con->input.common.buf_ptr = buf_ptr;
                      con->input.private.state = -1;

return( CONVERT_EOFB_IN_INPUT );
                    }
                }
              else if ( ( value & UNCOMPRESSED_1D_EXTENSION_MASK )
                  == UNCOMPRESSED_1D_EXTENSION_CODE )
                {
                  count -= UNCOMPRESSED_1D_EXTENSION_LENGTH;
                  value >>= UNCOMPRESSED_1D_EXTENSION_LENGTH;
                  goto UNCOMPRESSED_MODE_LABEL;
                }
ifdef DEBUG_CODING
              dbg_printf( DBG_CONVERT, "\nERROR- invalid RL code found\n" );
#endif
              goto ERROR_LABEL;
            } total_run_length += rl;
          count -= code_length;
          value >>= code_length;
        }
      while ( rl >= 64 );
```

```
#ifdef DEBUG_CODING
        dbg_printf( DBG_CONVERT, "\n" );
#endif
        *(a0_ptr++) = a0 = a0 + total_run_length;
        color ^= 1;

}
    while ( a0 < line_length );

if ( a0 > line_length )
      {
        goto ERROR_LABEL;
      }

} /* end of 1d coding */

/*--------------------------------------------------------------------*/
/*------------------------ decoding MR 2d ----------------------------*/
/*--------------------------------------------------------------------*/ else /* one_dim_flag indicates 2d coding */
    {
      b1_ptr = ref_line + 1;

RESUME_2D_CODING_LABEL:

while ( *b1_ptr <= a0 )   /* find b1 */
        {
          b1_ptr += 2;
        } b1 = *b1_ptr;

/*----------------------------*/
/* loop for one entire line */
/*----------------------------*/ do
        {

/*--------------------------------------------------------------------*/
/* get the next 2 dimensional code                                    */
/*--------------------------------------------------------------------*/

/*--------------------------------------------------------------------*/
/* we need at least 7 bits for the 2d code test */
/*--------------------------------------------------------------------*/ if ( count < 7 )
            {
              FILL_VALUE( GET_2D_CODE_STATE, GET_2D_CODE_LABEL );
            }

/*--------------------------------------------------------------------*/
/* mask off the significant 7 bits to determine which 2d code it is */
/*--------------------------------------------------------------------*/ code_type = value & 0x7F;      /* 7 bits */ code_length = G_tran_decode_2d_table[code_type].len;
          code_type   = G_tran_decode_2d_table[code_type].code_type;

#ifdef DEBUG_CODING
          dbg_printf( DBG_CONVERT, "Decode %s=%s",
              bits2str( cs, value, code_length ), tn[code_type+3] );
endif count -= code_length;
          value >>= code_length;
```

```
/*--------------------------------------------*/
/* process each 2d coding type separately */
/*--------------------------------------------*/

/*--------------------------------------------------------*/
/* Vertical code -- indicate which one by code type itself */
/*--------------------------------------------------------*/

/*----------------------------------------------------------------------*/
/* vertical types: - move a0 to -3..+3 under b1                         */
/* we've completed exactly one color                                    */
/* if we're moving left or right, check to insure nothing funny happened */
/* For VL codes, make sure we're actually traveling right!              */
/*  (or if we're at the beginning of a line, we're still there          */
/*----------------------------------------------------------------------*/ if ( code_type == VERTICAL_0_TYPE )  /* VERTICAL 0 */
         {
           color ^= 1;

*(a0_ptr++) = a0 = b1;

b1_ptr++;
           b1 = *b1_ptr;

} /* end if VERTICAL 0 TYPE */ else if ( code_type < VERTICAL_0_TYPE ) /* VERTICAL LEFT 1-3 */
          {
            color ^= 1;

if ( b1 + code_type <= a0 )
              {
                if ( ( a0 != 0 ) || ( b1 + code_type < a0 ) )
                 {
ifdef DEBUG_CODING
                  dbg_printf( DBG_CONVERT, "\ndMMR: VL code error vl=%d, a0=%d b
                     code_type, a0, b1 );
#endif
                  goto ERROR_LABEL;
                 }
              }

*(a0_ptr++) = a0 = b1 + code_type;

if ( *(b1_ptr-1) > a0 )
              {
                b1_ptr--;
                b1 = *b1_ptr;
              }
            else
              {
                b1_ptr++;
                b1 = *b1_ptr;
              }
          } /* end if VERTICAL LEFT TYPE */ else if ( code_type <= VERTICAL_RIGHT_3_TYPE )  /* VERT RIGHT 1-3 */
          {
            color ^= 1;

*(a0_ptr++) = a0 = b1 + code_type;

b1_ptr++;
            b1 = *b1_ptr;

if ( b1 <= a0 )
              {
                b1_ptr += 2;
                b1 = *b1_ptr;
              }
          } /* end if VERTICAL RIGHT TYPE */
```

```
/*----------------------------------------------*/
/* pass type - move a0 just under b2            */
/* we haven't completed the current run yet     */
/*----------------------------------------------*/
          else if ( code_type == PASS_TYPE )
            {
              a0 = *(b1_ptr+1);
              b1_ptr += 2;
              b1 = *b1_ptr;

} /* end if PASS TYPE */

/*----------------------------------------------*/
/* horizontal code - move a0 to a2              */
/* get 2 run lengths from input stream          */
/* find the new b1                              */
/*----------------------------------------------*/
          else if ( code_type == HORIZONTAL_TYPE )
            { ifdef DEBUG_CODING
              dbg_printf( DBG_CONVERT, " ( c=%d", color );
endif total_run_length = 0;
              do
                {
                  while ( count < 13 )
                    {
                      FILL_VALUE( GET_HOR_CODE_1_STATE, GET_HOR_CODE_1_LABEL );
                    }

/*---------------------------------------------------------------------*/
/* Black run lengths                                                   */
/* check main table, then supplement table if code not found           */
/* this reduces a 2**13 entry table with 2**6 and 2**9 entry tables    */
/*---------------------------------------------------------------------*/
                  if ( color )
                    {
                      masked_value = value & 63;
                      rl = G_tran_black_decode_table[masked_value].code_type;
                      code_length = G_tran_black_decode_table[masked_value].len;

if ( ( rl < 0 ) && ( code_length == 4 ) )
                        {
                          masked_value = ( value >> 4 ) & 511;
                          rl = G_tran_black_supplement_decode_table[masked_value].cod
                          code_length += G_tran_black_supplement_decode_table[masked_
                        }
                    }

/*---------------------------------------------------------------------*/
/* White run lengths                                                   */
/* check main table, then supplement table if code not found           */
/* this reduces a 2**12 entry table with 2**9 and 2**4 entry tables    */
/*---------------------------------------------------------------------*/
                  else
                    {
                      masked_value = value & 511;
                      rl = G_tran_white_decode_table[masked_value].code_type;
                      code_length = G_tran_white_decode_table[masked_value].len;

if ( ( rl < 0 ) && ( code_length == 8 ) )
                        {
                          masked_value = ( value >> 8 ) & 15;
                          rl = G_tran_white_supplement_decode_table[masked_value].cod
                          code_length += G_tran_white_supplement_decode_table[masked_
                        }
                    } ifdef DEBUG_CODING
```

```
                    dbg_printf( DBG_CONVERT, " %s [%d]",
                        bits2str( cs, value, (rl>=0)?code_length:13 ), rl );
endif if ( rl < 0 )
                {
ifdef DEBUG_CODING
                    dbg_printf( DBG_CONVERT, "\nERROR- invalid RL code found\n" );
#endif
                    goto ERROR_LABEL;
                } total_run_length += rl;
                count -= code_length;
                value >>= code_length;
            }
            while ( rl >= 64 );

*(a0_ptr++) = a0 = a0 + total_run_length;

/*--------------------------------------------------------------*/
/* decode second run length code of opposite color */
/*--------------------------------------------------------------*/ ifdef DEBUG_CODING
            dbg_printf( DBG_CONVERT, " :" );
endif total_run_length = 0;

do
            {
                while ( count < 13 )
                {
                    FILL_VALUE( GET_HOR_CODE_2_STATE, GET_HOR_CODE_2_LABEL );
                }

/*--------------------------------------------------------------*/
/* Black run lengths                                            */
/* remeber, we didn't change the color variable, so test is reversed */
/* check main table, then supplement table if code not found    */
/* this reduces a 2**13 entry table with 2**6 and 2**9 entry tables */
/*--------------------------------------------------------------*/ if ( !color )
                {
                    masked_value = value & 63;
                    rl = G_tran_black_decode_table[masked_value].code_type;
                    code_length = G_tran_black_decode_table[masked_value].len;

if ( ( rl < 0 ) && ( code_length == 4 ) )
                    {
                        masked_value = ( value >> 4 ) & 511;
                        rl = G_tran_black_supplement_decode_table[masked_value].cod
                        code_length += G_tran_black_supplement_decode_table[masked_
                    }
                }

/*--------------------------------------------------------------*/
/* White run lengths                                            */
/* check main table, then supplement table if code not found    */
/* this reduces a 2**12 entry table with 2**9 and 2**4 entry tables */
/*--------------------------------------------------------------*/ else
                {
                    masked_value = value & 511;
                    rl = G_tran_white_decode_table[masked_value].code_type;
                    code_length = G_tran_white_decode_table[masked_value].len;

if ( ( rl < 0 ) && ( code_length == 8 ) )
                    {
```

```c
                    masked_value = ( value >> 8 ) & 15;
                    rl = G_tran_white_supplement_decode_table[masked_value].cod
                    code_length += G_tran_white_supplement_decode_table[masked_
                }
            }
ifdef DEBUG_CODING
            dbg_printf( DBG_CONVERT, " %s [%d]",
                bits2str( cs, value, (rl>=0)?code_length:13 ), rl );
endif if ( rl < 0 )
            {
ifdef DEBUG_CODING
                dbg_printf( DBG_CONVERT, "\nERROR- invalid RL code found\n" );
#endif
                goto ERROR_LABEL;
            } total_run_length += rl;
            count -= code_length;
            value >>= code_length;
        }
        while ( rl >= 64 );

#ifdef DEBUG_CODING
        dbg_printf( DBG_CONVERT, " )");
#endif

*(a0_ptr++) = a0 = a0 + total_run_length;

/* find the new B1 */
        if ( a0 < line_length )
        {
            while ( b1 <= a0 )
            {
                b1_ptr += 2;
                b1 = *b1_ptr;
            }
        }

} /* end if HORIZONTAL TYPE */

/*----------------------------------------------------------------*/
/* extension type - decode uncompressed mode til end of line      */
/*   or terminating uncompressed code.                            */
/*----------------------------------------------------------------*/
        else if ( code_type == EXTENSION_TYPE )
        {
            if ( count < 3 )
            {
                FILL_VALUE( GET_EXTENSION_CODE_STATE, GET_EXTENSION_CODE_LABEL );
            } code_type = value & 0x07;
            value >>= 3;
            count -= 3;

#ifdef DEBUG_CODING
            dbg_printf( DBG_CONVERT, " %d", code_type );
endif if ( code_type != 7 )
            {
ifdef DEBUG_CODING
                dbg_printf( DBG_CONVERT, "\ndMMR: Invalid EXTENSION code %d\n", c
#endif
                goto ERROR_LABEL;
```

```c
            }
            goto UNCOMPRESSED_MODE_LABEL;

} /* end extension type */

/*----------------------------------*/
/* eofb or error type -          */
/* a decoding error occurred    */
/*----------------------------------*/ else
        {
ifdef DEBUG_CODING
            dbg_printf( DBG_CONVERT, "\ndMMR: EOL or ERROR in the middle of a li
#endif
            goto ERROR_LABEL;

} /* end if EOFB or error TYPE */ ifdef DEBUG_CODING
        dbg_printf( DBG_CONVERT, "\n" );
#endif

}
    while ( a0 < line_length );  /* end do for entire line */

} /* end of 2d coding */

/*--------------------------------------------------------------------*/
/*---------------------- done line handling --------------------------*/
/*--------------------------------------------------------------------*/

/*----------------------------------------------------*/
/* all done the line -- return back to init state */
/*----------------------------------------------------*/

DONE_LINE_LABEL:

*(a0_ptr+1) = *(a0_ptr) = line_length;

con->input.private.unfinished_byte = value;
    con->input.private.unfinished_length = count;
    con->input.common.buf_ptr = buf_ptr;
    con->input.private.state = INIT_INPUT_STATE;

return( CONVERT_LINE_DONE );

/*--------------------------------------------------------------------*/
/*---------------------- ERROR handling ------------------------------*/
/*--------------------------------------------------------------------*/

/*------------------------------------------------------*/
/* come here after a decompression error              */
/* this will find a proper EOL to re-align the decoding */
/*------------------------------------------------------*/

ERROR_LABEL:

for(;;)
    {
        while ( count < EOL_LENGTH )
        {
            FILL_VALUE( GET_ERROR_CODE_STATE, GET_ERROR_CODE_LABEL );
        } if ( ( value & EOL_MASK ) == EOL_CODE )
        {
            count -= EOL_LENGTH;
            value >>= EOL_LENGTH;

break; /* found it! */
```

```
        }
    /* remove 1 zero bit and try again */
        count--;
        value >>= 1;
    }  /* end forever searching for EOL */
/*----------------------*/
/* fix the decoded line */
/*----------------------*/
    if ( *(a0_ptr-1) > line_length )
        *(a0_ptr-1) = line_length;
    *(a0_ptr+2) = *(a0_ptr+1) = *(a0_ptr) = line_length;

/*--------------------------------------------------*/
/* all done the line -- return back to init state */
/*--------------------------------------------------*/
    con->input.private.conversion_errors++;

con->input.private.uncompr_flag = 0;        /* assume compressed! */
    con->input.private.eol_flag = 1;            /* found an EOL */ con->input.private.unfinished_byte = value;
    con->input.private.unfinished_length = count;
    con->input.common.buf_ptr = buf_ptr;
    con->input.private.state = INIT_INPUT_STATE;

return( CONVERT_LINE_DONE );

}
```

```
/****************************************************************
 *
 *   Filename: %P%
 *   Program/Library: TM300 SUPERVISOR TASK CONVERT LIBRARY for N25NG3
 *   Function: encode_mh_image()
 *   Author: D. Hunt
 *   Purpose: encode tl to MH or MR 1d
 *
 *   Usage: encode_mh_image( con, ref_line, cur_line )
 *   Arguments: struct convert_struct *con;
 *              short *ref_line;
 *              short *cur_line;
 *   Return: (short) CONVERT_OK
 *   Abstract: convert transition list to MH or MR 1 dimensional coding.
 *
 *   OS/Hardware Dependencies: TM300, MTOS
 *   Notes / Side Effects:
 *
 *                           Modification History
 *
 *  Ref    Date        Changed By                Description
 *  ===    ========    ===============    =====================================
 *         4/21/88     D. Hunt            Initial Coding.
 *
 ****************************************************************
 *                    Source Control System Information
 *
 *  What File:         %W%
 *  Filename:          %P%
 *  Version:           %I%,           Date:    %G%
 *  Date Retrieved:    %H%
 *
 ****************************************************************
 * (c) COPYRIGHT 1988, NetExpress, Inc. All Rights Reserved.
 *                    San Mateo, California.
 ****************************************************************/

/*---------------*/
/* include files */
/*---------------*/ include "supervisor/convert.h"
include "debug.h"

#include "codes.h"
#include "macros.h"

/*---------*/
/* globals */
/*---------*/ extern short *G_tran_hor_terminating_code_table[];
extern short *G_tran_hor_terminating_length_table[];

extern short *G_tran_hor_make_up_code_table[];
extern short *G_tran_hor_make_up_length_table[];

extern short G_tran_uncompressed_black_code_table[];

/*--------------------*/
/* external functions */
/*--------------------*/ extern void pkill_tm300();

/*------------------------------*/
/* encode MH & MR 1 dimensional */
/*------------------------------*/ short encode_mh_image( con, ref_line, cur_line )
  struct convert_struct *con;
  short *ref_line;
  short *cur_line;
{
```

```
#ifdef DEBUG
  char cs[80];
  extern char *bits2str();
endif

/*register*/ short *cur = cur_line;
  short color = 0;
  short line_length = con->output.common.line_length;
  short len;             /* current run length */
  short position = 0;
  short run_length;

/*register*/ long value = con->output.private.unfinished_byte;
  /*register*/ long count = con->output.private.unfinished_length;
  /*register*/ char *buf_ptr = con->output.common.buf_ptr;
  char *end_ptr;

end_ptr = buf_ptr + con->output.common.min_byte_count;

/*-------------------------------------------*/
/* insert EOL code at beginning of the line */
/*-------------------------------------------*/ if ( con->output.common.coding_scheme == SCHEME_MH )
    {
#ifdef DEBUG
      dbg_printf( DBG_CONVERT, "ENCODE MH line %d: EOL '%s'\n",
        con->output.private.lines,
          bits2str( cs, (long) EOL_CODE, EOL_LENGTH ) );
#endif
      INSERT_BIT_STRING( buf_ptr, value, count, EOL_CODE, EOL_LENGTH );
    } else /* coding_scheme == MR */
    {
#ifdef DEBUG
      dbg_printf( DBG_CONVERT, "ENCODE MR 1D line %d: EOL '%s'\n",
        con->output.private.lines,
          bits2str( cs, (long) EOL_1D_CODE, EOL_1D_LENGTH ));
#endif
      INSERT_BIT_STRING( buf_ptr, value, count, EOL_1D_CODE, EOL_1D_LENGTH );
    }

/*-------------------------------------------------*/
/* main loop - encode until we reach line_length */
/*-------------------------------------------------*/
    do
    {
      len = *(++cur) - position;
      position = *cur;

while ( len > 2560 )
      {
ifdef DEBUG_CODING
        dbg_printf( DBG_CONVERT, " HOR-MU (2560) '%s'", bits2str( cs,
          (long) G_tran_hor_make_up_code_table[color][(2560>>6)-1],
          G_tran_hor_make_up_length_table[color][(2560>>6)-1] ) );
#endif
        INSERT_BIT_STRING( buf_ptr, value, count,
          G_tran_hor_make_up_code_table[color][(2560>>6)-1],
          G_tran_hor_make_up_length_table[color][(2560>>6)-1] );

len -= 2560;
      } if ( len > 63 )
      {
ifdef DEBUG_CODING
        dbg_printf( DBG_CONVERT, " HOR-MU (%d) '%s'", len, bits2str( cs,
          (long) G_tran_hor_make_up_code_table[color][(len>>6)-1],
          G_tran_hor_make_up_length_table[color][(len>>6)-1] ) );
```

```c
#endif
        INSERT_BIT_STRING( buf_ptr, value, count,
            G_tran_hor_make_up_code_table[color][(len>>6)-1],
            G_tran_hor_make_up_length_table[color][(len>>6)-1] );
        len &= 63;
        }
ifdef DEBUG_CODING
        dbg_printf( DBG_CONVERT, " HOR (c=%d) (%d to %d) '%s'\n",
            color, len, position, bits2str( cs,
                (long) G_tran_hor_terminating_code_table[color][len],
                G_tran_hor_terminating_length_table[color][len] ) );
#endif
        INSERT_BIT_STRING( buf_ptr, value, count,
            G_tran_hor_terminating_code_table[color][len],
            G_tran_hor_terminating_length_table[color][len] );

color = 1 - color;
        }
    while ( position < line_length );

/*------------------------------------------------*/
/* check if this line should be in uncompressed mode */
/*------------------------------------------------*/

/*--------------------------------------------------------*/
/* All done the line using 1D coding.                     */
/* If 1D coding actually expanded the code,               */
/* Recompress the line using the uncompressed extension.  */
/* The limit on the line is 1.0625x the line length + overhead. */

/* since it is fast is a reasonable limit on the compression size. */
/* Remember to delete the 1D coding for the line just peformed.    */
/*--------------------------------------------------------*/ if ( con->output.common.uncompressed_mode_flag &&
        ( ( ( ( buf_ptr - con->output.common.buf_ptr ) << 3 )
            + count - con->output.private.unfinished_length )
        > ( ( line_length + ( line_length >> 4 ) )
            + ( con->output.private.uncompr_flag ? 0 :
            ( UNCOMPRESSED_EXTENSION_LENGTH + UNCOMPRESSED_EXIT_0_LENGTH ) ) ) ) )
        { ifdef DEBUG_CODING
        dbg_printf( DBG_CONVERT,  "Coding line in Uncompressed mode: compr_len=%d,
            ( ( buf_ptr - con->output.common.buf_ptr ) << 3 )
            + count - con->output.private.unfinished_length,
            ( line_length ) + ( line_length >> 4 )
            + ( UNCOMPRESSED_EXTENSION_LENGTH + UNCOMPRESSED_EXIT_0_LENGTH ) );
endif /*------------------------------------------------*/
/* Re-initialize the variables needed for         */
/* encoding a line in the uncompressed mode       */
/*------------------------------------------------*/ cur = cur_line + 1;

color = 0;

value   = con->output.private.unfinished_byte;
        count   = con->output.private.unfinished_length;
        buf_ptr = con->output.common.buf_ptr;

/*------------------------------------------------*/
/* re-insert the MH/MR 1d header code             */
/*------------------------------------------------*/ if ( con->output.common.coding_scheme == SCHEME_MH )
            {
ifdef DEBUG_CODING
            dbg_printf( DBG_CONVERT, " EOL '%s'\n", bits2str( cs, (long) EOL_CODE,
#endif
```

```
            INSERT_BIT_STRING( buf_ptr, value, count, EOL_CODE, EOL_LENGTH );
    } else /* coding_scheme == MR */
         {
ifdef DEBUG_CODING
         dbg_printf( DBG_CONVERT, " EOL '%s'\n", bits2str( cs, (long)
            EOL_1D_CODE, EOL_1D_LENGTH ));
#endif
         INSERT_BIT_STRING( buf_ptr, value, count, EOL_1D_CODE, EOL_1D_LENGTH );
         }

/*-----------------------------------------------------------*/
/* Insert the Uncompressed Mode Extension String             */
/* only if we were not already in the uncompressed mode.     */
/* if we already were in uncompressed, complete the last     */
/* string if there was any extra left over.                  */
/* (For white, add it to the first white run length).        */
/*-----------------------------------------------------------*/ ifdef DEBUG_CODING
      dbg_printf( DBG_CONVERT, "Enter Uncompressed mode '%s'\n", bits2str( cs,
         UNCOMPRESSED_1D_EXTENSION_CODE, UNCOMPRESSED_1D_EXTENSION_LENGTH ) );
#endif
      INSERT_BIT_STRING( buf_ptr, value, count,
         UNCOMPRESSED_1D_EXTENSION_CODE, UNCOMPRESSED_1D_EXTENSION_LENGTH );

/*-----------------------------------------------------------*/
/* Insert White and Black Runs.                              */
/* We'll break out of the loop when the line is completed.   */
/* And we'll also exit the uncompressed mode.                */
/*-----------------------------------------------------------*/ for (;;)
         {

/*-----------------------------------------------------------*/
/* White Run.                                                */
/* Insert a '1' between every 5 '0's in a row.               */
/*   This should be done very few times                      */
/*   since we're doing uncompressed mode.                    */
/* On the first run (if white), insert any remaining run     */
/*   left over from the last line encoded.                   */
/* At the end of the string,                                 */
/*   leave the remaining bits left over in the white         */
/*   run to be picked up next pass. This optimizes           */
/*   the entering & leaving of uncompressed mode.            */
/* Don't exit uncompressed mode until next pass.             */
/*   Coding exit mode is easy since all terminating codes    */
/*   = last white code + Terminating 0 Length code.          */
/*   (See the T.6 reccommendation).                          */
/*-----------------------------------------------------------*/ run_length = *(cur) - *(cur - 1);

while ( run_length >= 5 )
            {
ifdef DEBUG_CODING
            dbg_printf( DBG_CONVERT, " WHITE '%s'\n", bits2str( cs,
               UNCOMPRESSED_WHITE_5_CODE, UNCOMPRESSED_WHITE_5_LENGTH ) );
#endif
            INSERT_BIT_STRING( buf_ptr, value, count,
               UNCOMPRESSED_WHITE_5_CODE, UNCOMPRESSED_WHITE_5_LENGTH );

run_length -= 5;
            } if ( run_length != 0 )
            {
ifdef DEBUG_CODING
```

```c
            dbg_printf( DBG_CONVERT, " WHITE '%s'\n", bits2str( cs,
                UNCOMPRESSED_WHITE_CODE, run_length ) );
#endif
            INSERT_BIT_STRING( buf_ptr, value, count,
                UNCOMPRESSED_WHITE_CODE, run_length );
        } if ( *cur == line_length ) /* always fill up white to end */
        {
            break;              /*!!! all done line !!!*/
        } cur++;

/*--------------------------------------------*/
/* Black Run.                                 */
/* Insert '1's for entire black run.          */
/* If we reach the end of the string,         */
/*   Exit uncompressed mode with              */
/*   a white terminating code, run length 0.  */
/*--------------------------------------------*/ run_length = *(cur) - *(cur - 1);

while ( run_length >= 16 )
        {
ifdef DEBUG_CODING
            dbg_printf( DBG_CONVERT, " BLACK '%s'\n", bits2str( cs,
                UNCOMPRESSED_BLACK_16_CODE, UNCOMPRESSED_BLACK_16_LENGTH ) );
#endif
            INSERT_BIT_STRING( buf_ptr, value, count,
                UNCOMPRESSED_BLACK_16_CODE, UNCOMPRESSED_BLACK_16_LENGTH );

run_length -= 16;
        } if ( run_length != 0 )
        {
ifdef DEBUG_CODING
            dbg_printf( DBG_CONVERT, " BLACK '%s'\n", bits2str( cs,
                G_tran_uncompressed_black_code_table[run_length], run_length ) );
#endif
            INSERT_BIT_STRING( buf_ptr, value, count,
                G_tran_uncompressed_black_code_table[run_length], run_length );
        } if ( *cur == line_length ) /* always fill up black to end */
        {
            break;              /*!!! all done line !!!*/
        } cur++;

} /* end forever loop peforming uncompressed mode */

/* exit uncompressed mode */
/*------------------------*/ ifdef DEBUG_CODING
    dbg_printf( DBG_CONVERT, "Exiting Uncompressed Mode '%s'\n", bits2str( cs,
        UNCOMPRESSED_EXIT_0_CODE, UNCOMPRESSED_EXIT_0_LENGTH ) );
endif
    INSERT_BIT_STRING( buf_ptr, value, count,
        UNCOMPRESSED_EXIT_0_CODE, UNCOMPRESSED_EXIT_0_LENGTH );

} /* end if uncompressed mode */

/*----------------------------------------------------------------*/
/* pad the line with fill characters (0) until minimum length met */
/*----------------------------------------------------------------*/
```

```c
    if ( count != 0 )
    {
      PUT_BYTE( buf_ptr, value );
    }

PUT_BYTE( buf_ptr, 0 );

while( buf_ptr < end_ptr )
    {
      PUT_BYTE( buf_ptr, 0 );
    }

/*---------------------------------------------------------------------*/
/* save the current buffer pointer, and indicate no bytes are unfinished */
/* since any partial bytes were stored anyway                          */
/*---------------------------------------------------------------------*/ con->output.private.unfinished_byte = 0;
    con->output.private.unfinished_length = 0;
    con->output.common.buf_ptr = buf_ptr;

/*---------------------------------------------------------------------*/
/* if the line was invalid, the library has a bug! */
/*---------------------------------------------------------------------*/ if ( position != line_length )
        pkill_tm300( "con:eMH:%C%: encode error, line_length=%d tl=%d",
            line_length, position );

return( CONVERT_OK );
}

/************************************************************************
*
*   Filename: %P%
*   Program/Library: TM300 SUPERVISOR TASK CONVERT LIBRARY for N25NG3
*   Function: encode_mmr_image()
*   Author: D. Hunt
*   Purpose: encode an entire transition list line to the output buffer.
*            encode to MMR and MR 2d lines.
*
*   Usage: rc = encode_mmr_image( con, ref_line, cur_line )
*   Arguments:  struct convert_struct *con;
*               short *ref_line;            reference transition list line
*               short *cur_line;            current transition list line
*   Return: (short) CONVERT_xxx -- normally CONVERT_OK.
*   Abstract:
*
*   OS/Hardware Dependencies: TM300, MTOS
*   Notes / Side Effects:
*
*                       Modification History
*
*   Ref    Date        Changed By              Description
*   ===    ========    ==============   =============================
*          4/21/88     D. Hunt          Initial Coding.
*
*************************************************************************
*                    Source Control System Information
*
*   What File:          %W%
*   Filename:           %P%
*   Version:            %I%,            Date:   %G%
*   Date Retrieved:     %H%
*
*************************************************************************
*   (c) COPYRIGHT 1988, NetExpress, Inc. All Rights Reserved.
*                       San Mateo, California.
*************************************************************************/

/*-----------------*/
/* include files */
/*-----------------*/
```

```c
#include "supervisor/convert.h"
include "debug.h"

#include "codes.h"
#include "macros.h"

/*---------*/
/* globals */
/*---------*/ extern short *G_tran_hor_terminating_code_table[];
extern short *G_tran_hor_terminating_length_table[];

extern short *G_tran_hor_make_up_code_table[];

extern short *G_tran_hor_make_up_length_table[];

extern short G_tran_vertical_code_table[];
extern short G_tran_vertical_length_table[];

extern short G_tran_uncompressed_black_code_table[];
/*------------*/
/* encode MMR */
/*------------*/ short encode_mmr_image( con, ref_line, cur_line )
  struct convert_struct *con;
  short *ref_line;                    /* 2d reference line */
  short *cur_line;                    /* line to encode */
{
#ifdef DEBUG
  char cs[80];
  extern char *bits2str();
endif /*register*/ short *cur = cur_line;
  /*register*/ short *ref = ref_line;

/*register*/ short a0 = 0;
  /*register*/ short a1 = *(++cur);
  /*register*/ short b1 = *(++ref);

short line_length = con->output.common.line_length;
  short color = 0;
  short len;
  short left_over;

/*register*/ long value = con->output.private.unfinished_byte;
  /*register*/ short count = con->output.private.unfinished_length;
  /*register*/ char *buf_ptr = con->output.common.buf_ptr;
  char *end_ptr;

/*register*/ short run_length;

/*-------------------------------------------------------------*/
/* If actually MR 2d coding, insert the EOL+0 header code      */
/* no uncompressed stuff is ever carried over in MR            */
/*-------------------------------------------------------------*/ if ( con->output.common.coding_scheme == SCHEME_MR )
    {
#ifdef DEBUG
        dbg_printf( DBG_CONVERT, "ENCODE MR 2d, line %d: EOL '%s'\n",
            con->output.private.lines,
            bits2str( cs, (long) EOL_2D_CODE, EOL_2D_LENGTH ) );
#endif
        INSERT_BIT_STRING( buf_ptr, value, count, EOL_2D_CODE, EOL_2D_LENGTH );
    } ifdef DEBUG
    else /* MMR */
    {
        dbg_printf( DBG_CONVERT, "ENCODE MMR, line %d\n",
            con->output.private.lines );
    }
#endif
```

```
/*----------------------------------------------------------------*/
/* If we already were in uncompressed mode (from the last line),  */
/* the last bits were not inserted into the bit stream            */
/* in an attempt to reduce the overhead in exiting and entering   */
/* uncompressed mode. Since we always try compressed coding first,*/
/* complete the line and insert the uncompressed exit code to the */
/* bitstream if the last line was encoded in the uncompressed mode.*/
/*----------------------------------------------------------------*/ if ( con->output.private.uncompr_flag )
      {
         if ( con->output.private.uncompr_indent )
         {
            if ( con->output.private.uncompr_color )   /* black run */
            {
ifdef DEBUG_CODING
               dbg_printf( DBG_CONVERT, " INITIAL UNCOMPR BLACK '%s' rl=%d\n",
                  bits2str( cs, G_tran_uncompressed_black_code_table[
                     con->output.private.uncompr_indent],
                  con->output.private.uncompr_indent ),
                  con->output.private.uncompr_indent );
#endif
               INSERT_BIT_STRING( buf_ptr, value, count,
                  G_tran_uncompressed_black_code_table[
                     con->output.private.uncompr_indent],
                  con->output.private.uncompr_indent );
            }
            else  /* white run */
            {
ifdef DEBUG_CODING
               dbg_printf( DBG_CONVERT, " INITIAL UNCOMPR WHITE '%s', rl=%d\n",
                  bits2str( cs, UNCOMPRESSED_WHITE_CODE,
                  con->output.private.uncompr_indent ),
                  con->output.private.uncompr_indent );
#endif
               INSERT_BIT_STRING( buf_ptr, value, count,
                  UNCOMPRESSED_WHITE_CODE,
                  con->output.private.uncompr_indent );
            }
         }

/*----------------------------------------------------------------------*/
/* Exit Uncompressed Mode.                                              */
/* All we have to do is insert the White Terminating 0 Code.            */
/* If the last run was white, there will be 0-4 '0's on the end of the  */
/* string signifying that many zeros. The terminating code for all those*/
/* cases is just that many zeros + the white terminating 0 code.        */
/* If the last run was black, we want the white terminating 0 code for it.*/
/* Always set the T bit to 0 for the virtual white pixel at the beginning*/
/* of the next line.                                                    */
/*----------------------------------------------------------------------*/ ifdef DEBUG_CODING
         dbg_printf( DBG_CONVERT, "Exiting Uncompressed Mode '%s'\n", bits2str( cs,
            UNCOMPRESSED_EXIT_0_CODE, UNCOMPRESSED_EXIT_0_LENGTH ) );
endif
         INSERT_BIT_STRING( buf_ptr, value, count,
            UNCOMPRESSED_EXIT_0_CODE, UNCOMPRESSED_EXIT_0_LENGTH );
      }

/*--------------------------------------------------*/
/* main loop - encode until we reach line_length */
/*--------------------------------------------------*/
      do
      {

/*------------*/
/* pass mode */
/*------------*/
```

```c
        if ( *(ref+1) < a1 )        /* b2 < a1? */
          {
ifdef DEBUG_CODING
          dbg_printf( DBG_CONVERT, "PASS '%s' a0=%d a1=%d b2=%d\n",
              bits2str( cs, (long) PASS_CODE, PASS_LENGTH ), a0, a1, *(ref+1) );
#endif
          INSERT_BIT_STRING( buf_ptr, value, count, PASS_CODE, PASS_LENGTH );

a0 = *(ref+1);
          ref += 2;
          b1 = *ref;
          }

/*----------------*/
/* vertical modes */
/*----------------*/ else if ( ( ( a1 - b1 ) <= 3 ) && ( ( a1 - b1 ) >= -3 ) )
          {
ifdef DEBUG_CODING
          dbg_printf( DBG_CONVERT, "V%d '%s' a0=%d a1=%d b1=%d\n", a1-b1,
              bits2str( cs, (long) G_tran_vertical_code_table[a1-b1+3],
                      G_tran_vertical_length_table[a1-b1+3] ), a0, a1, b1 );
#endif
          INSERT_BIT_STRING( buf_ptr, value, count,
                      G_tran_vertical_code_table[a1-b1+3],
                      G_tran_vertical_length_table[a1-b1+3] );

a0 = a1;

if ( ( a1 - b1 ) == 0 )      /* Vertical 0 */
            {
            ref++;
            }
          else if ( ( a1 - b1 ) > 0 )  /* Vertical Right */
            {
            ref++;
            if ( *ref <= a1 )
              {
              ref += 2;
              }
            }
          else                         /* Vertical Left */
            {
            if ( *(ref-1) > a1 )
              {
              ref--;
              }
            else
              {
              ref++;
              }
            } a1 = *(++cur);
          b1 = *ref;
          color ^= 1;
          }

/*-----------------*/
/* horizontal mode */
/*-----------------*/ else
          {
ifdef DEBUG_CODING
          dbg_printf( DBG_CONVERT, "HOR(%d %d c=%d) '%s' a0=%d a1=%d b1=%d b2=%d'
              a1-a0, *(cur+1)-a1, color,
              bits2str( cs, (long) HOR_CODE, HOR_LENGTH ), a0, a1, b1, *(ref+1) )
#endif
          INSERT_BIT_STRING( buf_ptr, value, count, HOR_CODE, HOR_LENGTH );
```

```c
        len = a1 - a0;

while ( len > 2560 )
        {
ifdef DEBUG_CODING
            dbg_printf( DBG_CONVERT, " '%s'", bits2str( cs,
                    (long) G_tran_hor_make_up_code_table[color][(2560>>6)-1],
                    G_tran_hor_make_up_length_table[color][(2560>>6)-1] ) );
#endif
            INSERT_BIT_STRING( buf_ptr, value, count,
                    G_tran_hor_make_up_code_table[color][(2560>>6)-1],
                    G_tran_hor_make_up_length_table[color][(2560>>6)-1] );
            len -= 2560;
        } if ( len > 63 )
        {
ifdef DEBUG_CODING
            dbg_printf( DBG_CONVERT, " '%s'", bits2str( cs, (long) G_tran_hor_make_up_code_table[color][(len>>6)-1],
                    G_tran_hor_make_up_length_table[color][(len>>6)-1] ) );
#endif
            INSERT_BIT_STRING( buf_ptr, value, count,
                    G_tran_hor_make_up_code_table[color][(len>>6)-1],
                    G_tran_hor_make_up_length_table[color][(len>>6)-1] );
            len &= 63;
        } ifdef DEBUG_CODING
        dbg_printf( DBG_CONVERT, " '%s' (c=%d)", bits2str( cs,
                (long) G_tran_hor_terminating_code_table[color][len],
                G_tran_hor_terminating_length_table[color][len] ), color^1 );
#endif
        INSERT_BIT_STRING( buf_ptr, value, count,
                G_tran_hor_terminating_code_table[color][len],
                G_tran_hor_terminating_length_table[color][len] );

len = *(cur+1) - a1;
        color ^= 1;

while ( len > 2560 )
        {
ifdef DEBUG_CODING
            dbg_printf( DBG_CONVERT, " '%s'", bits2str( cs,
                    (long) G_tran_hor_make_up_code_table[color][(2560>>6)-1],
                    G_tran_hor_make_up_length_table[color][(2560>>6)-1] ) );
#endif
            INSERT_BIT_STRING( buf_ptr, value, count,
                    G_tran_hor_make_up_code_table[color][(2560>>6)-1],
                    G_tran_hor_make_up_length_table[color][(2560>>6)-1] );
            len -= 2560;
        } if ( len > 63 )
        {
ifdef DEBUG_CODING
            dbg_printf( DBG_CONVERT, " '%s'", bits2str( cs,
                    (long) G_tran_hor_make_up_code_table[color][(len>>6)-1],
                    G_tran_hor_make_up_length_table[color][(len>>6)-1] ) );
#endif
            INSERT_BIT_STRING( buf_ptr, value, count,
                    G_tran_hor_make_up_code_table[color][(len>>6)-1],
                    G_tran_hor_make_up_length_table[color][(len>>6)-1] );
            len &= 63;
        } ifdef DEBUG_CODING
        dbg_printf( DBG_CONVERT, " '%s'\n", bits2str( cs,
                (long) G_tran_hor_terminating_code_table[color][len],
                G_tran_hor_terminating_length_table[color][len] ) );
```

```
#endif
            INSERT_BIT_STRING( buf_ptr, value, count,
                        G_tran_hor_terminating_code_table[color][len],
                        G_tran_hor_terminating_length_table[color][len] );
            color ^= 1;

a0 = *(cur+1);
            cur += 2;
            a1 = *cur;
            while ( b1 <= a0 )
              {
                ref += 2;
                b1 = *ref;
              }
          )

/*------------------*/
/* end of main loop */
/*------------------*/

}
        while ( a0 < line_length );

/*----------------------------------------------------------------------*/
/* All done the line using 2D coding.                                   */
/* If 2D coding actually expanded the code,                             */
/* Recompress the line using the uncompressed extension.                */
/* The limit on the line is 1.0625x the line length + overhead.         */
/* since it is fast is a reasonable limit on the compression size.      */
/* Remember to delete the 2D coding for the line just peformed.         */
/*----------------------------------------------------------------------*/ if ( con->output.common.uncompressed_mode_flag &&
         ( ( ( ( buf_ptr - con->output.common.buf_ptr ) << 3 )
             + count - con->output.private.unfinished_length )
           > ( ( line_length + ( line_length >> 4 ) )
             + ( con->output.private.uncompr_flag ? 0 :
                 ( UNCOMPRESSED_EXTENSION_LENGTH + UNCOMPRESSED_EXIT_0_LENGTH ) ) ) ) )
      { ifdef DEBUG_CODING
        dbg_printf( DBG_CONVERT, "Coding line in Uncompressed mode: compr_len=%d,
                ( ( buf_ptr - con->output.common.buf_ptr ) << 3 )
                + count - con->output.private.unfinished_length,
                ( line_length ) + ( line_length >> 4 )
                + ( UNCOMPRESSED_EXTENSION_LENGTH + UNCOMPRESSED_EXIT_0_LENGTH ) );
endif /*--------------------------------------------*/
/* Re-initialize the variables needed for     */
/* encoding a line in the uncompressed mode   */
/*--------------------------------------------*/ cur = cur_line + 1;

color = 0;

value   = con->output.private.unfinished_byte;
        count   = con->output.private.unfinished_length;
        buf_ptr = con->output.common.buf_ptr;

left_over = 0;

/*----------------------------------------------------------------------------*/
/* If actually MR 2d uncompressed coding, re=insert the EOL+0 header code     */
/* no uncompressed stuff is ever carried over in MR                           */
/*----------------------------------------------------------------------------*/ if ( con->output.common.coding_scheme == SCHEME_MR )
          {
ifdef DEBUG_CODING
        dbg_printf( DBG_CONVERT, "  EOL 2D '%s'\n",
            bits2str( cs, (long) EOL_2D_CODE, EOL_2D_LENGTH ) );
```

```
#endif
    INSERT_BIT_STRING( buf_ptr, value, count, EOL_2D_CODE, EOL_2D_LENGTH );
}

/*------------------------------------------------------------*/
/* Insert the Uncompressed Mode Extension String              */
/* only if we were not already in the uncompressed mode.      */
/* if we already were in uncompressed, complete the last      */
/* string if there was any extra left over.                   */
/* (For white, add it to the first white run length).         */
/*------------------------------------------------------------*/ if ( con->output.private.uncompr_flag == 0 )
    {
ifdef DEBUG_CODING
        dbg_printf( DBG_CONVERT, "Enter Uncompressed mode '%s'\n", bits2str( cs
            UNCOMPRESSED_EXTENSION_CODE, UNCOMPRESSED_EXTENSION_LENGTH ) );
#endif
        INSERT_BIT_STRING( buf_ptr, value, count,
            UNCOMPRESSED_EXTENSION_CODE, UNCOMPRESSED_EXTENSION_LENGTH );
    } else /* already in uncompressed mode */
    {
        if ( con->output.private.uncompr_indent )
        {
            if ( con->output.private.uncompr_color ) /* black run */
            {
ifdef DEBUG_CODING
                dbg_printf( DBG_CONVERT, " INITIAL BLACK rl=%d '%s'\n",
                    con->output.private.uncompr_indent,
                    bits2str( cs, G_tran_uncompressed_black_code_table[
                        con->output.private.uncompr_indent],
                    con->output.private.uncompr_indent ) );
endif
                INSERT_BIT_STRING( buf_ptr, value, count,
                    G_tran_uncompressed_black_code_table[
                        con->output.private.uncompr_indent],
                    con->output.private.uncompr_indent );
            }
            else /* white run on previous line */
            {
                left_over = con->output.private.uncompr_indent;
            }
        }
    } ifdef DEBUG_CODING
    dbg_printf( DBG_CONVERT, "LEFT OVER WHITE=%d\n", left_over );
endif /*------------------------------------------------------------*/
/* Insert White and Black Runs.                               */
/* We'll break out of the loop when the line is completed.    */
/* And we'll also exit the uncompressed mode.                 */
/*------------------------------------------------------------*/ for (;;)
    {

/*------------------------------------------------------------*/
/* White Run.                                                 */
/* Insert a '1' between every 5 '0's in a row.                */
/*   This should be done very few times                       */
/*   since we're doing uncompressed mode.                     */
/* On the first run (if white), insert any remaining run      */
/*   left over from the last line encoded.                    */
/* At the end of the string,                                  */
/*   leave the remaining bits left over in the white          */
/*   run to be picked up next pass. This optimizes            */
/*   the entering & leaving of uncompressed mode.             */
/* Don't exit uncompressed mode until next pass.              */
```

```
/*  Coding exit mode is easy since all terminating codes */
/*  = last white code + Terminating 0 Length code.       */
/*   (See the T.6 reccommendation).                      */
/*------------------------------------------------------*/ run_length = *(cur) - *(cur - 1) + left_over;
        left_over = 0;

while ( run_length >= 5 )
        {
ifdef DEBUG_CODING
            dbg_printf( DBG_CONVERT, " WHITE rl=5 '%s'\n", bits2str( cs,
                UNCOMPRESSED_WHITE_5_CODE, UNCOMPRESSED_WHITE_5_LENGTH
#endif
            INSERT_BIT_STRING( buf_ptr, value, count
                UNCOMPRESSED_WHITE_5_CODE, UNCOMPR run_length -= 5;
        } if ( *cur == line_length )  /* save remainder */
        {
            if ( con->output.common.coding_scheme == S
            {
                con->output.private.uncompr_indent = run
                con->output.private.uncompr_color  = 0;
            }
            else if ( run_length > 0 ) /* && MR 2d coding */
            {
ifdef DEBUG_CODING
                dbg_printf( DBG_CONVERT, " FINISHING WHITE rl=%d '%s'\n",
                    run_length, bits2str( cs, UNCOMPRESSED_WHITE_CODE, run_length ));
#endif
                INSERT_BIT_STRING( buf_ptr, value, count,
                    UNCOMPRESSED_WHITE_CODE, run_length );
            } break;              /*!!! all done line !!!*/
        } if ( run_length != 0 )
        {
ifdef DEBUG_CODING
            dbg_printf( DBG_CONVERT, " WHITE rl=%d '%s'\n", run_length,
                bits2str( cs, UNCOMPRESSED_WHITE_CODE, run_length ) );
#endif
            INSERT_BIT_STRING( buf_ptr, value, count,
                UNCOMPRESSED_WHITE_CODE, run_length );
        } cur++;

/*------------------------------------------------------*/
/* Black Run.                                           */
/* Insert '1's for entire black run.                    */
/* If we reach the end of the string,                   */
/*   Exit uncompressed mode with                        */
/*   a white terminating code, run length 0.            */
/*------------------------------------------------------*/ run_length = *(cur) - *(cur - 1);

while ( run_length >= 16 )
        {
ifdef DEBUG_CODING
            dbg_printf( DBG_CONVERT, " BLACK rl=16 '%s'\n", bits2str( cs,
                UNCOMPRESSED_BLACK_16_CODE, UNCOMPRESSED_BLACK_16_LENGTH ) );
#endif
            INSERT_BIT_STRING( buf_ptr, value, count,
                UNCOMPRESSED_BLACK_16_CODE, UNCOMPRESSED_BLACK_16_LENGTH );

run_length -= 16;
        }
```

```
                    G_tran_uncompressed_black_code_table[run_length], run_length );
            } if ( *cur == line_length ) /* always fill up black to end */
           {
              con->output.private.uncompr_indent = 0;

break;                /*!!! all done line !!!*/
           } cur++;

} /* end forever loop peforming uncompressed mode */
/*-------------------------------------------------------------------*/
/* Say we coded this line in the uncompressed mode.                  */
/* Stay in this mode so if the next line should be uncompressed,     */
/*  we don't need to exit and then re-enter uncompressed mode.       */
/* for 2d MR coding, always exit uncompressed mode                   */
/*-------------------------------------------------------------------*/ if ( con->output.common.coding_scheme == SCHEME_MMR )
           {
              con->output.private.uncompr_flag = 1;
           } else /* coding_scheme == SCHEME_MR */
           {
              con->output.private.uncompr_flag = 0;
#ifdef DEBUG_CODING
              dbg_printf( DBG_CONVERT, "Exiting Uncompressed Mode '%s'\n",
                  bits2str(cs, UNCOMPRESSED_EXIT_0_CODE, UNCOMPRESSED_EXIT_0_LENGTH));
#endif
              INSERT_BIT_STRING( buf_ptr, value, count,
                      UNCOMPRESSED_EXIT_0_CODE, UNCOMPRESSED_EXIT_0_LENGTH );
           }

} /* end if uncompressed mode */
/*-------------------------------------------------------------------*/
/* if we didn't want to use uncompressed mode this time around       */
/* just say no!                                                      */
/*-------------------------------------------------------------------*/ else /* not uncompressed mode */
       {
          con->output.private.uncompr_flag = 0;
       }

/*------------------------------------------------------*/
/* if encoding 2d MR, FILL to the end of the line */
/*------------------------------------------------------*/ if ( con->output.common.coding_scheme == SCHEME_MR )
       {
          if ( run_length != 0 )
             {
ifdef DEBUG_CODING
              dbg_printf( DBG_CONVERT, " BLACK rl=%d'%s'\n", run_length,
                  bits2str( cs,
                      G_tran_uncompressed_black_code_table[run_length], run_length ) );
#endif
              INSERT_BIT_STRING( buf_ptr, value, count,
```

```
      if ( count != 0 )
        {
          PUT_BYTE( buf_ptr, value );
        }

PUT_BYTE( buf_ptr, 0 );

end_ptr = con->output.common.buf_ptr + con->output.common.min_byte_count;
      while( buf_ptr < end_ptr )
        {
          PUT_BYTE( buf_ptr, 0 );
        }
      value = 0;
      count = 0;
    }
/*-----------------------------------------------------*/
/* store back working byte value and # of valid bits */
/*-----------------------------------------------------*/ con->output.private.unfinished_byte   = value;
  con->output.private.unfinished_length = count;
  con->output.common.buf_ptr            = buf_ptr;

/*-----------------------------------------------------*/
/* no errors can be detected in this routine */
/*-----------------------------------------------------*/ return( CONVERT_OK );
}
/****************************************************************************
*
*    Filename: %P%
*    Program/Library: TM300 SUPERVISOR TASK CONVERT LIBRARY for N25NG3
*    Function:
*    Author: D. Hunt
*    Purpose: encode MR
*
*    Usage: encode_mr_image( con, ref_line, cur_line )
*    Arguments: struct convert_struct *con;
*               short *ref_line;
*               short *cur_line;
*    Return: (short) CONVERT_OK
*    Abstract:
*
*    OS/Hardware Dependencies: TM300, MTOS
*    Notes / Side Effects:
*
*                            Modification History
*
*    Ref    Date      Changed By          Description
*    ===    ========  ==============      ===========================================
*           4/21/88   D. Hunt             Initial Coding.
*
****************************************************************************
*                    Source Control System Information
*
*    What File:        %W%
*    Filename:         %P%
*    Version:          %I%,          Date:    %G%
*    Date Retrieved:   %H%
*
****************************************************************************
* (c) COPYRIGHT 1988, NetExpress, Inc. All Rights Reserved.
*                 San Mateo, California.
****************************************************************************/

/*----------------*/
/* include files */
/*----------------*/ include "supervisor/convert.h"
include "codes.h"
#include "macros.h"
```

```
/*--------------------*/
/* external functions */
/*--------------------*/ extern void pkill_tm300();
/*----------------*/
/* encode MR line */
/*----------------*/ short encode_mr_image( con, ref_line, cur_line )
  struct convert_struct *con;
  short *ref_line;
  short *cur_line;
{
  short rc;

if ( con->output.private.k_counter == 0 )
    {
      rc = encode_mh_image( con, ref_line, cur_line );
    }
  else /* 2d coding */
    {
      rc = encode_mmr_image( con, ref_line, cur_line );
    }

/*-------------------------------------*/
/* update the 1d or 2d coding counter  */
/*-------------------------------------*/ con->output.private.k_counter++;
  if ( con->output.private.k_counter == con->output.common.k_val )
      con->output.private.k_counter = 0;

return( rc );
}
/******************************************************************************
*
*   Filename: %P%
*   Program/Library: TM300 SUPERVISOR TASK CONVERT LIBRARY for N25NG3
*   Function: encode_mh_eofb_image()
*   Author: D. Hunt
*   Purpose: encode RTC for MH coding
*
*   Usage: encode_mh_eofb_image( con )
*   Arguments: struct convert_struct *con;
*   Return: (short) CONVERT_OK
*   Abstract:
*
*   OS/Hardware Dependencies: TM300, MTOS
*   Notes / Side Effects:
*
*                           Modification History
*
*   Ref     Date      Changed By              Description
*   ===     ========  ==============  ==========================================
*           4/21/88   D. Hunt         Initial Coding.
*
*******************************************************************************
*                       Source Control System Information
*
*   What File:          %W%
*   Filename:           %P%
*   Version:            %I%,            Date:   %G%
*   Date Retrieved:     %H%
*
*******************************************************************************
* (c) COPYRIGHT 1988, NetExpress, Inc. All Rights Reserved.
*                       San Mateo, California.
*******************************************************************************/
```

```c
/*----------------*/
/* include files */
/*----------------*/ include "supervisor/convert.h"
include "debug.h"

#include "codes.h"
#include "macros.h"

/*----------------------*/
/* external functions */
/*----------------------*/

/*----------------------*/
/* complete MH coding */
/*----------------------*/ short encode_mh_eofb_image( con )
   struct convert_struct *con;
{
   /*register*/ long value = con->output.private.unfinished_byte;
   /*register*/ short count = con->output.private.unfinished_length;
   /*register*/ char *buf_ptr = con->output.common.buf_ptr;

short i;

/*-------------------------------------------------------*/
/* add the EOL code 6 times to make the RTC code */
/*-------------------------------------------------------*/ ifdef DEBUG
       dbg_printf( DBG_CONVERT, "Inserting MH RTC\n" );
endif for ( i = 0; i < 6; i++ )
     {
       INSERT_BIT_STRING( buf_ptr, value, count, EOL_CODE, EOL_LENGTH );
     }

/*-------------------------------------------------*/
/* if any left over, stick it in the buffer */
/*-------------------------------------------------*/ if ( count != 0 )
       PUT_BYTE( buf_ptr, value );

/*----------------------------*/
/* pad with 2 bytes of zeros */
/*----------------------------*/

PUT_BYTE( buf_ptr, 0 );
   PUT_BYTE( buf_ptr, 0 );

con->output.common.buf_ptr = buf_ptr;

return( CONVERT_OK );
}

/************************************************************************
*
*    Filename: %P%
*    Program/Library: TM300 SUPERVISOR TASK CONVERT LIBRARY for N25NG3
*    Function:
*    Author: D. Hunt
*    Purpose: encode EOFB for MMR
*
*    Usage: encode_mmr_eofb_image( con );
*    Arguments: struct convert_struct *con;
*    Return: (short) CONVERT_OK
*    Abstract:
*
*    OS/Hardware Dependencies: TM300, MTOS
*    Notes / Side Effects:
```

```
*
*                              Modification History
*
* Ref     Date         Changed By                Description
* ===     ========     ==============     =========================================
*         4/21/88      D. Hunt            Initial Coding.
*
******************************************************************************
*                       Source Control System Information
*
* What File:             %W%
* Filename:              %P%
* Version:               %I%,               Date:    %G%
* Date Retrieved:        %H%
*
******************************************************************************
* (c) COPYRIGHT 1988, NetExpress, Inc. All Rights Reserved.
*                     San Mateo, California.
******************************************************************************/

/*----------------*/
/* include files */
/*----------------*/ include "supervisor/convert.h"
include "debug.h"

#include "codes.h"
#include "macros.h"

/*------------------*/
/* external tables */
/*------------------*/ extern short G_tran_uncompressed_black_code_table[];
/*-----------------------*/
/* complete MMR encoding */
/*-----------------------*/ short encode_mmr_eofb_image( con )
  struct convert_struct *con;
{
  /*register*/ long value  = con->output.private.unfinished_byte;
  /*register*/ short count = con->output.private.unfinished_length;
  /*register*/ char *buf_ptr = con->output.common.buf_ptr;

#ifdef DEBUG
  char cs[80];
  extern char *bits2str();
endif

/*---------------------------------------------------------------------------*/
/* If we are in uncompressed mode (from the last line),                      */
/* the last bits were not inserted into the bit stream                       */
/* in an attempt to reduce the overhead in exiting and entering              */
/* uncompressed mode.                                                        */
/*---------------------------------------------------------------------------*/ if ( con->output.private.uncompr_flag )
     {
       if ( con->output.private.uncompr_indent )
         {
           if ( con->output.private.uncompr_color ) /* black run */
             {
ifdef DEBUG_CODING
              dbg_printf( DBG_CONVERT, "Complete uncompressed BLACK '%s'\n",
                 bits2str( cs, G_tran_uncompressed_black_code_table[
                      con->output.private.uncompr_indent],
                   con->output.private.uncompr_indent ) );
endif
              INSERT_BIT_STRING( buf_ptr, value, count,
                    G_tran_uncompressed_black_code_table[
                       con->output.private.uncompr_indent],
                   con->output.private.uncompr_indent );
```

```c
        }
        else /* white run */
        {
ifdef DEBUG_CODING
            dbg_printf( DBG_CONVERT, "Complete uncompressed WHITE '%s'\n",
                bits2str( cs, UNCOMPRESSED_WHITE_CODE,
                    con->output.private.uncompr_indent ) );
endif INSERT_BIT_STRING( buf_ptr, value, count,
                UNCOMPRESSED_WHITE_CODE, con->output.private.uncompr_indent );
        }
    }

/*-------------------------------------------------------------------*/
    /* Exit Uncompressed Mode.                                           */
    /* All we have to do is insert the White Terminating 0 Code.         */
    /* If the last run was white, there will be 0-4 '0's on the end of the */
    /* string signifying that many zeros. The terminating code for all those */
    /* cases is just that many zeros + the white terminating 0 code.     */
    /* If the last run was black, we want the white terminating 0 code for it. */
    /* Always set the T bit to 0 for the virtual white pixel at the beginning */
    /* of the next line.                                                 */
    /*-------------------------------------------------------------------*/ ifdef DEBUG_CODING
    dbg_printf( DBG_CONVERT, "Exiting Uncompressed Mode '%s'\n", bits2str( cs,
        UNCOMPRESSED_EXIT_0_CODE, UNCOMPRESSED_EXIT_0_LENGTH ) );
endif INSERT_BIT_STRING( buf_ptr, value, count,
        UNCOMPRESSED_EXIT_0_CODE, UNCOMPRESSED_EXIT_0_LENGTH );

}

/*-------------------------------------------------------------------*/
/* add EOFB code twice                                               */
/* this is since it's 24 bits long and the bit_string insert         */
/* only works for 23 bit lengths maximum.                            */
/*-------------------------------------------------------------------*/
#ifdef DEBUG
    dbg_printf( DBG_CONVERT, "Inserting MMR EOFB '000000000001000000000001'\n" );
endif INSERT_BIT_STRING( buf_ptr, value, count, EOFB_CODE, EOFB_LENGTH );

INSERT_BIT_STRING( buf_ptr, value, count, EOFB_CODE, EOFB_LENGTH );

/*----------------------------------------------*/
/* if any left over, stick it in the buffer */
/*----------------------------------------------*/ if ( count != 0 )
        PUT_BYTE( buf_ptr, value );

/*----------------------------*/
/* pad with 2 bytes of zeros */
/*----------------------------*/

PUT_BYTE( buf_ptr, 0 );
    PUT_BYTE( buf_ptr, 0 );

con->output.common.buf_ptr = buf_ptr;

return( CONVERT_OK );
}
```

```
/*****************************************************************************
 *
 *   Filename: %P%
 *   Program/Library: TM300 SUPERVISOR TASK CONVERT LIBRARY for N25NG3
 *   Function: encode_mr_eofb_image()
 *   Author: D. Hunt
 *   Purpose: encode MR RTC
 *
 *   Usage: encode_mr_eofb_image( con );
 *   Arguments: struct convert_struct *con;
 *   Return: (short) CONVERT_OK
 *   Abstract:
 *
 *   OS/Hardware Dependencies: TM300, MTOS
 *   Notes / Side Effects:
 *
 *                           Modification History
 *
 *   Ref    Date         Changed By                Description
 *   ===    ========     =============             =================================
 *          4/21/88      D. Hunt                   Initial Coding.
 *
 *****************************************************************************
 *                       Source Control System Information
 *
 *   What File:         %W%
 *   Filename:          %P%
 *   Version:           %I%,           Date:    %G%
 *   Date Retrieved:    %H%
 *
 *****************************************************************************
 * (c) COPYRIGHT 1988, NetExpress, Inc. All Rights Reserved.
 *                       San Mateo, California.
 *****************************************************************************/

/*----------------*/
/* include files */
/*----------------*/ include "supervisor/convert.h"
include "debug.h"

#include "codes.h"
#include "macros.h"

/*---------------------*/
/* external functions */
/*---------------------*/

/*---------------------*/
/* complete MH coding */
/*---------------------*/ short encode_mr_eofb_image( con )
   struct convert_struct *con;
{
   /*register*/ long value = con->output.private.unfinished_byte;
   /*register*/ short count = con->output.private.unfinished_length;
   /*register*/ char *buf_ptr = con->output.common.buf_ptr;

short i;

/*--------------------------------------------------------------*/
/* add the EOL+1 code 6 times to make the RTC code */
/*--------------------------------------------------------------*/ ifdef DEBUG
     dbg_printf( DBG_CONVERT, "Inserting MR RTC\n" );
endif for ( i = 0; i < 6; i++ )
     {
        INSERT_BIT_STRING( buf_ptr, value, count, EOL_1D_CODE, EOL_1D_LENGTH );
     }
```

```
/*--------------------------------------------*/
/* if any left over, stick it in the buffer */
/*--------------------------------------------*/ if ( count != 0 )
        PUT_BYTE( buf_ptr, value );

/*------------------------------*/
/* pad with 2 bytes of zeros */
/*------------------------------*/

PUT_BYTE( buf_ptr, 0 );
    PUT_BYTE( buf_ptr, 0 );

con->output.common.buf_ptr = buf_ptr;

return( CONVERT_OK );
}
/****************************************************************************
*
*   What Include:        %W%
*   Include File Name:   %P%
*   Author:              D. Hunt
*   Subsystem:           TRANSCESS LIBRARY
*   Date First Written:  06/11/87
*   Version:             %I%
*
*   Purpose:             define names for MH, MR, and MMR coding values
*
*                        Insert File History
*
*
*       Date        Changed By              Description
*       ========    ===============         ==========================================
*       06/11/87    D. Hunt                 Initial coding.
*
****************************************************************************
*                       (c) COPYRIGHT   1987
*                            NetExpress, Inc.
*                            Vienna, Virginia
****************************************************************************/

/*--------------------*/
/* MR and MMR codes */
/*--------------------*/ define PASS_CODE              0x0008
define PASS_LENGTH            4 define HOR_CODE               0x0004
define HOR_LENGTH             3 define VERT_LEFT_3_CODE       0x0020
define VERT_LEFT_3_LENGTH     7 define VERT_LEFT_2_CODE       0x0010
define VERT_LEFT_2_LENGTH     6 define VERT_LEFT_1_CODE       0x0002
define VERT_LEFT_1_LENGTH     3 define VERT_0_CODE            0x0001
define VERT_0_LENGTH          1 define VERT_RIGHT_1_CODE      0x0006
define VERT_RIGHT_1_LENGTH    3 define VERT_RIGHT_2_CODE      0x0030
define VERT_RIGHT_2_LENGTH    6 define VERT_RIGHT_3_CODE      0x0060
define VERT_RIGHT_3_LENGTH    7
```

```c
/*-------------------------------------------------------------------*/
/* end of file block code                                            */
/* this is 1/2 the code for T.6                                      */
/* it is also the end of line code for T.4                           */
/* six of them (with optional MR/MH flag) are the RTC for T.4        */
/* T.4 MR coding adds a 0 for 2-d and a 1 for 1-d coding             */
/*    of the next line or RTC                                        */
/*-------------------------------------------------------------------*/ define EOFB_CODE                       0x0800
define EOFB_LENGTH                     12 define EOL_CODE                        0x0800
define EOL_LENGTH                      12
define EOL_MASK                        0x0FFF define EOL_1D_CODE                     0x1800
define EOL_1D_LENGTH                   13 define EOL_2D_CODE                     0x0800
define EOL_2D_LENGTH                   13

/*------------------------------------------*/
/* extension codes                          */
/* next 3 bits determine extension mode */
/* only valid: 111 -> uncompressed mode */
/*------------------------------------------*/ define EXTENSION_CODE                          0x0040
define EXTENSION_LENGTH                        7 define UNCOMPRESSED_EXTENSION_CODE             0x03C0
define UNCOMPRESSED_EXTENSION_LENGTH           (7+3)

#define UNCOMPRESSED_1D_EXTENSION_CODE          0x0F00
#define UNCOMPRESSED_1D_EXTENSION_LENGTH        (9+3)
#define UNCOMPRESSED_1D_EXTENSION_MASK          0x0F00

/*-------------------------------------------------------------------*/
/* Uncompressed Mode Codes                                           */
/* Note the Exit 0 code has a T=0 for the next line virtual white pixel */
/*-------------------------------------------------------------------*/ define UNCOMPRESSED_WHITE_5_CODE       0x0020
define UNCOMPRESSED_WHITE_5_LENGTH     6 define UNCOMPRESSED_WHITE_CODE         0x0000 define UNCOMPRESSED_BLACK_16_CODE      0x0000FFFFL
define UNCOMPRESSED_BLACK_16_LENGTH    16 define UNCOMPRESSED_EXIT_0_CODE        0x0040
define UNCOMPRESSED_EXIT_0_LENGTH      8
define UNCOMPRESSED_EXIT_0_MASK        0x7F /*-------------------------------------------------------------------*/
/* DECODE TABLES -- what type of code processed                      */
/*   For 2 dimensional decoding only                                 */
/*   Note vertical types are also the offset values of a1 & b1       */
/*    this simplyfies coding - so beware of changing them            */
/*-------------------------------------------------------------------*/ define VERTICAL_LEFT_3_TYPE    -3
define VERTICAL_LEFT_2_TYPE    -2
#define VERTICAL_LEFT_1_TYPE    -1
#define VERTICAL_0_TYPE          0
#define VERTICAL_RIGHT_1_TYPE    1
#define VERTICAL_RIGHT_2_TYPE    2
#define VERTICAL_RIGHT_3_TYPE    3
#define HORIZONTAL_TYPE          4
#define PASS_TYPE                5
#define EXTENSION_TYPE           6
#define EOFB_TYPE                7
#define ERROR_TYPE               8
```

```
/******************************************************************
 *
 *   What Include:          %W%
 *   Include File Name:     %P%
 *   Author:                D. Hunt
 *   Subsystem:             TRANSCESS LIBRARY
 *   Date First Written:    06/11/87
 *   Version:               %I%
 *
 *   Purpose:               extern decoding table and define decoding structure
 *
 *                          Insert File History
 *
 *
 *      Date       Changed By                    Description
 *   ==========   ==============    =============================================
 *    06/11/87    D. Hunt           Initial Coding.
 *
 ******************************************************************
 *                         (c) COPYRIGHT   1987
 *                             NetExpress, Inc.
 *                             Vienna, Virginia
 ******************************************************************/
  struct DecodeTable
    {
      short code_type;
      short len;
    };

struct DecodeUncompressedTable
    {
      short run_len;
      short code_len;
    };

struct DecodeUncompressedEndTable
    {
      short run_len;
      short code_len;
      short next_color;
    };

define TABLE_2D_SIZE                  128 define WHITE_TABLE_SIZE               512
  #define WHITE_SUPPLEMENT_TABLE_SIZE    16 define BLACK_TABLE_SIZE               64
  #define BLACK_SUPPLEMENT_TABLE_SIZE    512 define UNCOMPRESSED_TABLE_SIZE        64
  #define UNCOMPRESSED_END_TABLE_SIZE    64 ifndef unix
  #option separate G_tran_decode_2d_table
  #option separate G_tran_white_decode_table
  #option separate G_tran_white_supplement_decode_table
  #option separate G_tran_black_decode_table
  #option separate G_tran_black_supplement_decode_table
  #option separate G_tran_uncompressed_decode_table
  #option separate G_tran_uncompressed_decode_end_table
  #option separate G_tran_bin_decode_table
  #option separate G_tran_rev_bin_decode_table
  #endif ifndef DECLARE_VARIABLES extern struct DecodeTable
      G_tran_decode_2d_table[TABLE_2D_SIZE], G_tran_white_decode_table[WHITE_TABLE_SIZE],
      G_tran_white_supplement_decode_table[WHITE_SUPPLEMENT_TABLE_SIZE],
```

```
        G_tran_black_decode_table[BLACK_TABLE_SIZE],
        G_tran_black_supplement_decode_table[BLACK_SUPPLEMENT_TABLE_SIZE];

extern struct DecodeUncompressedTable
    G_tran_uncompressed_decode_table[UNCOMPRESSED_TABLE_SIZE];

extern struct DecodeUncompressedEndTable
    G_tran_uncompressed_decode_end_table[UNCOMPRESSED_END_TABLE_SIZE];

extern char
    G_tran_bin_decode_table[256],
    G_tran_rev_bin_decode_table[256];

#endif
/*
 * T6 code table
 *
 *
 */ struct DecodeTable G_tran_decode_2d_table[128] = {
        /* id=0  bits=1        (1)  len=1 type=V(0)      */
        /* id=-1 bits=010      (2)  len=3 type=VL(1)     */
        /* id=1  bits=011      (6)  len=3 type=VR(1)     */
        /* id=-2 bits=000010   (16) len=6 type=VL(2)     */
        /* id=2  bits=000011   (48) len=6 type=VR(2)     */
        /* id=-3 bits=0000010  (32) len=7 type=VL(3)     */
        /* id=3  bits=0000011  (96) len=7 type=VR(3)     */
        /* id=4  bits=001      (4)  len=3 type=H         */
        /* id=5  bits=0001     (8)  len=4 type=P         */
        /* id=6  bits=0000001  (64) len=7 type=extension */
        /* id=7  bits=0000000  (0)  len=7 type=EOFB      */
    { EOFB_TYPE             , 7 },      /* 0  EOFB  */
    { VERTICAL_0_TYPE       , 1 },      /* 1  V(0)  */
    { VERTICAL_LEFT_1_TYPE  , 3 },      /* 2  VL(1) */
    { VERTICAL_0_TYPE       , 1 },      /* 3  V(0)  */
    { HORIZONTAL_TYPE       , 3 },      /* 4  HOR   */
    { VERTICAL_0_TYPE       , 1 },      /* 5  V(0)  */
    { VERTICAL_RIGHT_1_TYPE , 3 },      /* 6  VR(1) */
    { VERTICAL_0_TYPE       , 1 },      /* 7  V(0)  */
    { PASS_TYPE             , 4 },      /* 8  PASS  */
    { VERTICAL_0_TYPE       , 1 },      /* 9  V(0)  */
    { VERTICAL_LEFT_1_TYPE  , 3 },      /* 10 VL(1) */
    { VERTICAL_0_TYPE       , 1 },      /* 11 V(0)  */
    { HORIZONTAL_TYPE       , 3 },      /* 12 HOR   */
    { VERTICAL_0_TYPE       , 1 },      /* 13 V(0)  */
    { VERTICAL_RIGHT_1_TYPE , 3 },      /* 14 VR(1) */
    { VERTICAL_0_TYPE       , 1 },      /* 15 V(0)  */
    { VERTICAL_LEFT_2_TYPE  , 6 },      /* 16 VL(2) */
    { VERTICAL_0_TYPE       , 1 },      /* 17 V(0)  */
    { VERTICAL_LEFT_1_TYPE  , 3 },      /* 18 VL(1) */
    { VERTICAL_0_TYPE       , 1 },      /* 19 V(0)  */
    { HORIZONTAL_TYPE       , 3 },      /* 20 HOR   */
    { VERTICAL_0_TYPE       , 1 },      /* 21 V(0)  */
    { VERTICAL_RIGHT_1_TYPE , 3 },      /* 22 VR(1) */
    { VERTICAL_0_TYPE       , 1 },      /* 23 V(0)  */
    { PASS_TYPE             , 4 },      /* 24 PASS  */
    { VERTICAL_0_TYPE       , 1 },      /* 25 V(0)  */
    { VERTICAL_LEFT_1_TYPE  , 3 },      /* 26 VL(1) */
    { VERTICAL_0_TYPE       , 1 },      /* 27 V(0)  */
    { HORIZONTAL_TYPE       , 3 },      /* 28 HOR   */
    { VERTICAL_0_TYPE       , 1 },      /* 29 V(0)  */
    { VERTICAL_RIGHT_1_TYPE , 3 },      /* 30 VR(1) */
    { VERTICAL_0_TYPE       , 1 },      /* 31 V(0)  */
    { VERTICAL_LEFT_3_TYPE  , 7 },      /* 32 VL(3) */
    { VERTICAL_0_TYPE       , 1 },      /* 33 V(0)  */
    { VERTICAL_LEFT_1_TYPE  , 3 },      /* 34 VL(1) */
    { VERTICAL_0_TYPE       , 1 },      /* 35 V(0)  */
    { HORIZONTAL_TYPE       , 3 },      /* 36 HOR   */

{ VERTICAL_0_TYPE       , 1 },      /* 37 V(0)  */
    { VERTICAL_RIGHT_1_TYPE , 3 },      /* 38 VR(1) */
    { VERTICAL_0_TYPE       , 1 },      /* 39 V(0)  */
    { PASS_TYPE             , 4 },      /* 40 PASS  */
```

```
{ VERTICAL_0_TYPE         , 1 },    /* 41 V(0)  */
{ VERTICAL_LEFT_1_TYPE    , 3 },    /* 42 VL(1) */
{ VERTICAL_0_TYPE         , 1 },    /* 43 V(0)  */
{ HORIZONTAL_TYPE         , 3 },    /* 44 HOR   */
{ VERTICAL_0_TYPE         , 1 },    /* 45 V(0)  */
{ VERTICAL_RIGHT_1_TYPE   , 3 },    /* 46 VR(1) */
{ VERTICAL_0_TYPE         , 1 },    /* 47 V(0)  */
{ VERTICAL_RIGHT_2_TYPE   , 6 },    /* 48 VR(2) */
{ VERTICAL_0_TYPE         , 1 },    /* 49 V(0)  */
{ VERTICAL_LEFT_1_TYPE    , 3 },    /* 50 VL(1) */
{ VERTICAL_0_TYPE         , 1 },    /* 51 V(0)  */
{ HORIZONTAL_TYPE         , 3 },    /* 52 HOR   */
{ VERTICAL_0_TYPE         , 1 },    /* 53 V(0)  */
{ VERTICAL_RIGHT_1_TYPE   , 3 },    /* 54 VR(1) */
{ VERTICAL_0_TYPE         , 1 },    /* 55 V(0)  */
{ PASS_TYPE               , 4 },    /* 56 PASS  */
{ VERTICAL_0_TYPE         , 1 },    /* 57 V(0)  */
{ VERTICAL_LEFT_1_TYPE    , 3 },    /* 58 VL(1) */
{ VERTICAL_0_TYPE         , 1 },    /* 59 V(0)  */
{ HORIZONTAL_TYPE         , 3 },    /* 60 HOR   */
{ VERTICAL_0_TYPE         , 1 },    /* 61 V(0)  */
{ VERTICAL_RIGHT_1_TYPE   , 3 },    /* 62 VR(1) */
{ VERTICAL_0_TYPE         , 1 },    /* 63 V(0)  */
{ EXTENSION_TYPE          , 7 },    /* 64 extension */
{ VERTICAL_0_TYPE         , 1 },    /* 65 V(0)  */
{ VERTICAL_LEFT_1_TYPE    , 3 },    /* 66 VL(1) */
{ VERTICAL_0_TYPE         , 1 },    /* 67 V(0)  */
{ HORIZONTAL_TYPE         , 3 },    /* 68 HOR   */
{ VERTICAL_0_TYPE         , 1 },    /* 69 V(0)  */
{ VERTICAL_RIGHT_1_TYPE   , 3 },    /* 70 VR(1) */
{ VERTICAL_0_TYPE         , 1 },    /* 71 V(0)  */
{ PASS_TYPE               , 4 },    /* 72 PASS  */
{ VERTICAL_0_TYPE         , 1 },    /* 73 V(0)  */
{ VERTICAL_LEFT_1_TYPE    , 3 },    /* 74 VL(1) */
{ VERTICAL_0_TYPE         , 1 },    /* 75 V(0)  */
{ HORIZONTAL_TYPE         , 3 },    /* 76 HOR   */
{ VERTICAL_0_TYPE         , 1 },    /* 77 V(0)  */
{ VERTICAL_RIGHT_1_TYPE   , 3 },    /* 78 VR(1) */
{ VERTICAL_0_TYPE         , 1 },    /* 79 V(0)  */
{ VERTICAL_LEFT_2_TYPE    , 6 },    /* 80 VL(2) */
{ VERTICAL_0_TYPE         , 1 },    /* 81 V(0)  */
{ VERTICAL_LEFT_1_TYPE    , 3 },    /* 82 VL(1) */
{ VERTICAL_0_TYPE         , 1 },    /* 83 V(0)  */
{ HORIZONTAL_TYPE         , 3 },    /* 84 HOR   */
{ VERTICAL_0_TYPE         , 1 },    /* 85 V(0)  */
{ VERTICAL_RIGHT_1_TYPE   , 3 },    /* 86 VR(1) */
{ VERTICAL_0_TYPE         , 1 },    /* 87 V(0)  */
{ PASS_TYPE               , 4 },    /* 88 PASS  */
{ VERTICAL_0_TYPE         , 1 },    /* 89 V(0)  */
{ VERTICAL_LEFT_1_TYPE    , 3 },    /* 90 VL(1) */
{ VERTICAL_0_TYPE         , 1 },    /* 91 V(0)  */
{ HORIZONTAL_TYPE         , 3 },    /* 92 HOR   */
{ VERTICAL_0_TYPE         , 1 },    /* 93 V(0)  */
{ VERTICAL_RIGHT_1_TYPE   , 3 },    /* 94 VR(1) */
{ VERTICAL_0_TYPE         , 1 },    /* 95 V(0)  */
{ VERTICAL_RIGHT_3_TYPE   , 7 },    /* 96 VR(3) */
{ VERTICAL_0_TYPE         , 1 },    /* 97 V(0)  */
{ VERTICAL_LEFT_1_TYPE    , 3 },    /* 98 VL(1) */
{ VERTICAL_0_TYPE         , 1 },    /* 99 V(0)  */
{ HORIZONTAL_TYPE         , 3 },    /* 100 HOR  */
{ VERTICAL_0_TYPE         , 1 },    /* 101 V(0) */
{ VERTICAL_RIGHT_1_TYPE   , 3 },    /* 102 VR(1) */
{ VERTICAL_0_TYPE         , 1 },    /* 103 V(0) */
{ PASS_TYPE               , 4 },    /* 104 PASS */
{ VERTICAL_0_TYPE         , 1 },    /* 105 V(0) */
{ VERTICAL_LEFT_1_TYPE    , 3 },    /* 106 VL(1) */
{ VERTICAL_0_TYPE         , 1 },    /* 107 V(0) */
{ HORIZONTAL_TYPE         , 3 },    /* 108 HOR  */
{ VERTICAL_0_TYPE         , 1 },    /* 109 V(0) */
{ VERTICAL_RIGHT_1_TYPE   , 3 },    /* 110 VR(1) */
{ VERTICAL_0_TYPE         , 1 },    /* 111 V(0) */
{ VERTICAL_RIGHT_2_TYPE   , 6 },    /* 112 VR(2) */
{ VERTICAL_0_TYPE         , 1 },    /* 113 V(0) */
```

```
  { VERTICAL_LEFT_1_TYPE  , 3 },    /* 114 VL(1) */
  { VERTICAL_0_TYPE       , 1 },    /* 115 V(0)  */
  { HORIZONTAL_TYPE       , 3 },    /* 116 HOR   */
  { VERTICAL_0_TYPE       , 1 },    /* 117 V(0)  */
  { VERTICAL_RIGHT_1_TYPE , 3 },    /* 118 VR(1) */
  { VERTICAL_0_TYPE       , 1 },    /* 119 V(0)  */
  { PASS_TYPE             , 4 },    /* 120 PASS  */
  { VERTICAL_0_TYPE       , 1 },    /* 121 V(0)  */
  { VERTICAL_LEFT_1_TYPE  , 3 },    /* 122 VL(1) */
  { VERTICAL_0_TYPE       , 1 },    /* 123 V(0)  */
  { HORIZONTAL_TYPE       , 3 },    /* 124 HOR   */
  { VERTICAL_0_TYPE       , 1 },    /* 125 V(0)  */
  { VERTICAL_RIGHT_1_TYPE , 3 },    /* 126 VR(1) */
  { VERTICAL_0_TYPE       , 1 },    /* 127 V(0)  */
};

/****************************/
/* Decode Run Length table  */
/****************************/ struct DecodeTable G_tran_white_decode_table[512] =
 {
  (   -1,    0 ),    /*    0 */
  (    3,    4 ),    /*    1 */
  (   11,    5 ),    /*    2 */
  (    5,    4 ),    /*    3 */
  (   12,    6 ),    /*    4 */
  (    9,    5 ),    /*    5 */
  ( 1664,    6 ),    /*    6 */
  (    6,    4 ),    /*    7 */
  (   20,    7 ),    /*    8 */
  (  128,    5 ),    /*    9 */
  (   24,    7 ),    /*   10 */
  (   14,    6 ),    /*   11 */
  (   28,    7 ),    /*   12 */
  (    4,    4 ),    /*   13 */
  (    2,    4 ),    /*   14 */
  (    7,    4 ),    /*   15 */
  (   23,    7 ),    /*   16 */
  (    3,    4 ),    /*   17 */
  (   27,    7 ),    /*   18 */
  (    5,    4 ),    /*   19 */
  (   39,    8 ),    /*   20 */
  (   16,    6 ),    /*   21 */
  (  576,    8 ),    /*   22 */
  (    6,    4 ),    /*   23 */
  (   19,    7 ),    /*   24 */
  (    8,    5 ),    /*   25 */
  (   55,    8 ),    /*   26 */
  (   64,    5 ),    /*   27 */
  (   10,    5 ),    /*   28 */
  (    4,    4 ),    /*   29 */
  (    2,    4 ),    /*   30 */
  (    7,    4 ),    /*   31 */
  (   45,    8 ),    /*   32 */
  (    3,    4 ),    /*   33 */
  (   11,    5 ),    /*   34 */
  (    5,    4 ),    /*   35 */
  (   53,    8 ),    /*   36 */
  (    9,    5 ),    /*   37 */
  (  448,    8 ),    /*   38 */
  (    6,    4 ),    /*   39 */
  (   35,    8 ),    /*   40 */
  (  128,    5 ),    /*   41 */
  (   51,    8 ),    /*   42 */
  (   15,    6 ),    /*   43 */
  (   63,    8 ),    /*   44 */
  (    4,    4 ),    /*   45 */
  (    2,    4 ),    /*   46 */
  (    7,    4 ),    /*   47 */
  (   13,    6 ),    /*   48 */
```

```
    (    3,    4 ),    /*  49 */
    ( 1472,    9 ),    /*  50 */
    (    5,    4 ),    /*  51 */
    (   43,    8 ),    /*  52 */
    (   17,    6 ),    /*  53 */
    ( 1216,    9 ),    /*  54 */
    (    6,    4 ),    /*  55 */
    (    1,    6 ),    /*  56 */
    (    8,    5 ),    /*  57 */
    (  192,    6 ),    /*  58 */
    (   64,    5 ),    /*  59 */
    (   10,    5 ),    /*  60 */
    (    4,    4 ),    /*  61 */
    (    2,    4 ),    /*  62 */
    (    7,    4 ),    /*  63 */
    (   29,    8 ),    /*  64 */
    (    3,    4 ),    /*  65 */
    (   11,    5 ),    /*  66 */
    (    5,    4 ),    /*  67 */
    (   12,    6 ),    /*  68 */
    (    9,    5 ),    /*  69 */
    ( 1664,    6 ),    /*  70 */
    (    6,    4 ),    /*  71 */
    (   33,    8 ),    /*  72 */
    (  128,    5 ),    /*  73 */
    (   49,    8 ),    /*  74 */
    (   14,    6 ),    /*  75 */
    (   61,    8 ),    /*  76 */
    (    4,    4 ),    /*  77 */
    (    2,    4 ),    /*  78 */
    (    7,    4 ),    /*  79 */
    (   47,    8 ),    /*  80 */
    (    3,    4 ),    /*  81 */
    (   59,    8 ),    /*  82 */
    (    5,    4 ),    /*  83 */
    (   41,    8 ),    /*  84 */
    (   16,    6 ),    /*  85 */
    (  960,    9 ),    /*  86 */
    (    6,    4 ),    /*  87 */
    (   31,    8 ),    /*  88 */
    (    8,    5 ),    /*  89 */
    (   57,    8 ),    /*  90 */
    (   64,    5 ),    /*  91 */
    (   10,    5 ),    /*  92 */
    (    4,    4 ),    /*  93 */
    (    2,    4 ),    /*  94 */
    (    7,    4 ),    /*  95 */
    (   22,    7 ),    /*  96 */
    (    3,    4 ),    /*  97 */
    (   11,    5 ),    /*  98 */
    (    5,    4 ),    /*  99 */
    (   26,    7 ),    /* 100 */
    (    9,    5 ),    /* 101 */
    (  704,    9 ),    /* 102 */
    (    6,    4 ),    /* 103 */
    (   37,    8 ),    /* 104 */

(  128,    5 ),    /* 105 */
    (   25,    7 ),    /* 106 */
    (   15,    6 ),    /* 107 */
    (  320,    8 ),    /* 108 */
    (    4,    4 ),    /* 109 */
    (    2,    4 ),    /* 110 */
    (    7,    4 ),    /* 111 */
    (   13,    6 ),    /* 112 */
    (    3,    4 ),    /* 113 */
    (   18,    7 ),    /* 114 */
    (    5,    4 ),    /* 115 */
    (   21,    7 ),    /* 116 */
    (   17,    6 ),    /* 117 */
    (  256,    7 ),    /* 118 */
    (    6,    4 ),    /* 119 */
    (    1,    6 ),    /* 120 */

(    8,    5 ),    /* 121 */
    (  192,    6 ),    /* 122 */
    (   64,    5 ),    /* 123 */
    (   10,    5 ),    /* 124 */
    (    4,    4 ),    /* 125 */
    (    2,    4 ),    /* 126 */
    (    7,    4 ),    /* 127 */
    (   -1,    8 ),    /* 128 */
    (    3,    4 ),    /* 129 */
    (   11,    5 ),    /* 130 */
    (    5,    4 ),    /* 131 */
    (   12,    6 ),    /* 132 */
    (    9,    5 ),    /* 133 */
    ( 1664,    6 ),    /* 134 */
    (    6,    4 ),    /* 135 */
    (   20,    7 ),    /* 136 */
    (  128,    5 ),    /* 137 */
    (   24,    7 ),    /* 138 */
    (   14,    6 ),    /* 139 */
    (   28,    7 ),    /* 140 */
    (    4,    4 ),    /* 141 */
    (    2,    4 ),    /* 142 */
    (    7,    4 ),    /* 143 */
    (   23,    7 ),    /* 144 */
    (    3,    4 ),    /* 145 */
    (   27,    7 ),    /* 146 */
    (    5,    4 ),    /* 147 */
    (   40,    8 ),    /* 148 */
    (   16,    6 ),    /* 149 */
    (  832,    9 ),    /* 150 */
    (    6,    4 ),    /* 151 */
    (   19,    7 ),    /* 152 */
    (    8,    5 ),    /* 153 */
    (   56,    8 ),    /* 154 */
    (   64,    5 ),    /* 155 */
    (   10,    5 ),    /* 156 */
    (    4,    4 ),    /* 157 */
    (    2,    4 ),    /* 158 */
    (    7,    4 ),    /* 159 */
    (   46,    8 ),    /* 160 */

(    3,    4 ),    /* 161 */
    (   11,    5 ),    /* 162 */
    (    5,    4 ),    /* 163 */
    (   54,    8 ),    /* 164 */
    (    9,    5 ),    /* 165 */
    (  512,    8 ),    /* 166 */
    (    6,    4 ),    /* 167 */
    (   36,    8 ),    /* 168 */
    (  128,    5 ),    /* 169 */
    (   52,    8 ),    /* 170 */
    (   15,    6 ),    /* 171 */
    (    0,    8 ),    /* 172 */
    (    4,    4 ),    /* 173 */
    (    2,    4 ),    /* 174 */
    (    7,    4 ),    /* 175 */
    (   13,    6 ),    /* 176 */
    (    3,    4 ),    /* 177 */
    ( 1600,    9 ),    /* 178 */
    (    5,    4 ),    /* 179 */
    (   44,    8 ),    /* 180 */
    (   17,    6 ),    /* 181 */
    ( 1344,    9 ),    /* 182 */
    (    6,    4 ),    /* 183 */
    (    1,    6 ),    /* 184 */
    (    8,    5 ),    /* 185 */
    (  192,    6 ),    /* 186 */
    (   64,    5 ),    /* 187 */
    (   10,    5 ),    /* 188 */
    (    4,    4 ),    /* 189 */
    (    2,    4 ),    /* 190 */
    (    7,    4 ),    /* 191 */
    (   30,    8 ),    /* 192 */
    (    3,    4 ),    /* 193 */
```

```
{   11,    5 },    /*  194 */
{    5,    4 },    /*  195 */
{   12,    6 },    /*  196 */
{    9,    5 },    /*  197 */
{ 1664,    6 },    /*  198 */
{    6,    4 },    /*  199 */
{   34,    8 },    /*  200 */
{  128,    5 },    /*  201 */
{   50,    8 },    /*  202 */
{   14,    6 },    /*  203 */
{   62,    8 },    /*  204 */
{    4,    4 },    /*  205 */
{    2,    4 },    /*  206 */
{    7,    4 },    /*  207 */
{   48,    8 },    /*  208 */
{    3,    4 },    /*  209 */
{   60,    8 },    /*  210 */
{    5,    4 },    /*  211 */
{   42,    8 },    /*  212 */
{   16,    6 },    /*  213 */
{ 1088,    9 },    /*  214 */
{    6,    4 },    /*  215 */
{   32,    8 },    /*  216 */
{    8,    5 },    /*  217 */
{   58,    8 },    /*  218 */
{   64,    5 },    /*  219 */
{   10,    5 },    /*  220 */
{    4,    4 },    /*  221 */
{    2,    4 },    /*  222 */
{    7,    4 },    /*  223 */
{   22,    7 },    /*  224 */
{    3,    4 },    /*  225 */
{   11,    5 },    /*  226 */
{    5,    4 },    /*  227 */
{   26,    7 },    /*  228 */
{    9,    5 },    /*  229 */
{  640,    8 },    /*  230 */
{    6,    4 },    /*  231 */
{   38,    8 },    /*  232 */
{  128,    5 },    /*  233 */
{   25,    7 },    /*  234 */
{   15,    6 },    /*  235 */
{  384,    8 },    /*  236 */
{    4,    4 },    /*  237 */
{    2,    4 },    /*  238 */
{    7,    4 },    /*  239 */
{   13,    6 },    /*  240 */
{    3,    4 },    /*  241 */
{   18,    7 },    /*  242 */
{    5,    4 },    /*  243 */
{   21,    7 },    /*  244 */
{   17,    6 },    /*  245 */
{  256,    7 },    /*  246 */
{    6,    4 },    /*  247 */
{    1,    6 },    /*  248 */
{    8,    5 },    /*  249 */
{  192,    6 },    /*  250 */
{   64,    5 },    /*  251 */
{   10,    5 },    /*  252 */
{    4,    4 },    /*  253 */
{    2,    4 },    /*  254 */
{    7,    4 },    /*  255 */
{   -1,    0 },    /*  256 */
{    3,    4 },    /*  257 */
{   11,    5 },    /*  258 */
{    5,    4 },    /*  259 */
{   12,    6 },    /*  260 */
{    9,    5 },    /*  261 */
{ 1664,    6 },    /*  262 */
{    6,    4 },    /*  263 */
{   20,    7 },    /*  264 */
{  128,    5 },    /*  265 */
{   24,    7 },    /*  266 */
{   14,    6 },    /*  267 */
{   28,    7 },    /*  268 */
{    4,    4 },    /*  269 */
{    2,    4 },    /*  270 */
{    7,    4 },    /*  271 */
{   23,    7 },    /*  272 */
{    3,    4 },    /*  273 */
{   27,    7 },    /*  274 */
{    5,    4 },    /*  275 */
{   39,    8 },    /*  276 */
{   16,    6 },    /*  277 */
{  576,    8 },    /*  278 */
{    6,    4 },    /*  279 */
{   19,    7 },    /*  280 */
{    8,    5 },    /*  281 */
{   55,    8 },    /*  282 */
{   64,    5 },    /*  283 */
{   10,    5 },    /*  284 */
{    4,    4 },    /*  285 */
{    2,    4 },    /*  286 */
{    7,    4 },    /*  287 */
{   45,    8 },    /*  288 */
{    3,    4 },    /*  289 */
{   11,    5 },    /*  290 */
{    5,    4 },    /*  291 */
{   53,    8 },    /*  292 */
{    9,    5 },    /*  293 */
{  448,    8 },    /*  294 */
{    6,    4 },    /*  295 */
{   35,    8 },    /*  296 */
{  128,    5 },    /*  297 */
{   51,    8 },    /*  298 */
{   15,    6 },    /*  299 */
{   63,    8 },    /*  300 */
{    4,    4 },    /*  301 */
{    2,    4 },    /*  302 */
{    7,    4 },    /*  303 */
{   13,    6 },    /*  304 */
{    3,    4 },    /*  305 */
{ 1536,    9 },    /*  306 */
{    5,    4 },    /*  307 */
{   43,    8 },    /*  308 */
{   17,    6 },    /*  309 */
{ 1280,    9 },    /*  310 */
{    6,    4 },    /*  311 */
{    1,    6 },    /*  312 */
{    8,    5 },    /*  313 */
{  192,    6 },    /*  314 */
{   64,    5 },    /*  315 */
{   10,    5 },    /*  316 */
{    4,    4 },    /*  317 */
{    2,    4 },    /*  318 */
{    7,    4 },    /*  319 */
{   29,    8 },    /*  320 */
{    3,    4 },    /*  321 */
{   11,    5 },    /*  322 */
{    5,    4 },    /*  323 */
{   12,    6 },    /*  324 */
{    9,    5 },    /*  325 */
{ 1664,    6 },    /*  326 */
{    6,    4 },    /*  327 */
{   33,    8 },    /*  328 */
{  128,    5 },    /*  329 */
{   49,    8 },    /*  330 */
{   14,    6 },    /*  331 */
{   61,    8 },    /*  332 */
{    4,    4 },    /*  333 */
{    2,    4 },    /*  334 */
{    7,    4 },    /*  335 */
{   47,    8 },    /*  336 */
{    3,    4 },    /*  337 */
{   59,    8 },    /*  338 */
{    5,    4 },    /*  339 */
{   41,    8 },    /*  340 */
{   16,    6 },    /*  341 */
{ 1024,    9 },    /*  342 */
{    6,    4 },    /*  343 */
```

```
{    31,    8 },    /*  344 */
{     8,    5 },    /*  345 */
{    57,    8 },    /*  346 */
{    64,    5 },    /*  347 */
{    10,    5 },    /*  348 */
{     4,    4 },    /*  349 */
{     2,    4 },    /*  350 */
{     7,    4 },    /*  351 */
{    22,    7 },    /*  352 */
{     3,    4 },    /*  353 */
{    11,    5 },    /*  354 */
{     5,    4 },    /*  355 */
{    26,    7 },    /*  356 */
{     9,    5 },    /*  357 */
{   768,    9 },    /*  358 */
{     6,    4 },    /*  359 */
{    37,    8 },    /*  360 */
{   128,    5 },    /*  361 */
{    25,    7 },    /*  362 */
{    15,    6 },    /*  363 */
{   320,    8 },    /*  364 */
{     4,    4 },    /*  365 */
{     2,    4 },    /*  366 */
{     7,    4 },    /*  367 */
{    13,    6 },    /*  368 */
{     3,    4 },    /*  369 */
{    18,    7 },    /*  370 */
{     5,    4 },    /*  371 */
{    21,    7 },    /*  372 */
{    17,    6 },    /*  373 */
{   256,    7 },    /*  374 */
{     6,    4 },    /*  375 */
{     1,    6 },    /*  376 */
{     8,    5 },    /*  377 */
{   192,    6 },    /*  378 */
{    64,    5 },    /*  379 */
{    10,    5 },    /*  380 */
{     4,    4 },    /*  381 */
{     2,    4 },    /*  382 */
{     7,    4 },    /*  383 */
{    -1,    8 },    /*  384 */
{     3,    4 },    /*  385 */
{    11,    5 },    /*  386 */
{     5,    4 },    /*  387 */
{    12,    6 },    /*  388 */
{     9,    5 },    /*  389 */
{  1664,    6 },    /*  390 */
{     6,    4 },    /*  391 */
{    20,    7 },    /*  392 */
{   128,    5 },    /*  393 */
{    24,    7 },    /*  394 */
{    14,    6 },    /*  395 */
{    28,    7 },    /*  396 */
{     4,    4 },    /*  397 */
{     2,    4 },    /*  398 */
{     7,    4 },    /*  399 */
{    23,    7 },    /*  400 */
{     3,    4 },    /*  401 */
{    27,    7 },    /*  402 */
{     5,    4 },    /*  403 */
{    40,    8 },    /*  404 */
{    16,    6 },    /*  405 */
{   896,    9 },    /*  406 */
{     6,    4 },    /*  407 */
{    19,    7 },    /*  408 */
{     8,    5 },    /*  409 */
{    56,    8 },    /*  410 */
{    64,    5 },    /*  411 */
{    10,    5 },    /*  412 */
{     4,    4 },    /*  413 */
{     2,    4 },    /*  414 */
{     7,    4 },    /*  415 */
{    46,    8 },    /*  416 */
{     3,    4 },    /*  417 */
{    11,    5 },    /*  418 */
{     5,    4 },    /*  419 */
{    54,    8 },    /*  420 */
{     9,    5 },    /*  421 */
{   512,    8 },    /*  422 */
{     6,    4 },    /*  423 */
{    36,    8 },    /*  424 */
{   128,    5 },    /*  425 */
{    52,    8 },    /*  426 */
{    15,    6 },    /*  427 */
{     0,    8 },    /*  428 */
{     4,    4 },    /*  429 */
{     2,    4 },    /*  430 */
{     7,    4 },    /*  431 */
{    13,    6 },    /*  432 */
{     3,    4 },    /*  433 */
{  1728,    9 },    /*  434 */
{     5,    4 },    /*  435 */
{    44,    8 },    /*  436 */
{    17,    6 },    /*  437 */
{  1408,    9 },    /*  438 */
{     6,    4 },    /*  439 */
{     1,    6 },    /*  440 */
{     8,    5 },    /*  441 */
{   192,    6 },    /*  442 */
{    64,    5 },    /*  443 */
{    10,    5 },    /*  444 */
{     4,    4 },    /*  445 */
{     2,    4 },    /*  446 */
{     7,    4 },    /*  447 */
{    30,    8 },    /*  448 */
{     3,    4 },    /*  449 */
{    11,    5 },    /*  450 */
{     5,    4 },    /*  451 */
{    12,    6 },    /*  452 */
{     9,    5 },    /*  453 */
{  1664,    6 },    /*  454 */
{     6,    4 },    /*  455 */
{    34,    8 },    /*  456 */
{   128,    5 },    /*  457 */
{    50,    8 },    /*  458 */
{    14,    6 },    /*  459 */
{    62,    8 },    /*  460 */
{     4,    4 },    /*  461 */
{     2,    4 },    /*  462 */
{     7,    4 },    /*  463 */
{    48,    8 },    /*  464 */
{     3,    4 },    /*  465 */
{    60,    8 },    /*  466 */
{     5,    4 },    /*  467 */
{    42,    8 },    /*  468 */
{    16,    6 },    /*  469 */
{  1152,    9 },    /*  470 */
{     6,    4 },    /*  471 */
{    32,    8 },    /*  472 */
{     8,    5 },    /*  473 */
{    58,    8 },    /*  474 */
{    64,    5 },    /*  475 */
{    10,    5 },    /*  476 */
{     4,    4 },    /*  477 */
{     2,    4 },    /*  478 */
{     7,    4 },    /*  479 */
{    22,    7 },    /*  480 */
{     3,    4 },    /*  481 */
{    11,    5 },    /*  482 */
{     5,    4 },    /*  483 */
{    26,    7 },    /*  484 */
{     9,    5 },    /*  485 */
{   640,    8 },    /*  486 */
{     6,    4 },    /*  487 */
{    38,    8 },    /*  488 */
{   128,    5 },    /*  489 */
{    25,    7 },    /*  490 */
{    15,    6 },    /*  491 */
{   384,    8 },    /*  492 */
{     4,    4 },    /*  493 */
```

```c
    (    2,    4 ),        /*  494 */
    (    7,    4 ),        /*  495 */
    (   13,    6 ),        /*  496 */
    (    3,    4 ),        /*  497 */
    (   18,    7 ),        /*  498 */
    (    5,    4 ),        /*  499 */
    (   21,    7 ),        /*  500 */
    (   17,    6 ),        /*  501 */
    (  256,    7 ),        /*  502 */
    (    6,    4 ),        /*  503 */
    (    1,    6 ),        /*  504 */
    (    8,    5 ),        /*  505 */
    (  192,    6 ),        /*  506 */
    (   64,    5 ),        /*  507 */
    (   10,    5 ),        /*  508 */
    (    4,    4 ),        /*  509 */
    (    2,    4 ),        /*  510 */
    (    7,    4 ),        /*  511 */
};

struct DecodeTable G_tran_white_supplement_decode_table[16] =
{
    ( 1792,    3 ),        /*    0 */
    ( 1856,    3 ),        /*    1 */
    ( 2112,    4 ),        /*    2 */
    ( 2368,    4 ),        /*    3 */
    ( 1984,    4 ),        /*    4 */
    ( 1920,    3 ),        /*    5 */
    ( 2240,    4 ),        /*    6 */
    ( 2496,    4 ),        /*    7 */
    ( 1792,    3 ),        /*    8 */
    ( 1856,    3 ),        /*    9 */
    ( 2176,    4 ),        /*   10 */
    ( 2432,    4 ),        /*   11 */
    ( 2048,    4 ),        /*   12 */
    ( 1920,    3 ),        /*   13 */
    ( 2304,    4 ),        /*   14 */
    ( 2560,    4 ),        /*   15 */
};

struct DecodeTable G_tran_black_decode_table[64] =
{
    (   -1,    4 ),        /*    0 */
    (    3,    2 ),        /*    1 */
    (    1,    3 ),        /*    2 */
    (    2,    2 ),        /*    3 */
    (    6,    4 ),        /*    4 */
    (    3,    2 ),        /*    5 */
    (    4,    3 ),        /*    6 */
    (    2,    2 ),        /*    7 */
    (    9,    6 ),        /*    8 */
    (    3,    2 ),        /*    9 */
    (    1,    3 ),        /*   10 */
    (    2,    2 ),        /*   11 */
    (    5,    4 ),        /*   12 */
    (    3,    2 ),        /*   13 */
    (    4,    3 ),        /*   14 */
    (    2,    2 ),        /*   15 */
    (   -1,    4 ),        /*   16 */
    (    3,    2 ),        /*   17 */
    (    1,    3 ),        /*   18 */
    (    2,    2 ),        /*   19 */
    (    6,    4 ),        /*   20 */
    (    3,    2 ),        /*   21 */
    (    4,    3 ),        /*   22 */
    (    2,    2 ),        /*   23 */
    (    7,    5 ),        /*   24 */
    (    3,    2 ),        /*   25 */
    (    1,    3 ),        /*   26 */
    (    2,    2 ),        /*   27 */
    (    5,    4 ),        /*   28 */
    (    3,    2 ),        /*   29 */
    (    4,    3 ),        /*   30 */
```

```c
    {     2,    2 },    /*   31 */
    {    -1,    4 },    /*   32 */
    {     3,    2 },    /*   33 */
    {     1,    3 },    /*   34 */
    {     2,    2 },    /*   35 */
    {     6,    4 },    /*   36 */
    {     3,    2 },    /*   37 */
    {     4,    3 },    /*   38 */
    {     2,    2 },    /*   39 */
    {     8,    6 },    /*   40 */
    {     3,    2 },    /*   41 */
    {     1,    3 },    /*   42 */
    {     2,    2 },    /*   43 */
    {     5,    4 },    /*   44 */
    {     3,    2 },    /*   45 */
    {     4,    3 },    /*   46 */
    {     2,    2 },    /*   47 */
    {    -1,    4 },    /*   48 */
    {     3,    2 },    /*   49 */
    {     1,    3 },    /*   50 */
    {     2,    2 },    /*   51 */
    {     6,    4 },    /*   52 */
    {     3,    2 },    /*   53 */
    {     4,    3 },    /*   54 */
    {     2,    2 },    /*   55 */
    {     7,    5 },    /*   56 */
    {     3,    2 },    /*   57 */
    {     1,    3 },    /*   58 */
    {     2,    2 },    /*   59 */
    {     5,    4 },    /*   60 */
    {     3,    2 },    /*   61 */
    {     4,    3 },    /*   62 */
    {     2,    2 },    /*   63 */
};

struct DecodeTable G_tran_black_supplement_decode_table[512] =
{
    {    -1,    0 },    /*    0 */
    {    10,    3 },    /*    1 */
    {    13,    4 },    /*    2 */
    {    15,    5 },    /*    3 */
    {    18,    6 },    /*    4 */
    {    11,    3 },    /*    5 */
    {    17,    6 },    /*    6 */
    {    12,    3 },    /*    7 */
    {  1792,    7 },    /*    8 */
    {    10,    3 },    /*    9 */
    {    23,    7 },    /*   10 */
    {    20,    7 },    /*   11 */
    {    25,    7 },    /*   12 */
    {    11,    3 },    /*   13 */
    {    14,    4 },    /*   14 */
    {    12,    3 },    /*   15 */
    {    -1,    0 },    /*   16 */
    {    10,    3 },    /*   17 */
    {    13,    4 },    /*   18 */
    {   128,    8 },    /*   19 */
    {    56,    8 },    /*   20 */
    {    11,    3 },    /*   21 */
    {    30,    8 },    /*   22 */
    {    12,    3 },    /*   23 */
    {  1856,    7 },    /*   24 */
    {    10,    3 },    /*   25 */
    {    57,    8 },    /*   26 */
    {    21,    7 },    /*   27 */
    {    54,    8 },    /*   28 */
    {    11,    3 },    /*   29 */
    {    14,    4 },    /*   30 */
    {    12,    3 },    /*   31 */
    {    -1,    0 },    /*   32 */
    {    10,    3 },    /*   33 */
    {    13,    4 },    /*   34 */
    {    15,    5 },    /*   35 */
    {    52,    8 },    /*   36 */
    {    11,    3 },    /*   37 */
```

```
{   48,    8 },    /*  38 */
{   12,    3 },    /*  39 */
{ 2112,    8 },    /*  40 */
{   10,    3 },    /*  41 */
{   44,    8 },    /*  42 */
{   36,    8 },    /*  43 */
{  384,    8 },    /*  44 */
{   11,    3 },    /*  45 */
{   14,    4 },    /*  46 */
{   12,    3 },    /*  47 */
{   -1,    0 },    /*  48 */
{   10,    3 },    /*  49 */
{   13,    4 },    /*  50 */
{   28,    8 },    /*  51 */
{   60,    8 },    /*  52 */
{   11,    3 },    /*  53 */
{   40,    8 },    /*  54 */
{   12,    3 },    /*  55 */
{ 2368,    8 },    /*  56 */
{   10,    3 },    /*  57 */
{   16,    6 },    /*  58 */
{    0,    6 },    /*  59 */
{   64,    6 },    /*  60 */
{   11,    3 },    /*  61 */
{   14,    4 },    /*  62 */
{   12,    3 },    /*  63 */
{   -1,    0 },    /*  64 */
{   10,    3 },    /*  65 */
{   13,    4 },    /*  66 */
{   15,    5 },    /*  67 */
{   18,    6 },    /*  68 */
{   11,    3 },    /*  69 */
{   17,    6 },    /*  70 */
{   12,    3 },    /*  71 */
{ 1984,    8 },    /*  72 */
{   10,    3 },    /*  73 */
{   50,    8 },    /*  74 */
{   34,    8 },    /*  75 */
{ 1664,    9 },    /*  76 */
{   11,    3 },    /*  77 */
{   14,    4 },    /*  78 */
{   12,    3 },    /*  79 */
{   -1,    0 },    /*  80 */
{   10,    3 },    /*  81 */
{   13,    4 },    /*  82 */
{   26,    8 },    /*  83 */
{ 1408,    9 },    /*  84 */
{   11,    3 },    /*  85 */
{   32,    8 },    /*  86 */
{   12,    3 },    /*  87 */
{ 1920,    7 },    /*  88 */
{   10,    3 },    /*  89 */
{   61,    8 },    /*  90 */
{   42,    8 },    /*  91 */
{ 1024,    9 },    /*  92 */
{   11,    3 },    /*  93 */
{   14,    4 },    /*  94 */
{   12,    3 },    /*  95 */
{   -1,    0 },    /*  96 */
{   10,    3 },    /*  97 */
{   13,    4 },    /*  98 */
{   15,    5 },    /*  99 */
{  768,    9 },    /* 100 */
{   11,    3 },    /* 101 */
{   62,    8 },    /* 102 */
{   12,    3 },    /* 103 */
{ 2240,    8 },    /* 104 */
{   10,    3 },    /* 105 */
{   46,    8 },    /* 106 */
{   38,    8 },    /* 107 */
{  512,    9 },    /* 108 */
{   11,    3 },    /* 109 */
{   14,    4 },    /* 110 */
{   12,    3 },    /* 111 */
{   -1,    0 },    /* 112 */
{   10,    3 },    /* 113 */
{   13,    4 },    /* 114 */
{   19,    7 },    /* 115 */
{   24,    7 },    /* 116 */
{   11,    3 },    /* 117 */
{   22,    7 },    /* 118 */
{   12,    3 },    /* 119 */
{ 2496,    8 },    /* 120 */
{   10,    3 },    /* 121 */
{   16,    6 },    /* 122 */
{    0,    6 },    /* 123 */
{   64,    6 },    /* 124 */
{   11,    3 },    /* 125 */
{   14,    4 },    /* 126 */
{   12,    3 },    /* 127 */
{   -1,    0 },    /* 128 */
{   10,    3 },    /* 129 */
{   13,    4 },    /* 130 */
{   15,    5 },    /* 131 */
{   18,    6 },    /* 132 */
{   11,    3 },    /* 133 */
{   17,    6 },    /* 134 */
{   12,    3 },    /* 135 */
{ 1792,    7 },    /* 136 */
{   10,    3 },    /* 137 */
{   23,    7 },    /* 138 */
{   20,    7 },    /* 139 */
{   25,    7 },    /* 140 */
{   11,    3 },    /* 141 */
{   14,    4 },    /* 142 */
{   12,    3 },    /* 143 */
{   -1,    0 },    /* 144 */
{   10,    3 },    /* 145 */
{   13,    4 },    /* 146 */
{  192,    8 },    /* 147 */
{ 1280,    9 },    /* 148 */
{   11,    3 },    /* 149 */
{   31,    8 },    /* 150 */
{   12,    3 },    /* 151 */
{ 1856,    7 },    /* 152 */
{   10,    3 },    /* 153 */
{   58,    8 },    /* 154 */
{   21,    7 },    /* 155 */
{  896,    9 },    /* 156 */
{   11,    3 },    /* 157 */
{   14,    4 },    /* 158 */
{   12,    3 },    /* 159 */
{   -1,    0 },    /* 160 */
{   10,    3 },    /* 161 */
{   13,    4 },    /* 162 */
{   15,    5 },    /* 163 */
{  640,    9 },    /* 164 */
{   11,    3 },    /* 165 */
{   49,    8 },    /* 166 */
{   12,    3 },    /* 167 */
{ 2176,    8 },    /* 168 */
{   10,    3 },    /* 169 */
{   45,    8 },    /* 170 */
{   37,    8 },    /* 171 */
{  448,    8 },    /* 172 */
{   11,    3 },    /* 173 */
{   14,    4 },    /* 174 */
{   12,    3 },    /* 175 */
{   -1,    0 },    /* 176 */
{   10,    3 },    /* 177 */
{   13,    4 },    /* 178 */
{   29,    8 },    /* 179 */
{ 1536,    9 },    /* 180 */
{   11,    3 },    /* 181 */
{   41,    8 },    /* 182 */
{   12,    3 },    /* 183 */
{ 2432,    8 },    /* 184 */
```

```
{    10,    3 },      /* 185 */
{    16,    6 },      /* 186 */
{     0,    6 },      /* 187 */
{    64,    6 },      /* 188 */
{    11,    3 },      /* 189 */
{    14,    4 },      /* 190 */
{    12,    3 },      /* 191 */
{    -1,    0 },      /* 192 */
{    10,    3 },      /* 193 */
{    13,    4 },      /* 194 */
{    15,    5 },      /* 195 */
{    18,    6 },      /* 196 */
{    11,    3 },      /* 197 */
{    17,    6 },      /* 198 */
{    12,    3 },      /* 199 */
{  2048,    8 },      /* 200 */
{    10,    3 },      /* 201 */
{    51,    8 },      /* 202 */
{    35,    8 },      /* 203 */
{   320,    8 },      /* 204 */
{    11,    3 },      /* 205 */
{    14,    4 },      /* 206 */
{    12,    3 },      /* 207 */
{    -1,    0 },      /* 208 */
{    10,    3 },      /* 209 */
{    13,    4 },      /* 210 */
{    27,    8 },      /* 211 */
{    59,    8 },      /* 212 */
{    11,    3 },      /* 213 */
{    33,    8 },      /* 214 */
{    12,    3 },      /* 215 */
{  1920,    7 },      /* 216 */
{    10,    3 },      /* 217 */
{   256,    8 },      /* 218 */
{    43,    8 },      /* 219 */
{  1152,    9 },      /* 220 */
{    11,    3 },      /* 221 */
{    14,    4 },      /* 222 */
{    12,    3 },      /* 223 */
{    -1,    0 },      /* 224 */
{    10,    3 },      /* 225 */
{    13,    4 },      /* 226 */
{    15,    5 },      /* 227 */
{    55,    8 },      /* 228 */
{    11,    3 },      /* 229 */
{    63,    8 },      /* 230 */
{    12,    3 },      /* 231 */
{  2304,    8 },      /* 232 */
{    10,    3 },      /* 233 */
{    47,    8 },      /* 234 */
{    39,    8 },      /* 235 */
{    53,    8 },      /* 236 */
{    11,    3 },      /* 237 */
{    14,    4 },      /* 238 */
{    12,    3 },      /* 239 */
{    -1,    0 },      /* 240 */
{    10,    3 },      /* 241 */
{    13,    4 },      /* 242 */
{    19,    7 },      /* 243 */
{    24,    7 },      /* 244 */
{    11,    3 },      /* 245 */
{    22,    7 },      /* 246 */
{    12,    3 },      /* 247 */
{  2560,    8 },      /* 248 */
{    10,    3 },      /* 249 */
{    16,    6 },      /* 250 */
{     0,    6 },      /* 251 */
{    64,    6 },      /* 252 */
{    11,    3 },      /* 253 */
{    14,    4 },      /* 254 */
{    12,    3 },      /* 255 */
{    -1,    0 },      /* 256 */
{    10,    3 },      /* 257 */
{    13,    4 },      /* 258 */
{    15,    5 },      /* 259 */
{    18,    6 },      /* 260 */
{    11,    3 },      /* 261 */
{    17,    6 },      /* 262 */
{    12,    3 },      /* 263 */
{  1792,    7 },      /* 264 */
{    10,    3 },      /* 265 */
{    23,    7 },      /* 266 */
{    20,    7 },      /* 267 */
{    25,    7 },      /* 268 */
{    11,    3 },      /* 269 */
{    14,    4 },      /* 270 */
{    12,    3 },      /* 271 */
{    -1,    0 },      /* 272 */
{    10,    3 },      /* 273 */
{    13,    4 },      /* 274 */
{   128,    8 },      /* 275 */
{    56,    8 },      /* 276 */
{    11,    3 },      /* 277 */
{    30,    8 },      /* 278 */
{    12,    3 },      /* 279 */
{  1856,    7 },      /* 280 */
{    10,    3 },      /* 281 */
{    57,    8 },      /* 282 */
{    21,    7 },      /* 283 */
{    54,    8 },      /* 284 */
{    11,    3 },      /* 285 */
{    14,    4 },      /* 286 */
{    12,    3 },      /* 287 */
{    -1,    0 },      /* 288 */
{    10,    3 },      /* 289 */
{    13,    4 },      /* 290 */
{    15,    5 },      /* 291 */
{    52,    8 },      /* 292 */
{    11,    3 },      /* 293 */
{    48,    8 },      /* 294 */
{    12,    3 },      /* 295 */
{  2112,    8 },      /* 296 */
{    10,    3 },      /* 297 */
{    44,    8 },      /* 298 */
{    36,    8 },      /* 299 */
{   384,    8 },      /* 300 */
{    11,    3 },      /* 301 */
{    14,    4 },      /* 302 */
{    12,    3 },      /* 303 */
{    -1,    0 },      /* 304 */
{    10,    3 },      /* 305 */
{    13,    4 },      /* 306 */
{    28,    8 },      /* 307 */
{    60,    8 },      /* 308 */
{    11,    3 },      /* 309 */
{    40,    8 },      /* 310 */
{    12,    3 },      /* 311 */
{  2368,    8 },      /* 312 */
{    10,    3 },      /* 313 */
{    16,    6 },      /* 314 */
{     0,    6 },      /* 315 */
{    64,    6 },      /* 316 */
{    11,    3 },      /* 317 */
{    14,    4 },      /* 318 */
{    12,    3 },      /* 319 */
{    -1,    0 },      /* 320 */
{    10,    3 },      /* 321 */
{    13,    4 },      /* 322 */
{    15,    5 },      /* 323 */
{    18,    6 },      /* 324 */
{    11,    3 },      /* 325 */
{    17,    6 },      /* 326 */
{    12,    3 },      /* 327 */
{  1984,    8 },      /* 328 */
{    10,    3 },      /* 329 */
{    50,    8 },      /* 330 */
{    34,    8 },      /* 331 */
{  1728,    9 },      /* 332 */
{    11,    3 },      /* 333 */
{    14,    4 },      /* 334 */
```

```
    {   12,    3 },      /*  335 */
    {   -1,    0 },      /*  336 */
    {   10,    3 },      /*  337 */
    {   13,    4 },      /*  338 */
    {   26,    8 },      /*  339 */
    { 1472,    9 },      /*  340 */
    {   11,    3 },      /*  341 */
    {   32,    8 },      /*  342 */
    {   12,    3 },      /*  343 */
    { 1920,    7 },      /*  344 */
    {   10,    3 },      /*  345 */
    {   61,    8 },      /*  346 */
    {   42,    8 },      /*  347 */
    { 1088,    9 },      /*  348 */
    {   11,    3 },      /*  349 */
    {   14,    4 },      /*  350 */
    {   12,    3 },      /*  351 */
    {   -1,    0 },      /*  352 */
    {   10,    3 },      /*  353 */
    {   13,    4 },      /*  354 */
    {   15,    5 },      /*  355 */
    {  832,    9 },      /*  356 */
    {   11,    3 },      /*  357 */
    {   62,    8 },      /*  358 */
    {   12,    3 },      /*  359 */
    { 2240,    8 },      /*  360 */
    {   10,    3 },      /*  361 */
    {   46,    8 },      /*  362 */
    {   38,    8 },      /*  363 */
    {  576,    9 },      /*  364 */
    {   11,    3 },      /*  365 */
    {   14,    4 },      /*  366 */
    {   12,    3 },      /*  367 */
    {   -1,    0 },      /*  368 */
    {   10,    3 },      /*  369 */
    {   13,    4 },      /*  370 */
    {   19,    7 },      /*  371 */
    {   24,    7 },      /*  372 */
    {   11,    3 },      /*  373 */
    {   22,    7 },      /*  374 */
    {   12,    3 },      /*  375 */
    { 2496,    8 },      /*  376 */
    {   10,    3 },      /*  377 */
    {   16,    6 },      /*  378 */
    {    0,    6 },      /*  379 */
    {   64,    6 },      /*  380 */
    {   11,    3 },      /*  381 */
    {   14,    4 },      /*  382 */
    {   12,    3 },      /*  383 */
    {   -1,    0 },      /*  384 */
    {   10,    3 },      /*  385 */
    {   13,    4 },      /*  386 */
    {   15,    5 },      /*  387 */
    {   18,    6 },      /*  388 */
    {   11,    3 },      /*  389 */
    {   17,    6 },      /*  390 */
    {   12,    3 },      /*  391 */
    { 1792,    7 },      /*  392 */
    {   10,    3 },      /*  393 */
    {   23,    7 },      /*  394 */
    {   20,    7 },      /*  395 */
    {   25,    7 },      /*  396 */
    {   11,    3 },      /*  397 */
    {   14,    4 },      /*  398 */
    {   12,    3 },      /*  399 */
    {   -1,    0 },      /*  400 */
    {   10,    3 },      /*  401 */
    {   13,    4 },      /*  402 */
    {  192,    8 },      /*  403 */
    { 1344,    9 },      /*  404 */
    {   11,    3 },      /*  405 */
    {   31,    8 },      /*  406 */
    {   12,    3 },      /*  407 */
    { 1856,    7 },      /*  408 */
    {   10,    3 },      /*  409 */
    {   58,    8 },      /*  410 */
    {   21,    7 },      /*  411 */
    {  960,    9 },      /*  412 */
    {   11,    3 },      /*  413 */
    {   14,    4 },      /*  414 */
    {   12,    3 },      /*  415 */
    {   -1,    0 },      /*  416 */
    {   10,    3 },      /*  417 */
    {   13,    4 },      /*  418 */
    {   15,    5 },      /*  419 */
    {  704,    9 },      /*  420 */
    {   11,    3 },      /*  421 */
    {   49,    8 },      /*  422 */
    {   12,    3 },      /*  423 */
    { 2176,    8 },      /*  424 */
    {   10,    3 },      /*  425 */
    {   45,    8 },      /*  426 */
    {   37,    8 },      /*  427 */
    {  448,    8 },      /*  428 */
    {   11,    3 },      /*  429 */
    {   14,    4 },      /*  430 */
    {   12,    3 },      /*  431 */
    {   -1,    0 },      /*  432 */
    {   10,    3 },      /*  433 */
    {   13,    4 },      /*  434 */
    {   29,    8 },      /*  435 */
    { 1600,    9 },      /*  436 */
    {   11,    3 },      /*  437 */
    {   41,    8 },      /*  438 */
    {   12,    3 },      /*  439 */
    { 2432,    8 },      /*  440 */
    {   10,    3 },      /*  441 */
    {   16,    6 },      /*  442 */
    {    0,    6 },      /*  443 */
    {   64,    6 },      /*  444 */
    {   11,    3 },      /*  445 */
    {   14,    4 },      /*  446 */
    {   12,    3 },      /*  447 */
    {   -1,    0 },      /*  448 */
    {   10,    3 },      /*  449 */
    {   13,    4 },      /*  450 */
    {   15,    5 },      /*  451 */
    {   18,    6 },      /*  452 */
    {   11,    3 },      /*  453 */
    {   17,    6 },      /*  454 */
    {   12,    3 },      /*  455 */
    { 2048,    8 },      /*  456 */
    {   10,    3 },      /*  457 */
    {   51,    8 },      /*  458 */
    {   35,    8 },      /*  459 */
    {  320,    8 },      /*  460 */
    {   11,    3 },      /*  461 */
    {   14,    4 },      /*  462 */
    {   12,    3 },      /*  463 */
    {   -1,    0 },      /*  464 */
    {   10,    3 },      /*  465 */
    {   13,    4 },      /*  466 */
    {   27,    8 },      /*  467 */
    {   59,    8 },      /*  468 */
    {   11,    3 },      /*  469 */
    {   33,    8 },      /*  470 */
    {   12,    3 },      /*  471 */
    { 1920,    7 },      /*  472 */
    {   10,    3 },      /*  473 */
    {  256,    8 },      /*  474 */
    {   43,    8 },      /*  475 */
    { 1216,    9 },      /*  476 */
    {   11,    3 },      /*  477 */
    {   14,    4 },      /*  478 */
    {   12,    3 },      /*  479 */
```

```c
    {   -1,    0 },    /* 480 */
    {   10,    3 },    /* 481 */
    {   13,    4 },    /* 482 */
    {   15,    5 },    /* 483 */
    {   55,    8 },    /* 484 */
    {   11,    3 },    /* 485 */
    {   63,    8 },    /* 486 */
    {   12,    3 },    /* 487 */
    { 2304,    8 },    /* 488 */
    {   10,    3 },    /* 489 */
    {   47,    8 },    /* 490 */
    {   39,    8 },    /* 491 */
    {   53,    8 },    /* 492 */
    {   11,    3 },    /* 493 */
    {   14,    4 },    /* 494 */
    {   12,    3 },    /* 495 */
    {   -1,    0 },    /* 496 */
    {   10,    3 },    /* 497 */
    {   13,    4 },    /* 498 */
    {   19,    7 },    /* 499 */
    {   24,    7 },    /* 500 */
    {   11,    3 },    /* 501 */
    {   22,    7 },    /* 502 */
    {   12,    3 },    /* 503 */
    { 2560,    8 },    /* 504 */
    {   10,    3 },    /* 505 */
    {   16,    6 },    /* 506 */
    {    0,    6 },    /* 507 */
    {   64,    6 },    /* 508 */
    {   11,    3 },    /* 509 */
    {   14,    4 },    /* 510 */
    {   12,    3 },    /* 511 */
};
/*
 * T.4 2D and T.6 uncompressed mode table
 *
 * First element in table is the run length or -1 for end of table.
 * Second element is string length.
 * It is only different for the W5 and Terminating case.
 */ struct DecodeUncompressedTable G_tran_uncompressed_decode_table[64] = {
    { -1, 6 },          /* 000000 = end of uncompressed mode */
    {  1, 1 },          /* 000001 = black run length 1 */
    {  1, 1 },          /* 000010 = white run length 1 */
    {  2, 2 },          /* 000011 = black run length 2 */
    {  2, 2 },          /* 000100 = white run length 2 */
    {  1, 1 },          /* 000101 = black run length 1 */
    {  1, 1 },          /* 000110 = white run length 1 */
    {  3, 3 },          /* 000111 = black run length 3 */
    {  3, 3 },          /* 001000 = white run length 3 */
    {  1, 1 },          /* 001001 = black run length 1 */
    {  1, 1 },          /* 001010 = white run length 1 */
    {  2, 2 },          /* 001011 = black run length 2 */
    {  2, 2 },          /* 001100 = white run length 2 */
    {  1, 1 },          /* 001101 = black run length 1 */
    {  1, 1 },          /* 001110 = white run length 1 */
    {  4, 4 },          /* 001111 = black run length 4 */
    {  4, 4 },          /* 010000 = white run length 4 */
    {  1, 1 },          /* 010001 = black run length 1 */
    {  1, 1 },          /* 010010 = white run length 1 */
    {  2, 2 },          /* 010011 = black run length 2 */
    {  2, 2 },          /* 010100 = white run length 2 */
    {  1, 1 },          /* 010101 = black run length 1 */
    {  1, 1 },          /* 010110 = white run length 1 */
    {  3, 3 },          /* 010111 = black run length 3 */
    {  3, 3 },          /* 011000 = white run length 3 */
    {  1, 1 },          /* 011001 = black run length 1 */
    {  1, 1 },          /* 011010 = white run length 1 */
    {  2, 2 },          /* 011011 = black run length 2 */
    {  2, 2 },          /* 011100 = white run length 2 */
    {  1, 1 },          /* 011101 = black run length 1 */
    {  1, 1 },          /* 011110 = white run length 1 */
```

```
  {  5,  5 },       /* 011111 = black run length 5 */
  {  5,  6 },       /* 100000 = white run length 6 but takes 6 bits */
  {  1,  1 },       /* 100001 = black run length 1 */
  {  1,  1 },       /* 100010 = white run length 1 */
  {  2,  2 },       /* 100011 = black run length 2 */
  {  2,  2 },       /* 100100 = white run length 2 */
  {  1,  1 },       /* 100101 = black run length 1 */
  {  1,  1 },       /* 100110 = white run length 1 */
  {  3,  3 },       /* 100111 = black run length 3 */
  {  3,  3 },       /* 101000 = white run length 3 */
  {  1,  1 },       /* 101001 = black run length 1 */
  {  1,  1 },       /* 101010 = white run length 1 */
  {  2,  2 },       /* 101011 = black run length 2 */
  {  2,  2 },       /* 101100 = white run length 2 */
  {  1,  1 },       /* 101101 = black run length 1 */
  {  1,  1 },       /* 101110 = white run length 1 */
  {  4,  4 },       /* 101111 = black run length 4 */
  {  4,  4 },       /* 110000 = white run length 4 */
  {  1,  1 },       /* 110001 = black run length 1 */
  {  1,  1 },       /* 110010 = white run length 1 */
  {  2,  2 },       /* 110011 = black run length 2 */
  {  2,  2 },       /* 110100 = white run length 2 */
  {  1,  1 },       /* 110101 = black run length 1 */
  {  1,  1 },       /* 110110 = white run length 1 */
  {  3,  3 },       /* 110111 = black run length 3 */
  {  3,  3 },       /* 111000 = white run length 3 */
  {  1,  1 },       /* 111001 = black run length 1 */
  {  1,  1 },       /* 111010 = white run length 1 */
  {  2,  2 },       /* 111011 = black run length 2 */
  {  2,  2 },       /* 111100 = white run length 2 */
  {  1,  1 },       /* 111101 = black run length 1 */
  {  1,  1 },       /* 111110 = white run length 1 */
  {  6,  6 }        /* 111111 = black run length 6 */
};

struct DecodeUncompressedEndTable G_tran_uncompressed_decode_end_table[64] = {

{ -2,  6,  0 },   /* 000000 = ERROR 12 0's in a row! */
  {  0,  2,  0 },   /* 000001 = white run length 0 */
  {  1,  3,  0 },   /* 000010 = white run length 1 */
  {  0,  2,  1 },   /* 000011 = white run length 0 */
  {  2,  4,  0 },   /* 000100 = white run length 2 */
  {  0,  2,  0 },   /* 000101 = white run length 0 */
  {  1,  3,  1 },   /* 000110 = white run length 1 */
  {  0,  2,  1 },   /* 000111 = white run length 0 */
  {  3,  5,  0 },   /* 001000 = white run length 3 */
  {  0,  2,  0 },   /* 001001 = white run length 0 */
  {  1,  3,  0 },   /* 001010 = white run length 1 */
  {  0,  2,  1 },   /* 001011 = white run length 0 */
  {  2,  4,  1 },   /* 001100 = white run length 2 */
  {  0,  2,  0 },   /* 001101 = white run length 0 */
  {  1,  3,  1 },   /* 001110 = white run length 1 */
  {  0,  2,  1 },   /* 001111 = white run length 0 */
  {  4,  6,  0 },   /* 010000 = white run length 4 */
  {  0,  2,  0 },   /* 010001 = white run length 0 */
  {  1,  3,  0 },   /* 010010 = white run length 1 */
  {  0,  2,  1 },   /* 010011 = white run length 0 */
  {  2,  4,  0 },   /* 010100 = white run length 2 */
  {  0,  2,  0 },   /* 010101 = white run length 0 */
  {  1,  3,  1 },   /* 010110 = white run length 1 */
  {  0,  2,  1 },   /* 010111 = white run length 0 */
  {  3,  5,  1 },   /* 011000 = white run length 3 */
  {  0,  2,  0 },   /* 011001 = white run length 0 */
  {  1,  3,  0 },   /* 011010 = white run length 1 */
  {  0,  2,  1 },   /* 011011 = white run length 0 */
  {  2,  4,  1 },   /* 011100 = white run length 2 */
  {  0,  2,  0 },   /* 011101 = white run length 0 */
  {  1,  3,  1 },   /* 011110 = white run length 1 */
  {  0,  2,  1 },   /* 011111 = white run length 0 */
```

```
{ -1,  6,  0 },        /* 100000 = EOFB */
{  0,  2,  0 },        /* 100001 = white run length 0 */
{  1,  3,  0 },        /* 100010 = white run length 1 */
{  0,  2,  1 },        /* 100011 = white run length 0 */
{  2,  4,  0 },        /* 100100 = white run length 2 */
{  0,  2,  0 },        /* 100101 = white run length 0 */
{  1,  3,  1 },        /* 100110 = white run length 1 */
{  0,  2,  1 },        /* 100111 = white run length 0 */
{  3,  5,  0 },        /* 101000 = white run length 3 */
{  0,  2,  0 },        /* 101001 = white run length 0 */
{  1,  3,  0 },        /* 101010 = white run length 1 */
{  0,  2,  1 },        /* 101011 = white run length 0 */
{  2,  4,  1 },        /* 101100 = white run length 2 */
{  0,  2,  0 },        /* 101101 = white run length 0 */
{  1,  3,  1 },        /* 101110 = white run length 1 */
{  0,  2,  1 },        /* 101111 = white run length 0 */
{  4,  6,  1 },        /* 110000 = white run length 4 */
{  0,  2,  0 },        /* 110001 = white run length 0 */
{  1,  3,  0 },        /* 110010 = white run length 1 */
{  0,  2,  1 },        /* 110011 = white run length 0 */
{  2,  4,  0 },        /* 110100 = white run length 2 */
{  0,  2,  0 },        /* 110101 = white run length 0 */
{  1,  3,  1 },        /* 110110 = white run length 1 */
{  0,  2,  1 },        /* 110111 = white run length 0 */
{  3,  5,  1 },        /* 111000 = white run length 3 */
{  0,  2,  0 },        /* 111001 = white run length 0 */
{  1,  3,  0 },        /* 111010 = white run length 1 */
{  0,  2,  1 },        /* 111011 = white run length 0 */
{  2,  4,  1 },        /* 111100 = white run length 2 */
{  0,  2,  0 },        /* 111101 = white run length 0 */
{  1,  3,  1 },        /* 111110 = white run length 1 */
{  0,  2,  1 }         /* 111111 = white run length 0 */
/*
 * Bit tables for T.6 bit strings
 *
 * Format: 2 bytes for length, 2 bytes for code (HL) bytes
 */ ifndef unix
option separate G_tran_white_hor_terminating_code_table
#option separate G_tran_white_hor_terminating_length_table
#option separate G_tran_black_hor_terminating_code_table
#option separate G_tran_black_hor_terminating_length_table
#option separate G_tran_white_hor_make_up_code_table
#option separate G_tran_white_hor_make_up_length_table
#option separate G_tran_black_hor_make_up_code_table
#option separate G_tran_black_hor_make_up_length_table
endif short G_tran_white_hor_terminating_code_table[64] = {
    0x00ac,        /*  0    00110101      */
    0x0038,        /*  1    000111        */
    0x000e,        /*  2    0111          */
    0x0001,        /*  3    1000          */
    0x000d,        /*  4    1011          */
    0x0003,        /*  5    1100          */
    0x0007,        /*  6    1110          */
    0x000f,        /*  7    1111          */
    0x0019,        /*  8    10011         */
    0x0005,        /*  9    10100         */
    0x001c,        /* 10    00111         */
    0x0002,        /* 11    01000         */
    0x0004,        /* 12    001000        */
    0x0030,        /* 13    000011        */
    0x000b,        /* 14    110100        */
    0x002b,        /* 15    110101        */
    0x0015,        /* 16    101010        */
    0x0035,        /* 17    101011        */
    0x0072,        /* 18    0100111       */
    0x0018,        /* 19    0001100       */
    0x0008,        /* 20    0001000       */
    0x0074,        /* 21    0010111       */
    0x0060,        /* 22    0000011       */
```

```
        0x0010,     /* 23    0000100 */
        0x000a,     /* 24    0101000 */
        0x006a,     /* 25    0101011 */
        0x0064,     /* 26    0010011 */
        0x0012,     /* 27    0100100 */
        0x000c,     /* 28    0011000 */
        0x0040,     /* 29    00000010    */
        0x00c0,     /* 30    00000011    */
        0x0058,     /* 31    00011010    */
        0x00d8,     /* 32    00011011    */
        0x0048,     /* 33    00010010    */
        0x00c8,     /* 34    00010011    */
        0x0028,     /* 35    00010100    */
        0x00a8,     /* 36    00010101    */
        0x0068,     /* 37    00010110    */
        0x00e8,     /* 38    00010111    */
        0x0014,     /* 39    00101000    */
        0x0094,     /* 40    00101001    */
        0x0054,     /* 41    00101010    */
        0x00d4,     /* 42    00101011    */
        0x0034,     /* 43    00101100    */
        0x00b4,     /* 44    00101101    */
        0x0020,     /* 45    00000100    */
        0x00a0,     /* 46    00000101    */
        0x0050,     /* 47    00001010    */
        0x00d0,     /* 48    00001011    */
        0x004a,     /* 49    01010010    */
        0x00ca,     /* 50    01010011    */
        0x002a,     /* 51    01010100    */
        0x00aa,     /* 52    01010101    */
        0x0024,     /* 53    00100100    */
        0x00a4,     /* 54    00100101    */
        0x001a,     /* 55    01011000    */
        0x009a,     /* 56    01011001    */
        0x005a,     /* 57    01011010    */
        0x00da,     /* 58    01011011    */
        0x0052,     /* 59    01001010    */
        0x00d2,     /* 60    01001011    */
        0x004c,     /* 61    00110010    */
        0x00cc,     /* 62    00110011    */
        0x002c,     /* 63    00110100    */
};

short G_tran_white_hor_terminating_length_table[64] = {
        8,      /* 0     00110101        */
        6,      /* 1     000111 */
        4,      /* 2     0111   */
        4,      /* 3     1000   */
        4,      /* 4     1011   */
        4,      /* 5     1100   */
        4,      /* 6     1110   */
        4,      /* 7     1111   */
        5,      /* 8     10011  */
        5,      /* 9     10100  */
        5,      /* 10    00111  */
        5,      /* 11    01000  */
        6,      /* 12    001000 */
        6,      /* 13    000011 */
        6,      /* 14    110100 */
        6,      /* 15    110101 */
        6,      /* 16    101010 */
        6,      /* 17    101011 */
        7,      /* 18    0100111 */
        7,      /* 19    0001100 */
        7,      /* 20    0001000 */
        7,      /* 21    0010111 */
        7,      /* 22    0000011 */
        7,      /* 23    0000100 */
        7,      /* 24    0101000 */
        7,      /* 25    0101011 */
```

```c
    7,      /* 26    0010011   */
    7,      /* 27    0100100   */
    7,      /* 28    0011000   */
    8,      /* 29    00000010        */
    8,      /* 30    00000011        */
    8,      /* 31    00011010        */
    8,      /* 32    00011011        */
    8,      /* 33    00010010        */
    8,      /* 34    00010011        */
    8,      /* 35    00010100        */
    8,      /* 36    00010101        */
    8,      /* 37    00010110        */
    8,      /* 38    00010111        */
    8,      /* 39    00101000        */
    8,      /* 40    00101001        */
    8,      /* 41    00101010        */
    8,      /* 42    00101011        */
    8,      /* 43    00101100        */
    8,      /* 44    00101101        */
    8,      /* 45    00000100        */
    8,      /* 46    00000101        */
    8,      /* 47    00001010        */
    8,      /* 48    00001011        */
    8,      /* 49    01010010        */
    8,      /* 50    01010011        */
    8,      /* 51    01010100        */
    8,      /* 52    01010101        */
    8,      /* 53    00100100        */
    8,      /* 54    00100101        */
    8,      /* 55    01011000        */
    8,      /* 56    01011001        */
    8,      /* 57    01011010        */
    8,      /* 58    01011011        */
    8,      /* 59    01001010        */
    8,      /* 60    01001011        */
    8,      /* 61    00110010        */
    8,      /* 62    00110011        */
    8,      /* 63    00110100        */
};

short G_tran_black_hor_terminating_code_table[64] = {
    0x03b0,     /*  0     0000110111      */
    0x0002,     /*  1     010       */
    0x0003,     /*  2     11        */
    0x0001,     /*  3     10        */
    0x0006,     /*  4     011       */
    0x000c,     /*  5     0011      */
    0x0004,     /*  6     0010      */
    0x0018,     /*  7     00011     */
    0x0028,     /*  8     000101    */
    0x0008,     /*  9     000100    */
    0x0010,     /* 10     0000100   */
    0x0050,     /* 11     0000101   */
    0x0070,     /* 12     0000111   */
    0x0020,     /* 13     00000100        */
    0x00e0,     /* 14     00000111        */
    0x0030,     /* 15     000011000       */
    0x03a0,     /* 16     0000010111      */
    0x0060,     /* 17     0000011000      */
    0x0040,     /* 18     0000001000      */
    0x0730,     /* 19     00001100111     */
    0x00b0,     /* 20     00001101000     */
    0x01b0,     /* 21     00001101100     */
    0x0760,     /* 22     00000110111     */
    0x00a0,     /* 23     00000101000     */
    0x0740,     /* 24     00000010111     */
    0x00c0,     /* 25     00000011000     */
    0x0530,     /* 26     000011001010    */
    0x0d30,     /* 27     000011001011    */
    0x0330,     /* 28     000011001100    */
    0x0b30,     /* 29     000011001101    */
    0x0160,     /* 30     000001101000    */
    0x0960,     /* 31     000001101001    */
```

```
    0x0560,    /* 32    000001101010    */
    0x0d60,    /* 33    000001101011    */
    0x04b0,    /* 34    000011010010    */
    0x0cb0,    /* 35    000011010011    */
    0x02b0,    /* 36    000011010100    */
    0x0ab0,    /* 37    000011010101    */
    0x06b0,    /* 38    000011010110    */
    0x0eb0,    /* 39    000011010111    */
    0x0360,    /* 40    000001101100    */
    0x0b60,    /* 41    000001101101    */
    0x05b0,    /* 42    000011011010    */
    0x0db0,    /* 43    000011011011    */
    0x02a0,    /* 44    000001010100    */
    0x0aa0,    /* 45    000001010101    */
    0x06a0,    /* 46    000001010110    */
    0x0ea0,    /* 47    000001010111    */
    0x0260,    /* 48    000001100100    */
    0x0a60,    /* 49    000001100101    */
    0x04a0,    /* 50    000001010010    */
    0x0ca0,    /* 51    000001010011    */
    0x0240,    /* 52    000000100100    */
    0x0ec0,    /* 53    000000110111    */
    0x01c0,    /* 54    000000111000    */
    0x0e40,    /* 55    000000100111    */
    0x0140,    /* 56    000000101000    */
    0x01a0,    /* 57    000001011000    */
    0x09a0,    /* 58    000001011001    */
    0x0d40,    /* 59    000000101011    */
    0x0340,    /* 60    000000101100    */
    0x05a0,    /* 61    000001011010    */
    0x0660,    /* 62    000001100110    */
    0x0e60,    /* 63    000001100111    */
};

short G_tran_black_hor_terminating_length_table[64] = {
    10,    /* 0     0000110111    */
    3,     /* 1     010           */
    2,     /* 2     11            */
    2,     /* 3     10            */
    3,     /* 4     011           */
    4,     /* 5     0011          */
    4,     /* 6     0010          */
    5,     /* 7     00011         */
    6,     /* 8     000101        */
    6,     /* 9     000100        */
    7,     /* 10    0000100       */
    7,     /* 11    0000101       */
    7,     /* 12    0000111       */
    8,     /* 13    00000100      */
    8,     /* 14    00000111      */
    9,     /* 15    000011000     */
    10,    /* 16    0000010111    */
    10,    /* 17    0000011000    */
    10,    /* 18    0000001000    */
    11,    /* 19    00001100111   */
    11,    /* 20    00001101000   */
    11,    /* 21    00001101100   */
    11,    /* 22    00000110111   */
    11,    /* 23    00000101000   */
    11,    /* 24    00000010111   */
    11,    /* 25    00000011000   */
    12,    /* 26    000011001010  */
    12,    /* 27    000011001011  */
    12,    /* 28    000011001100  */
    12,    /* 29    000011001101  */
    12,    /* 30    000001101000  */
    12,    /* 31    000001101001  */
    12,    /* 32    000001101010  */
    12,    /* 33    000001101011  */
    12,    /* 34    000011010010  */
    12,    /* 35    000011010011  */
    12,    /* 36    000011010100  */
    12,    /* 37    000011010101  */
    12,    /* 38    000011010110
```

```c
    12,   /* 39    000011010111    */
    12,   /* 40    000001101100    */
    12,   /* 41    000001101101    */
    12,   /* 42    000011011010    */
    12,   /* 43    000011011011    */
    12,   /* 44    000001010100    */
    12,   /* 45    000001010101    */
    12,   /* 46    000001010110    */
    12,   /* 47    000001010111    */
    12,   /* 48    000001100100    */
    12,   /* 49    000001100101    */
    12,   /* 50    000001010010    */
    12,   /* 51    000001010011    */
    12,   /* 52    000000100100    */
    12,   /* 53    000000110111    */
    12,   /* 54    000000111000    */
    12,   /* 55    000000100111    */
    12,   /* 56    000000101000    */
    12,   /* 57    000001011000    */
    12,   /* 58    000001011001    */
    12,   /* 59    000000101011    */

12,   /* 60    000000101100    */
    12,   /* 61    000001011010    */
    12,   /* 62    000001100110    */
    12,   /* 63    000001100111    */
};

short G_tran_white_hor_make_up_code_table[64] = {
    0x001b,       /*   64   11011       */
    0x0009,       /*  128   10010       */
    0x003a,       /*  192   010111      */
    0x0076,       /*  256   0110111     */
    0x006c,       /*  320   00110110    */
    0x00ec,       /*  384   00110111    */
    0x0026,       /*  448   01100100    */
    0x00a6,       /*  512   01100101    */
    0x0016,       /*  576   01101000    */
    0x00e6,       /*  640   01100111    */
    0x0066,       /*  704   011001100   */
    0x0166,       /*  768   011001101   */
    0x0096,       /*  832   011010010   */
    0x0196,       /*  896   011010011   */
    0x0056,       /*  960   011010100   */
    0x0156,       /* 1024   011010101   */
    0x00d6,       /* 1088   011010110   */
    0x01d6,       /* 1152   011010111   */
    0x0036,       /* 1216   011011000   */
    0x0136,       /* 1280   011011001   */
    0x00b6,       /* 1344   011011010   */
    0x01b6,       /* 1408   011011011   */
    0x0032,       /* 1472   010011000   */
    0x0132,       /* 1536   010011001   */
    0x00b2,       /* 1600   010011010   */
    0x0006,       /* 1664   011000      */
    0x01b2,       /* 1728   010011011   */
    0x0080,       /* 1792   00000001000 */
    0x0180,       /* 1856   00000001100 */
    0x0580,       /* 1920   00000001101 */
    0x0480,       /* 1984   000000010010 */
    0x0c80,       /* 2048   000000010011 */
    0x0280,       /* 2112   000000010100 */
    0x0a80,       /* 2176   000000010101 */
    0x0680,       /* 2240   000000010110 */
    0x0e80,       /* 2304   000000010111 */
    0x0380,       /* 2368   000000011100 */
    0x0b80,       /* 2432   000000011101 */
    0x0780,       /* 2496   000000011110 */
    0x0f80,       /* 2560   000000011111 */
};
```

```c
short G_tran_white_hor_make_up_length_table[64] = {
5,      /* 64   11011    */
5,      /* 128  10010    */
6,      /* 192  010111   */
7,      /* 256  0110111  */
8,      /* 320  00110110     */
8,      /* 384  00110111     */
8,      /* 448  01100100     */
8,      /* 512  01100101     */
8,      /* 576  01101000     */
8,      /* 640  01100111     */
9,      /* 704  011001100    */
9,      /* 768  011001101    */
9,      /* 832  011010010    */
9,      /* 896  011010011    */
9,      /* 960  011010100    */
9,      /* 1024 011010101    */
9,      /* 1088 011010110    */
9,      /* 1152 011010111    */
9,      /* 1216 011011000    */
9,      /* 1280 011011001    */
9,      /* 1344 011011010    */
9,      /* 1408 011011011    */
9,      /* 1472 010011000    */
9,      /* 1536 010011001    */
9,      /* 1600 010011010    */
6,      /* 1664 011000   */
9,      /* 1728 010011011    */
11,     /* 1792 00000001000  */
11,     /* 1856 00000001100  */
11,     /* 1920 00000001101  */
12,     /* 1984 000000010010 */
12,     /* 2048 000000010011 */
12,     /* 2112 000000010100 */
12,     /* 2176 000000010101 */
12,     /* 2240 000000010110 */
12,     /* 2304 000000010111 */
12,     /* 2368 000000011100 */
12,     /* 2432 000000011101 */
12,     /* 2496 000000011110 */
12,     /* 2560 000000011111 */
};

short G_tran_black_hor_make_up_code_table[64] = {
    0x03c0,     /* 64   0000001111    */
    0x0130,     /* 128  000011001000  */
    0x0930,     /* 192  000011001001  */
    0x0da0,     /* 256  000001011011  */
    0x0cc0,     /* 320  000000110011  */
    0x02c0,     /* 384  000000110100  */
    0x0ac0,     /* 448  000000110101  */
    0x06c0,     /* 512  0000001101100 */
    0x16c0,     /* 576  0000001101101 */
    0x0a40,     /* 640  0000001001010 */
    0x1a40,     /* 704  0000001001011 */
    0x0640,     /* 768  0000001001100 */
    0x1640,     /* 832  0000001001101 */
    0x09c0,     /* 896  0000001110010 */
    0x19c0,     /* 960  0000001110011 */
    0x05c0,     /* 1024 0000001110100 */
    0x15c0,     /* 1088 0000001110101 */
    0x0dc0,     /* 1152 0000001110110 */
    0x1dc0,     /* 1216 0000001110111 */
    0x0940,     /* 1280 0000001010010 */
    0x1940,     /* 1344 0000001010011 */
    0x0540,     /* 1408 0000001010100 */
    0x1540,     /* 1472 0000001010101 */
    0x0b40,     /* 1536 0000001011010 */
    0x1b40,     /* 1600 0000001011011 */
    0x04c0,     /* 1664 0000001100100 */
    0x14c0,     /* 1728 0000001100101 */
    0x0080,     /* 1792 00000001000   */
```

```
    0x0180,     /* 1856  00000001100   */
    0x0580,     /* 1920  00000001101   */
    0x0480,     /* 1984  000000010010  */
    0x0c80,     /* 2048  000000010011  */
    0x0280,     /* 2112  000000010100  */
    0x0a80,     /* 2176  000000010101  */
    0x0680,     /* 2240  000000010110  */
    0x0e80,     /* 2304  000000010111  */
    0x0380,     /* 2368  000000011100  */
    0x0b80,     /* 2432  000000011101  */
    0x0780,     /* 2496  000000011110  */
    0x0f80,     /* 2560  000000011111  */
};

short G_tran_black_hor_make_up_length_table[64] = {
    10,   /*   64   00000001111    */
    12,   /*  128   000011001000   */
    12,   /*  192   000011001001   */
    12,   /*  256   000001011011   */
    12,   /*  320   000000110011   */
    12,   /*  384   000000110100   */
    12,   /*  448   000000110101   */
    13,   /*  512   0000001101100  */
    13,   /*  576   0000001101101  */
    13,   /*  640   0000001001010  */
    13,   /*  704   0000001001011  */
    13,   /*  768   0000001001100  */
    13,   /*  832   0000001001101  */
    13,   /*  896   0000001110010  */
    13,   /*  960   0000001110011  */
    13,   /* 1024   0000001110100  */
    13,   /* 1088   0000001110101  */
    13,   /* 1152   0000001110110  */
    13,   /* 1216   0000001110111  */
    13,   /* 1280   0000001010010  */
    13,   /* 1344   0000001010011  */
    13,   /* 1408   0000001010100  */
    13,   /* 1472   0000001010101  */
    13,   /* 1536   0000001011010  */
    13,   /* 1600   0000001011011  */
    13,   /* 1664   0000001100100  */
    13,   /* 1728   0000001100101  */
    11,   /* 1792   00000001000    */
    11,   /* 1856   00000001100    */
    11,   /* 1920   00000001101    */
    12,   /* 1984   000000010010   */
    12,   /* 2048   000000010011   */

12,   /* 2112   000000010100   */
    12,   /* 2176   000000010101   */
    12,   /* 2240   000000010110   */
    12,   /* 2304   000000010111   */
    12,   /* 2368   000000011100   */
    12,   /* 2432   000000011101   */
    12,   /* 2496   000000011110   */
    12,   /* 2560   000000011111   */
};
```

```
/***********************************************************************
*
*    What Include:         %W%
*    Include File Name:    %P%
*    Author:               D. Hunt
*    Subsystem:            TRANSCESS LIBRARY
*    Date First Written:   06/11/87
*    Version:              %I%
*
*    Purpose:              define local macros
*
*                          Insert File History
*
*
*      Date       Changed By                          Description
*    ========   ===============   =========================================
*    09/29/87   D. Hunt           Initial coding.
*
************************************************************************
*                       (c) COPYRIGHT    1987
*                           NetExpress, Inc.
*                           Vienna, Virginia
************************************************************************

/*----------------------------------------------------------------*/
/* PUT_BYTE                                                       */
/* Macro to put a byte into the output stream.                    */
/* End of buffer checking is NOT performed.                       */
/* This means the output buffer must be 4K larger than the        */
/* specified size. (The longest possible RL of 010101...).        */
/* Input: byte is the char to store into the output               */
/* Assumes: encode points to the Encoding_Parameters structure    */
/* Returns: none                                                  */
/*----------------------------------------------------------------*/ define PUT_BYTE( Buffer, Byte )                              \
    {                                                         \
      *( (Buffer) ++ ) = (Byte);                              \
    }

/*printf( "PUT_BYTE at %lx val %x\n", Buffer, (Byte) & 0xFF );*/

/*----------------------------------------------------------------*/
/* INSERT_BIT_STRING                                              */
/* Macro to insert a bit string into a LONG variable              */
/* A limit of 23 bits is placed on the bit string to insert       */
/* The output buffer is filled using PUT_BYTE while its length    */
/* is more than 7 bits long.                                      */
/* Input: Byte is the LONG variable containing the current byte being filled. */
/*             it is right justified.                             */
/*        Count is the number of bits valid in the current byte.  */
/*             it always has a value of 0..7.                     */
/*        Code is the 1..23 bit string to insert.                 */
/*             it is right justified.                             */
/*        Length is the length of the code to insert (1..23).     */
/* Assumes: PUT_BYTE function above.                              */
/* Returns: Stores completed bytes from the bit string in Byte.   */
/*          Returns valid bits in Byte (zero for unfilled bits)   */
/*             and remaining length in Byte as Count (0..7).      */
/*----------------------------------------------------------------*/ define INSERT_BIT_STRING( Buffer, Byte, Count, Code, Length )    \
    {                                                             \
      (Byte) |= ( (long) (Code) << (Count) );                     \
      (Count) += (Length);                                        \
      while ( (Count) >= 8 )                                      \
        {                                                         \
          PUT_BYTE( (Buffer), (char) (Byte) );                    \
          (Byte) >>= 8;                                           \
          (Count) -= 8;                                           \
        }                                                         \
    }
```

```
/****************************************************************************
*
*   Filename: %P%
*   Include: state.h
*   Author: D. Hunt
*   Purpose: define states for convert state/event table
*
*   OS/Hardware Dependencies: TM300 MTOS
*   Notes / Side Effects:
*       events are defined in supervisor/convert.h
*
*                           Modification History
*
*   Ref    Date        Changed By              Description
*   ===    ========    ==============    ==========================================
*          4/21/88     D. Hunt           Initial Coding.
*
*****************************************************************************
*                       Source Control System Information
*
*   What File:          %W%
*   Filename:           %P%
*   Version:            %I%,        Date:    %G%
*   Date Retrieved:     %H%
*
*****************************************************************************
*   (c) COPYRIGHT 1988, NetExpress, Inc. All Rights Reserved.
*                       San Mateo, California.
*****************************************************************************/

/* only include this file once */ ifndef INCLUDE_STATE_H
define INCLUDE_STATE_H

/*--------------------------------------------------*/
/* defines states for convert state/event table */
/*--------------------------------------------------*/ define INVALID_STATE            -1      /* no state */ define WAIT_INPUT_STATE          0
define WAIT_OUTPUT_STATE         1
#define FINISH_INPUT_STATE        2
#define FLUSH_INPUT_STATE         3
#define FINISH_OUTPUT_STATE       4
define FINISH_OUTPUT_EOI_STATE   5 define N_STATES 6

/*--------------------------------------------------*/
/* these are defined in supervisor/convert.h        */
/*                                                  */
/* #define CONVERT_MORE_INPUT_EVENT  0              */
/* #define CONVERT_PAGE_EVENT        1              */
/* #define CONVERT_MORE_OUTPUT_EVENT 2              */
/*--------------------------------------------------*/ define N_EVENTS 3
```

```
/*-------------------------------------------------*/
/* define translate states for line duplication */
/*-------------------------------------------------*/ define INVALID_TRANSLATE_STATE            -1      /* no state */ define INPUT_TRANSLATE_STATE               0      /* normal */
define DUPLICATING_LINES_TRANSLATE_STATE   1      /* duplicating lines */ endif /* state.h not already included */

/*-------------------------------------------------*/
/* define INPUT state table initial state --       */
/*    all others are internal to the function itself */
/*-------------------------------------------------*/ define INIT_INPUT_STATE            0              /* initial decode state */
```

We claim:

1. A method for converting a first image described by a first graphic image code to a corresponding second image described by a second graphics image code, said first graphics image code and said second graphics image code lacking a one-to-one code word conversion correspondence, said method comprising:

analyzing said first graphics image code representing said first image to identify a first scan line representation for each scan line of said first graphics image code;

converting said first scan line representation into a line of code of a translation code, which is a scan line code having a variable length and formed of defined number of fixed length code words;

accumulating a sufficient number of said line codes of said translation code to construct a translation unit of said second graphics image code; and constructing from said translation unit said second image described by said second graphics image code.

2. The method according to claim 1 wherein said translation code comprises a list of transitions between black and white picture elements for each scan line.

3. The method according to claim 2 wherein said transition list includes a list of run lengths of pels in fixed length code words.

4. An apparatus for converting a first image described by a first graphics image code to a co responding second image described by a second graphics image code, said first graphics image code and said second graphics image code lacking a one-to-one word conversion correspondence, said apparatus comprising:

means for analyzing said first graphics image code representing said first image to identify a first scan line representation for each scan line of said first graphics image code;

means for converting said first scan line representation into a line of code of a translation code, which is a scan line code having a variable length and formed of a defined number o fixed length code words;

means for storing in an ordered manner a sufficient number of said line codes of said translation code to construct a translation unit of said second graphics image code; and means for constructing from said translation unit said second image described by said second graphics image code.

5. The apparatus according to claim 4 wherein said translation code comprises a list of transitions between black and white picture elements for each scan line.

6. The apparatus according to claim 5 wherein said transition list includes a list of run lengths of pels in fixed length code words.

7. The method according to claim 1 including the step of processing said translation code to manipulate the source of said second image before constructing said second image.

8. The method according to claim 4 including the step of processing said translation code to manipulate the source of said second image before constructing said second image.

9. The method according to claim 2 wherein each transition list has a first transition list code word specifying the number of said transitions per scan line.

10. The method according to claim 5 wherein each transition list has a first transition list code word specifying the number of said transitions per scan line.

* * * * *